US012505511B2

(12) United States Patent
Prince et al.

(10) Patent No.: US 12,505,511 B2
(45) Date of Patent: Dec. 23, 2025

(54) AI-DRIVEN ENHANCEMENT OF MOTION BLURRED SEQUENCING IMAGES

(71) Applicant: Illumina, Inc., San Diego, CA (US)

(72) Inventors: Simon Prince, Carlsbad, CA (US); Stanley Hong, Palo Alto, CA (US); Michael Gallaspy, San Diego, CA (US); Merek Siu, Alameda, CA (US); Jeffrey Gau, San Mateo, CA (US); Anindita Dutta, San Francisco, CA (US); Aathavan Karunakaran, Berkeley, CA (US); Yina Wang, San Jose, CA (US); Rishi Verma, San Jose, CA (US)

(73) Assignee: Illumina, Inc., San Diego, CA (US)

( * ) Notice: Subject to any disclaimer, the term of this patent is extended or adjusted under 35 U.S.C. 154(b) by 392 days.

(21) Appl. No.: 18/111,281

(22) Filed: Feb. 17, 2023

(65) Prior Publication Data
US 2023/0260096 A1  Aug. 17, 2023

Related U.S. Application Data

(60) Provisional application No. 63/311,429, filed on Feb. 17, 2022.

(51) Int. Cl.
*G06T 5/50* (2006.01)
*G06T 5/20* (2006.01)
(Continued)

(52) U.S. Cl.
CPC .............. *G06T 5/50* (2013.01); *G06T 5/20* (2013.01); *G06T 5/73* (2024.01); *G06T 7/0002* (2013.01);
(Continued)

(58) Field of Classification Search
CPC .... G06T 5/73; G06T 2207/30004; G06T 5/60; G06T 2207/20201; G16B 30/00; G16B 40/20
See application file for complete search history.

(56) References Cited

U.S. PATENT DOCUMENTS 8,158,926 B2  4/2012  Feng et al.
9,193,996 B2  11/2015  Buermann et al.
(Continued)

FOREIGN PATENT DOCUMENTS

WO  2021055857 A1  3/2021
WO  2021108732 A1  6/2021

OTHER PUBLICATIONS

Oh, J. S., Lee, H., & Hwang, W. (2021). Motion blur treatment utilizing deep learning for time-resolved particle image velocimetry. Experiments in Fluids, 62(11), Article 234. https://doi.org/10.1007/s00348-021-03330-4 (Year: 2021).*
(Continued)

*Primary Examiner* — Chan S Park
*Assistant Examiner* — Chandhana Pedapati
(74) *Attorney, Agent, or Firm* — Flaster Greenberg P.C.

(57) ABSTRACT

Artificial intelligence driven enhancement of motion blurred sequencing images enables enhanced sequencing that determines a sequence of bases in genetic material with any one or more of: improved performance, improved accuracy, and/or reduced cost. A training set of images taken after unreduced and reduced movement settling times during sequencing is used to train a neural network to enable the neural network to recover enhanced images, as if taken after the unreduced movement settling time, from unenhanced images taken after the reduced movement settling time.

39 Claims, 25 Drawing Sheets

(51) Int. Cl.
  *G06T 5/73*   (2024.01)
  *G06T 7/00*   (2017.01)
  *G16B 30/00*  (2019.01)
  *G16B 40/10*  (2019.01)
  *G16B 40/20*  (2019.01)

(52) U.S. Cl.
  CPC .............. G16B 30/00 (2019.02); G16B 40/10 (2019.02); G16B 40/20 (2019.02); *G06T 2207/10016* (2013.01); *G06T 2207/10064* (2013.01); *G06T 2207/20081* (2013.01); *G06T 2207/20084* (2013.01); *G06T 2207/30004* (2013.01); *G06T 2207/30168* (2013.01)

(56) References Cited

U.S. PATENT DOCUMENTS

| | | | |
|---|---|---|---|
| 9,512,422 | B2 | 12/2016 | Barnard et al. |
| 10,152,776 | B2 | 12/2018 | Langlois et al. |
| 10,423,861 | B2 | 9/2019 | Gao et al. |
| 10,430,708 | B1* | 10/2019 | Hu ........................... G06T 5/70 |
| 11,049,588 | B2* | 6/2021 | van Rooyen .......... G16B 20/00 |
| 11,053,540 | B1 | 7/2021 | Chen et al. |
| 2013/0260372 | A1 | 10/2013 | Buermann et al. |
| 2019/0333199 | A1* | 10/2019 | Ozcan ..................... G06N 3/047 |
| 2020/0364565 | A1* | 11/2020 | Kostem .............. G01N 21/6454 |

OTHER PUBLICATIONS

U.S. Appl. No. 63/228,954, titled "Base Calling Using Multiple Base Caller Models," filed Aug. 20, 2021.
Chen, Yu-Sheng, Yu-Ching Wang, Man-Hsin Kao, and Yung-Yu Chuang. "Deep Photo Enhancer: Unpaired Learning for Image Enhancement From Photographs With GANs," 6306-14, 2018, (https://openaccess.thecvf.com/content_cvpr_2018/html/Chen_Deep_Photo_Enhancer_CVPR_2018_paper.html.
Tran, Phong, Anh Tran, Quynh Phung, and Minh Hoai. "Explore Image Deblurring via Blur Kernel Space." ArXiv:2104.00317 [Cs], Apr. 3, 2021, (http://arxiv.org/abs/2104.00317.
Arjovsky, Martin, Soumith Chintala, and Léon Bottou. "Wasserstein GAN." ArXiv:1701.07875 [Cs, Stat], Dec. 6, 2017, (http://arxiv.org/abs/1701.07875.
Gulrajani, Ishaan, Faruk Ahmed, Martin Arjovsky, Vincent Dumoulin, and Aaron Courville. "Improved Training of Wasserstein GANs." ArXiv:1704.00028 [Cs, Stat], Dec. 25, 2017, (http://arxiv.org/abs/1704.00028.
Wang, H. et al. Deep learning enables cross-modality super-resolution in fluorescence microscopy. Nat Methods 16, 103-110 (2019).
Jin, L. et al. Deep learning enables structured illumination microscopy with low light levels and enhanced speed. Nat Commun 11, 1934 (2020).
Jin, L. et al. Deep learning extended depth-of-field microscope for fast and slide-free histology. Proc Natl Acad Sci USA 117, 33051-33060 (2020).
Ouyang, W., Aristov, A., Lelek, M., Hao, X. & Zimmer, C. Deep learning massively accelerates super-resolution localization microscopy. Nat Biotechnol 36, 460-468 (2018).
Lehtinen, J. et al. Noise2Noise: Learning Image Restoration without Clean Data. arXiv:1803.04189 [cs, stat] (2018).
Krull, A., Buchholz, T.-O. & Jug, F. Noise2Void—Learning Denoising From Single Noisy Images. in 2019 IEEE/CVF Conference on Computer Vision and Pattern Recognition (CVPR) 2124-2132 (IEEE, 2019), (https://doi.org/10.1109/CVPR.2019.00223.
Chen, H. et al. Pre-Trained Image Processing Transformer. 12. (https://openaccess.thecvf.com/content/CVPR2021/papers/Chen_Pre-Trained_Image_Processing_Transformer_CVPR_2021_paper.pdf.
Yang, F., Yang, H., Fu, J., Lu, H. & Guo, B. Learning Texture Transformer Network for Image Super-Resolution. in 2020 IEEE/CVF Conference on Computer Vision and Pattern Recognition (CVPR) 5790-5799 (IEEE, 2020), (https://doi.org/10.1109/CVPR42600.2020.00583.
Wang, Z., Bovik, A. C., Sheikh, H. R. & Simoncelli, E. P. Image Quality Assessment: From Error Visibility to Structural Similarity. IEEE Trans. on Image Process. 13, 600-612 (2004).
Johnson, J., Alahi, A. & Fei-Fei, L. Perceptual Losses for Real-Time Style Transfer and Super-Resolution. arXiv:1603.08155 [cs] (2016).
Brownlee, J., A Tour of Generative Adversarial Network Models, Jul. 12, 2019, (https://machinelearningmastery.com/tour-of-generative-adversarial-network-models/.
Fernandes, Dsouza, Dsouza, and Meher, "Low-Light Image Enhancement Using Generative Adversarial Networks," International Research Journal of Engineering and Technology (IRJET), Jun. 2021, pp. 755-758 vol. 8 Issue: 6.
Aqsa Rashid, Muhammad Khurrum Rahim, "Extensive Experimental Analysis of Image Statistical Measures for Image Processing Appliances," International Journal of Signal Processing, Image Processing and Pattern Recognition, vol. 9, No. 3 (2016), pp. 49-60, (http://dx.doi.org/10.14257/ijsip.2016.9.3.05.
Activation function—Wikipedia, (https://en.wikipedihttps://en.wikipedia.org/wiki/Activation_functiona.org/wiki/Activation_function—Jan. 17, 2022, 10:38 AM.
Transformer (machine learning model)—Wikipedia, (https://en.wikipedia.org/wiki/Transformer_(machine_learning_model)—Jan. 21, 2022, 1:42PM.
Illumina Sequencing Technology, (https://www.illumina.com/documents/products/techspotlights/techspotlight_sequencing.pdf Jan. 18, 2022, 10:30AM.
Isola, P., Zhu, J.-Y., Zhou, T., and Efros, A. A., "Image-to-Image Translation with Conditional Adversarial Networks," Nov. 26, 2018, arXiv:1611.07004 [cs], (https://arxiv.org/pdf/1611.07004.pdf (Isola et al.).
Zhu, Jun-Yan, Taesung Park, Phillip Isola, and Alexei A. Efros, "Unpaired Image-To-Image Translation Using Cycle-Consistent Adversarial Networks," Aug. 24, 2020, arXiv:1703.10593v7 [cs. CV], (https://arxiv.org/pdf/1703.10593v7.pdf (Zhu et al.).

\* cited by examiner

| 4-Channel Chemistry | | | | |
|---|---|---|---|---|
| | A | G | T | C |
| Image 1 | ⊘ | | | |
| Image 2 | | ⊘ | | |
| Image 3 | | | ⊗ | |
| Image 4 | | | | ⊙ |
| Result | A | G | T | C |

| 2-Channel Chemistry | | | | |
|---|---|---|---|---|
| | A | G | T | C |
| Image 1 | ⊘ | | ⊗ | |
| Image 2 | ⊘ | | | ⊘ |
| Result | A | G | T | C |

| 1-Channel Chemistry | | | | |
|---|---|---|---|---|
| | A | G | T | C |
| Image 1 | ⊘ | | ⊘ | |
| Image 2 | | | ⊘ | ⊘ |
| Result | A | G | T | C |

Intermediate Chemistry Step

FIG 10

Example Cross-Correlation Equation For Discrete Functions $$(f * g)[n] \overset{def}{=} \sum_{m=-\infty}^{\infty} f^*[m]g[m+n]$$

FIG. 13B

Example Scoring Equation

Score = 1 − (RunnerUp_CC − MinimumCC)/(Maximum_CC − Minimum_CC)

FIG 13C $$\mathscr{L}_{cGAN}(G,D) = \mathbb{E}_{x,y}[\log D(x,y)] + \mathbb{E}_{x,z}[\log(1-D(x,G(x,z)))]$$

FIG.20A

$$\mathscr{L}_{L1}(G) = \mathbb{E}_{x,y,z}[\|y-G(x,z)\|_1]$$

FIG.20B

$$G^* = \arg\min_G \max_D \mathscr{L}_{cGAN}(G,D) + \lambda\mathscr{L}_{L1}(G)$$

FIG.20C

AI-DRIVEN ENHANCEMENT OF MOTION BLURRED SEQUENCING IMAGES

CROSS-REFERENCE TO RELATED APPLICATIONS

The present application claims priority to U.S. Provisional Patent Application No. 63/311,429, filed Feb. 17, 2022, and titled "AI-DRIVEN SIGNAL ENHANCEMENT OF MOTION BLURRED SEQUENCING IMAGES," the entirety of which is incorporated by reference as if fully set forth herein.

INCORPORATIONS BY REFERENCE

The following are incorporated by reference for all purposes as if fully set forth herein:

- U.S. Pat. No. 10,423,861, titled "DEEP LEARNING-BASED TECHNIQUES FOR TRAINING DEEP CONVOLUTIONAL NEURAL NETWORKS," issued Sep. 24, 2019, applicant Illumina, Inc.;
- U.S. Pat. No. 10, 152, 776, titled "OPTICAL DISTORTION CORRECTION FOR IMAGED SAMPLES," issued Dec. 11, 2018, applicant Illumina, Inc.;
- U.S. Pat. No. 9,512,422, titled "GEL PATTERNED SURFACES," issued Dec. 6, 2016, applicant Illumina, Inc.;
- U.S. Pat. No. 9,193,996, titled "INTEGRATED OPTO-ELECTRONIC READ HEAD AND FLUIDIC CARTRIDGE USEFUL FOR NUCLEIC ACID SEQUENCING," issued Nov. 24, 2015, applicant Illumina, Inc.;
- U.S. Pat. No. 8,158,926, titled "CONFOCAL IMAGING METHODS AND APPARATUS," issued Apr. 17, 2012, to Illumina, Inc.;
- PCT Application WO 2021/055857A1, titled "ARTIFICIAL INTELLIGENCE-BASED EPIGENETICS," published Mar. 25, 2021, applicant Illumina, Inc.;
- U.S. Provisional Patent Application No. 63/228,954, titled "BASE CALLING USING MULTIPLE BASE CALLER MODELS," filed 20 Aug. 2021;
- Chen, Yu-Sheng, Yu-Ching Wang, Man-Hsin Kao, and Yung-Yu Chuang. "Deep Photo Enhancer: Unpaired Learning for Image Enhancement From Photographs With GANs," 6306-14, 2018, (https://) openaccess.thecvf.com/content_cvpr_2018/html/Chen_Deep_Photo_Enhancer_CVPR_2018_paper.html;
- Tran, Phong, Anh Tran, Quynh Phung, and Minh Hoai. "Explore Image Deblurring via Blur Kernel Space." ArXiv: 2104.00317 [Cs], Apr. 3, 2021, (http://) arxiv.org/abs/2104.00317;
- Arjovsky, Martin, Soumith Chintala, and Leon Bottou. "Wasserstein GAN." ArXiv: 1701.07875 [Cs, Stat], Dec. 6, 2017, (http://) arxiv.org/abs/1701.07875;
- Gulrajani, Ishaan, Faruk Ahmed, Martin Arjovsky, Vincent Dumoulin, and Aaron Courville. "Improved Training of Wasserstein GANs." ArXiv: 1704.00028 [Cs, Stat], Dec. 25, 2017, (http://) arxiv.org/abs/1704.00028;
- Wang, H. et al. Deep learning enables cross-modality super-resolution in fluorescence microscopy. Nat Methods 16, 103-110 (2019);
- Jin, L. et al. Deep learning enables structured illumination microscopy with low light levels and enhanced speed. Nat Commun 11, 1934 (2020);
- Jin, L. et al. Deep learning extended depth-of-field microscope for fast and slide-free histology. Proc Natl Acad Sci USA 117, 33051-33060 (2020);
- Ouyang, W., Aristov, A., Lelek, M., Hao, X. & Zimmer, C. Deep learning massively accelerates super-resolution localization microscopy. Nat Biotechnol 36, 460-468 (2018);
- Lehtinen, J. et al. Noise2Noise: Learning Image Restoration without Clean Data. arXiv: 1803.04189 [cs, stat] (2018);
- Krull, A., Buchholz, T.-O. & Jug, F. Noise2Void-Learning Denoising From Single Noisy Images. in 2019 IEEE/CVF Conference on Computer Vision and Pattern Recognition (CVPR) 2124-2132 (IEEE, 2019), (https://) doi.org/10.1109/CVPR.2019.00223;
- Chen, H. et al. Pre-Trained Image Processing Transformer. 12. (https://) openaccess.thecvf.com/content/CVPR2021/papers/Chen_Pre-Trained_Image_Processing_Transformer_CVPR_ 2021_paper.pdf;
- Yang, F., Yang, H., Fu, J., Lu, H. & Guo, B. Learning Texture Transformer Network for Image Super-Resolution. in 2020 IEEE/CVF Conference on Computer Vision and Pattern Recognition (CVPR) 5790-5799 (IEEE, 2020), (https://) doi.org/10.1109/CVPR42600.2020.00583;
- Wang, Z., Bovik, A. C., Sheikh, H. R. & Simoncelli, E. P. Image Quality Assessment: From Error Visibility to Structural Similarity. IEEE Trans. on Image Process. 13, 600-612 (2004);
- Johnson, J., Alahi, A. & Fei-Fei, L. Perceptual Losses for Real-Time Style Transfer and Super-Resolution. arXiv: 1603.08155 [cs] (2016);
- Brownlee, J., A Tour of Generative Adversarial Network Models, Jul. 12, 2019, (https://) machinelearningmastery.com/tour-of-generative-adversarial-network-models/;
- Fernandes, Dsouza, Dsouza, and Meher, "Low-Light Image Enhancement Using Generative Adversarial Networks," International Research Journal of Engineering and Technology (IRJET), June 2021, pp. 755-758 Volume: 8 Issue: 6;
- Aqsa Rashid, Muhammad Khurrum Rahim, "Extensive Experimental Analysis of Image Statistical Measures for Image Processing Appliances," International Journal of Signal Processing, Image Processing and Pattern Recognition, Vol. 9, No. 3 (2016), pp. 49-60, (http://) dx.doi.org/10.14257/ijsip.2016.9.3.05;
- Activation function—Wikipedia, (https://) en.wikipedihttps://en.wikipedia.org/wiki/Activation_function-a.org/wiki/Activation_func tion—Jan. 17, 2022, 10:38 AM;
- Transformer (machine learning model)-Wikipedia, (https://) en.wikipedia.org/wiki/Transformer_(machine_learning_model)—Jan. 21, 2022, 1:42 PM;
- Illumina Sequencing Technology, (https://) www.illumina.com/documents/products/techspotlights/techspotlight_sequencing.pdf Jan. 18, 2022, 10:30 AM.
- Isola, P., Zhu, J.-Y., Zhou, T., and Efros, A. A., "Image-to-Image Translation with Conditional Adversarial Networks," 26 Nov. 2018, arXiv: 1611.07004 [cs], (https://)arxiv.org/pdf/1611.07004.pdf (Isola et al.); and
- Zhu, Jun-Yan, Taesung Park, Phillip Isola, and *Alexei* A. Efros, "Unpaired Image-To-Image Translation Using Cycle-Consistent Adversarial Networks," 24 Aug. 2020, arXiv:1703.10593v7 [cs.CV], (https://)arxiv.org/pdf/1703.10593v7.pdf (Zhu et al.)

BACKGROUND

The subject matter discussed in this section should not be assumed to be prior art merely because of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The technology disclosed relates to sequencing usable to determine genetic sequences associated with a biological sample, including nucleic acid materials (DNA, RNA), proteins, and polypeptides. The genetic sequences are useful for many purposes, including diagnosis and treatment of diseases. Techniques are disclosed that enable any one or more of: improving performance, improving accuracy, and/or reducing cost of sequencing.

Sequencing by synthesis, e.g., is a parallel technique for determining genetic sequences and operates on a multitude of oligonucleotides (sometimes referred to as oligos) of the sample at once, one base position at a time for each of the oligos in parallel. Some implementations of sequencing by synthesis operate by cloning oligos on a substrate, such as a slide and/or a flow cell, e.g., arranged in multiple lanes and imaged as respective tiles in each lane. In some implementations, the cloning is arranged to preferentially clone each of a plurality of starting oligos into a respective cluster of oligos, such as in a respective nanowell of a patterned flow cell.

The sequencing by synthesis proceeds in a series of sequencing cycles, sometimes referred to simply as cycles. In each of the sequencing cycles, there are chemical, image capture, and base calling actions. The results of the actions are a determined base (e.g., for DNA, one of four bases adenine (A), guanine (G), thymine (T), and cytosine (C)) for each of the oligos in parallel. The chemical actions are designed to add one complementary nucleotide with a fluorescent label (sometimes referred to as a fluorophore) to each clone (e.g., oligo) in each cluster in each cycle. The image capture actions generally align an imager (e.g., camera) with respect to a tile of a lane of a flow cell, illuminate the tile (e.g., with one or more lasers) to stimulate fluorescence of the fluorophores, and capture a plurality of images of the fluorescence (e.g., one to four images each corresponding to the tile and each of a distinct wavelength). The base calling actions result in identification of the determined base (e.g., one of A, G, T, and C) for each oligo in parallel. In some implementations, the image capture actions correspond to discrete point-and-shoot operation, e.g., the imager and the flow cell are moved with respect to each other and then image capture actions are performed for a tile. In some implementations, the image capture actions correspond to continuous scanning operation, e.g., the imager and the flow cell are in continuous movement with respect to each other and image capture is performed during the movement. In various continuous scanning implementations, a tile corresponds to any contiguous region of a sample.

Some implementations of sequencing by synthesis use fluorescently labeled nucleotides, such as a fluorescently labeled deoxyribonucleoside triphosphate (dNTP), as fluorophores. During each sequencing cycle, a single fluorophore is added to each of the oligos in parallel. An excitation source, such as a laser, stimulates fluorescence of many of the fluorophores in parallel, and the fluorescing fluorophores are imaged in parallel via one or more imaging operations. When imaging of the fluorophores added in the sequencing cycle is complete, the fluorophores added in the sequencing cycle are removed and/or inactivated, and sequencing proceeds to a next sequencing cycle. During the next sequencing cycle, a next single fluorophore is added to each of the oligos in parallel, the excitation source stimulates parallel fluorescence of many of the fluorophores added in the next sequencing cycle, and the fluorescing fluorophores are imaged in parallel via one or more imaging operations. The sequencing cycles are repeated as needed, based on how many bases are in the oligos and/or other termination conditions.

In some implementations having a plurality of imaging operations per sequencing cycle, the imager and the flow cell are moved relative to each other to enable capturing an image of a next tile of the flow cell. For example, after capture of an image of a current tile of a flow cell, an imager is positioned to capture an image of a next tile of the flow cell, such as a tile adjacent to the current tile. For another example, after capture of an image of a current tile of a flow cell by an imager, the flow cell is positioned to enable capture of an image of a next tile of the flow cell by the imager. The capture of the image of the next tile is delayed after completion of the relative movement by a movement settling time. In some implementations, there is a delay of at least the movement settling time between imaging every tile.

In various implementations, the delays decrease performance and/or accuracy, and/or increase cost. For example, in some implementations, oligos damage is cumulative with respect to processing time, so the delays increase oligos damage resulting in reduced accuracy (e.g., damaged oligos are sequenced incorrectly). Alternatively, or additionally, the increased oligos damage results in decreased performance and/or increased cost (e.g., the damaged oligos lead to repeated processing, thus decreasing performance and/or increasing cost). As another example, the delays increase cost, at least because since more time is required to complete a sequencing run in view of the delays compared to without the delays, operator monitoring cost increases.

Therefore, what is needed is improved sequencing that enables any one or more of: improving performance, improving accuracy, and/or reducing cost.

SUMMARY

The technology disclosed relates to AI-driven enhancement of motion blurred sequencing images taken on an optical sequencing system, such as a detection of bases through fluorescent labels or other labels or reporters.

Particular aspects of the technology disclosed are described in the claims, specification, and drawings.

Artificial intelligence driven enhancement of motion blurred sequencing images enables enhanced sequencing that determines a sequence of bases in genetic material with any one or more of: improved performance, improved accuracy, and/or reduced cost. A training set of images taken after unreduced and reduced movement settling times during sequencing is used to train a neural network to enable the neural network to recover enhanced images, as if taken after the unreduced movement settling time, from unenhanced images taken after the reduced movement settling time.

BRIEF DESCRIPTION OF THE DRAWINGS

FIG. 10 illustrates various sequencing image channel chemistry techniques.

FIG. 13B illustrates an example cross-correlation equation for discrete functions.

FIG. 13C illustrates an example scoring equation.

FIGS. 20A-C collectively illustrate example equations relating to loss functions.

DETAILED DESCRIPTION

Figure 1:
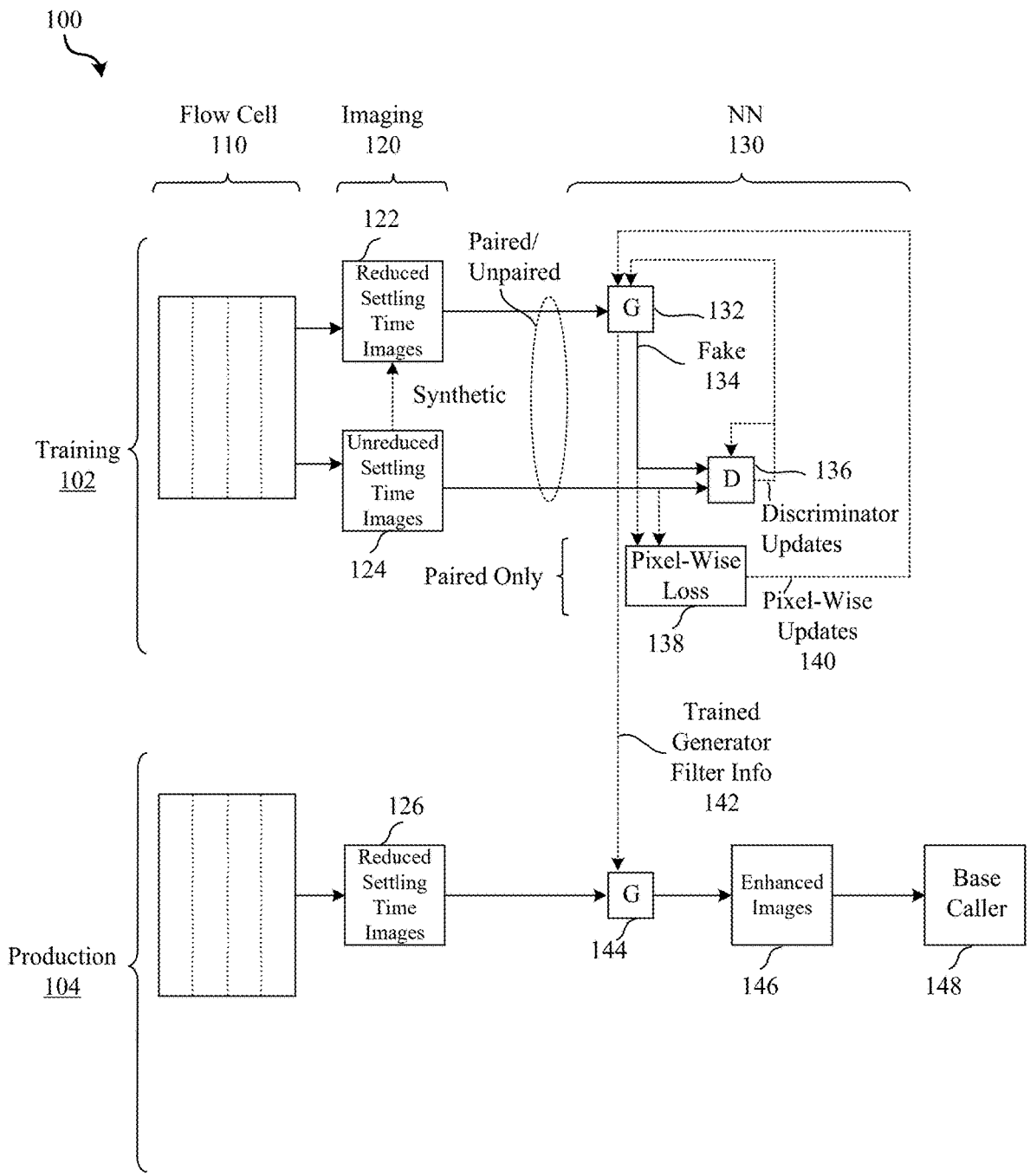
FIG. 1 illustrates an example of AI-driven enhancement of motion blurred sequencing images.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

The following detailed description is made with reference to the figures. Example implementations are described to illustrate the technology disclosed, not to limit its scope, which is defined by the claims. In that regard, disclosure of various implementations for use in connection with sequencing-by-synthesis (SBS) for Next Generation Sequencing (NGS) is meant to illustrate the implementations in the context of a well-known and widely-used sequencing technique, and various implementations herein have application to any number of other sequencing techniques, including, e.g., real time sequencing; nanopore sequencing; long read sequencing; single-molecule sequencing; stochastic sequencing; amplification-free sequencing; sequencing by ligation; pyrosequencing; and ion semiconductor sequencing.

Those of ordinary skill in the art will recognize a variety of equivalent variations on the description that follows.

Examples of Selected Terms

An example of Artificial Intelligence (AI) is intelligence as manifested by computer systems. A specific example is the AI-driven enhancement of motion blurred sequencing images for base calling during sequencing. The AI-driven enhancement is implemented at least in part, for example, via one or more computer systems implementing and/or based on one or more machine learning techniques such as deep learning using one or more Neural Networks (NNs). Various examples of NNs include Convolutional Neural Networks (CNNs) generally (e.g., any NN having one or more layers performing convolution), as well as NNs having elements that include one or more CNNs and/or CNN-related elements (e.g., one or more convolutional layers), such as various implementations of Generative Adversarial Networks (GANs) generally, as well as various implementations of Conditional Generative Adversarial Networks (CGANs), cycle-consistent Generative Adversarial Networks (CycleGANs), and autoencoders. In various scenarios, any NN having at least one convolutional layer is referred to as a CNN. The various examples of NNs further include transformer-based NNs generally (e.g., any NN having one or more layers performing an attention operation such as a self-attention operation or any other type of attention operation), as well as NNs having elements that include one or more transformers and/or transformer-related elements. The various examples of NNs further include Recurrent Neural Networks (RNNs) generally (e.g., any NN in which output from a previous step is provided as input to a current step and/or having hidden state), as well as NNs having one or more elements related to recurrence. The various examples of NNs further include graph neural networks and diffusion neural networks. The various examples of NNs further include MultiLayer Perceptron (MLP) neural networks. In some implementations, a GAN is implemented at least in part via one or more MLP elements.

Examples of elements of NNs include layers, such as processing, activation, and pooling layers, as well as loss functions and objective functions. According to implementation, functionality corresponding to one or more processing layers, one or more pooling layers, and/or one or more an activation layers is included in layers of a NN. According to implementation, some layers are organized as a processing layer followed by an activation layer and optionally the activation layer is followed by a pooling layer. For example, a processing layer produces layer results via an activation function followed by pooling. Additional example elements of NNs include batch normalization layers, regularization layers, and layers that implement dropout, as well as recurrent connections, residual connections, highway connections, peephole connections, and skip connections. Further additional example elements of NNs include gates and gated memory units, such as Long Short-Term Memory (LSTM) blocks or Gated Recurrent Unit (GRU) blocks, as well as residual and/or attention blocks.

Examples of processing layers include convolutional layers generally, upsampling layers, downsampling layers, averaging layers, and padding layers. Examples of convolutional layers include 1D convolutional layers, 2D convolutional layers, 3D convolutional layers, 4D convolutional layers, 5D convolutional layers, multi-dimensional convolutional layers, single channel convolutional layers, multi-channel convolutional layers, 1×1 convolutional layers, atrous convolutional layers, dilated convolutional layers, transpose convolutional layers, depthwise separable convolutional layers, pointwise convolutional layers, 1×1 convolutional layers, group convolutional layers, flattened convolutional layers, spatial convolutional layers, spatially separable convolutional layers, cross-channel convolutional layers, shuffled grouped convolutional layers, and pointwise grouped convolutional layers. Convolutional layers vary according to various convolutional layer parameters, for example, kernel size (e.g., field of view of the convolution), stride (e.g., step size of the kernel when traversing an image), padding (e.g., how sample borders are processed), and input and output channels. An example kernel size is 3×3 pixels for a 2D image. An example default stride is one. In various implementations, strides of one or more convolutional layers are larger than unity (e.g., two). A stride larger than unity is usable, for example, to reduce sizes of non-channel dimensions and/or downsampling. A first example of padding (sometimes referred to as 'padded') pads zero values around input boundaries of a convolution so that spatial input and output sizes are equal (e.g., a 5×5 2D input image is processed to a 5×5 2D output image). A second example of padding (sometimes referred to as 'unpadded') includes no padding in a convolution so that spatial output size is smaller than input size (e.g., a 6×6 2D input image is processed to a 4×4 2D output image).

Example activation layers implement, e.g., non-linear functions, such as a rectifying linear unit function (sometimes referred to as ReLU), a leaky rectifying linear unit function (sometimes referred to as a leaky-ReLU), a parametric rectified linear unit (sometimes referred to as a PreLU), a Gaussian Error Linear Unit (GELU) function, a sigmoid linear unit function, a sigmoid shrinkage function, an SiL function, a Swish-1 function, a Mish function, a Gaussian function, a softplus function, a maxout function, an Exponential Linear Unit (ELU) function, a Scaled Exponential Linear Unit (SELU) function, a logistic function, a sigmoid function, a soft step function, a softmax function, a Tangens hyperbolicus function, a tanh function, an arctan function, an ElliotSig/Softsign function, an Inverse Square Root Unit (ISRU) function, an Inverse Square Root Linear Unit (ISRLU) function, and a Square Nonlinearity (SQNL) function.

Examples of pooling layers include maximum pooling layers, minimum pooling layers, average pooling layers, and adaptive pooling layers.

Examples of loss functions include loss functions in accordance with one or more loss terms, such as a logistic regression/log loss, a multi-class cross-entropy/softmax loss, a binary cross-entropy loss, a mean squared error loss, a mean absolute error loss, a mean absolute percentage error loss, a mean squared logarithmic error loss, an L1 loss, an L2 loss, a smooth L1 loss, a Huber loss, a patch-based loss, a pixel-based loss, a pixel-wise loss, a perceptual loss, a Wasserstein loss (sometimes termed an Earth Mover distance loss), and a fiducial-based loss. Additional examples of loss functions include loss functions in accordance one or more image quality metrics, such as a Peak Signal to Noise Ratio (PSNR) metric, a Structural Similarity Index (SSI) (e.g., a technique to take into account local area around a particular pixel and/or used in a patch-based processing context), a Point Spread Function (PSF) such as estimated based on images generally containing approximately point sources (a smaller PSF corresponds to high image quality), a metric of a PSF such as Full Width at Half Maximum (FWHM), and variability in intensities for a single sequencing cycle. Some loss functions are based on comparing intermediary activations of a NN, such as between layers. Some loss functions are based on a spatial domain. Some loss functions are based on a frequency domain.

Example objective functions include maximizing a likelihood, maximizing a log likelihood, maximizing a probability, maximizing a log probability, and minimizing one or error terms (e.g., as determined via one or more loss functions). Further example objective functions include an Evidence Lower Bound Objective (ELBO) function and any objective function based on a Kullback-Leibler (KL) divergence term. According to implementation, a penalty is applied to an objective function. Example penalties applicable to various objective functions include a ridge regression penalty and a lasso regression penalty.

Example techniques to train NNs, such as to determine and/or update parameters of the NNs, include backpropagation-based gradient update and/or gradient descent techniques, such as Stochastic Gradient Descent (SGD), synchronous SGD, asynchronous SGD, batch gradient descent, and mini-batch gradient descent. The backpropagation-based gradient techniques are usable alone or in any combination. E.g., stochastic gradient descent is usable in a mini-batch context. Example optimization techniques usable with, e.g., backpropagation-based gradient techniques (such as gradient update and/or gradient descent techniques) include Momentum, Nesterov accelerated gradient, Adagrad, Adadelta, RMSprop, Adam, AdaMax, Nadam, and AMSGrad.

According to implementation, elements of NNs, such as layers, loss functions, and/or objective functions, variously correspond to one or more hardware elements, one or more software elements, and/or various combinations of hardware elements and software elements. For a first example, a convolution layer, such as a N×M×D convolutional layer, is implemented as hardware logic circuitry comprised in an Application Specific Integrated Circuit (ASIC). For a second example, a plurality of convolutional, activation, and pooling layers are implemented in a TensorFlow machine learning framework on a collection of Internet-connected servers. For a third example, a first one or more portions a NN, such as one or more convolution layers, are respectively implemented in hardware logic circuitry according to the first example, and a second one or more portions of the NN, such as one or more convolutional, activation, and pooling layers, are implemented on a collection of Internet-connected servers according to the second example. Various implementations are contemplated that use various combinations of hardware and software elements to provide corresponding price and performance points.

Example characterizations of a NN architecture include any one or more of topology, interconnection, number, arrangement, dimensionality, size, value, dimensions and/or number of hyperparameters, and dimensions and/or number of parameters of and/or relating to various elements of a NN (e.g., any one or more of layers, loss functions, and/or objective functions of the NN).

Example implementations of a NN architecture include various collections of software and/or hardware elements that collectively perform operations according to the NN architecture. Various NN implementations vary according to machine learning framework, programming language, runtime system, operating system, and underlying hardware resources. The underlying hardware resources variously include one or more computer systems, such as having any combination of Central Processing Units (CPUs), Graphics Processing Units (GPUs), Field Programmable Gate Arrays (FPGAs), Coarse-Grained Reconfigurable Architectures (CGRAs), Application-Specific Integrated Circuits (ASICs), Application Specific Instruction-set Processors (ASIPs), and Digital Signal Processors (DSPs), as well as computing systems generally, e.g., elements enabled to execute programmed instructions specified via programming languages. Various NN implementations are enabled to store programming information (such as code and data) on non-transitory computer readable media and are further enabled to execute the code and reference the data according to programs that implement NN architectures.

Examples of machine learning frameworks, platforms, runtime environments, and/or libraries, such as enabling investigation, development, implementation, and/or deployment of NNs and/or NN-related elements, include TensorFlow, Theano, Torch, PyTorch, Keras, MLpack, MATLAB, IBM Watson Studio, Google Cloud AI Platform, Amazon SageMaker, Google Cloud AutoML, RapidMiner, Azure Machine Learning Studio, Jupyter Notebook, and Oracle Machine Learning.

Examples of programming languages, code and/or data libraries, and/or operating environments usable for machine learning, such as relating to NNs, include Python, Numpy, R, Java, Javascript, C#, C++, *Julia*, Shell, Go, TypeScript, and Scala.

An example of image collection is using an imager to simultaneously capture light emitted by a plurality of fluorescence-tagged nucleotides as the nucleotides are fluorescing responsive to excitation energy (such as laser excitation energy) as a collected image. The image has one or more dimensions, e.g., a line of pixels or a two-dimensional array of pixels. The pixels are represented according to one or more values. For a first example, each pixel is represented by a single integer (such as an 8-bit integer) that represents intensity of the pixel (such as a greyscale). For a second example, each pixel is represented by a plurality of integers (such as three 24-bit integers) and each of the integers represents intensity of the pixel according to a respective band of wavelengths (such as respective colors).

AI-Driven Enhancement of Motion Blurred Sequencing Images—Example Implementation In this disclosure, training contexts and production contexts are described. In some implementations, laboratory instruments (sometimes referred to as biological sequencing instruments) are used in the training contexts and production instruments (also sometimes referred to as biological sequencing instruments) are used in the production contexts.

In some implementations, laboratory instruments as well as production instruments are used in training contexts. The training contexts and the production contexts implement various NN-related processing (such as one or more NNs directed to implementing AI-driven enhancement of motion blurred sequencing images). In various implementations, all or any portions of the NN-related processing of the training contexts is variously implemented on any one or more of the laboratory instruments, any one or more of the production instruments, and/or any one or more computer systems separate from the laboratory instruments and the production instruments. In various implementations, all or any portions of the NN-related processing of the production contexts is variously implemented on any one or more of the laboratory instruments, any one or more of the production instruments, and/or any one or more computer systems (such as one or more servers) separate from the laboratory instruments and the production instruments. In various implementations, all or any portions of the NN-related processing of the laboratory instruments is performed by one or more computer systems of the laboratory instruments. Similarly, in various implementations, all or any portions of the NN-related processing of the production instruments is performed by one or more computer systems of the production instruments. In various implementations, all or any portions of the laboratory instruments are used primarily for image collection and NN-related processing of associated training contexts is performed on one or more computer systems separate from the laboratory instruments used primarily for image collection.

AI-driven enhancement of motion blurred sequencing images enables enhanced sequencing by synthesis that determines a sequence of bases in genetic material with any one or more of: improved performance, improved accuracy, and/or reduced cost. The sequencing by synthesis proceeds one base at a time in parallel for each of a plurality of oligos attached to all or any portions of a flow cell. Processing of each respective base for the plurality of oligos comprises imaging at a reduced (e.g., short) movement settling time and using AI-driven enhancement of motion blurred sequencing images for enhancing results of the reduced movement settling time imaging to recover enhanced images as if taken at an unreduced (e.g., long) movement settling time. The processing further comprises, based on the enhanced images, identifying the respective bases (e.g., one of A, T, C, and G) via base calling. Results of the base calling across the plurality of oligos are combined into overall sequencing results. Using reduced movement settling time for the base calling reduces damage (such as bleaching and/or wear-out) to samples being sequenced compared to using unreduced movement settling time for the base calling. The reduction in damage enables, for example, increased base calling performance and/or accuracy, and/or decreased cost.

An example of AI-driven enhancement of motion blurred sequencing images is using a neural network, such as including one or more convolutional neural networks and/or one or more convolutional layers, to learn information that enables base calling based on imaging performed at a reduced (e.g., short) movement settling time. The learning is based in part on imaging performed at an unreduced (e.g., long) movement settling time. In this disclosure, imaging performed at the unreduced movement settling time is described as producing unreduced movement settling time images and is sometimes referred to as imaging at unreduced settling time, e.g., producing unreduced settling time images. In some implementations, the learning is also based in part on imaging performed at a reduced (e.g., short) movement settling time. In this disclosure, imaging performed at the reduced movement settling time is described as producing reduced movement settling time images and is sometimes referred to as imaging at reduced settling time, e.g., producing reduced settling time images.

In various scenarios, AI-driven enhancement of motion blurred sequencing images is based in part on knowledge and insight that the sequencing images comprise one or more glowing fluorophores, and that the glowing fluorophores appear variously in the images as point sources of light, partially overlapping sources of light, self-illuminating sources of light, and/or relatively limited color spectra sources of light. In various scenarios, the glowing fluorophores emit light of overlapping emission spectra (e.g., in implementations using chemistry compatible with a plurality of wavelengths such as 4-channel chemistry). In various scenarios, many (such as a majority, most, or all) of the point sources of light share similar characteristics. The shared similar characteristics include any one or more of imaging the point source in a relatively small contiguous area of an image sensor, representing the point source in an image as a relatively small number of pixels (such as one pixel or two contiguous pixels), and the point sources appearing in the images as having a similar shape. In some scenarios, the images include effects of one or more sources for the stimulating, such as background light and/or illuminating light from one or more lasers lasing at respective wavelengths.

In various scenarios, point sources imaged by an imager such as a camera, are composed of a plurality of smaller, indistinguishable point sources (e.g., individual glowing fluorophores). Errors in sequencing by synthesis (such as chemistry errors and/or energy-induced damage) result in a mixing of fluorophores (such as manifested by phasing and/or pre-phasing) within a cluster or one or more clusters of a nanowell. From the perspective of the imager, the mixed fluorophores appear as a single point source, in some circumstances. In some implementations, effects of the mixing are mitigated by processing information over a plurality of sequencing cycles, e.g., information of individual fluorophores of the mixed fluorophores is disentangled using information from several contiguous sequencing cycles.

Compared to other domains related to point sources (e.g., astronomy), AI-driven enhancement of motion blurred sequencing images is distinguished at least as follows. The point sources described herein are near diffraction limits of laboratory and production instruments and are imaged at approximately a single pixel each. In some implementations, relative spacing between the point sources is prescribed, such as by adjusting spacing between nanowells. The relative spacing (e.g., nanowell pitch) is near the diffraction limits, leading, in some scenarios, to dense images with significant spatial crosstalk between clusters. The point sources herein have a high dynamic intensity range, e.g., to representing either 'on' or 'off' dependent on which base is currently fluorescence-tagged in a cluster. The intensity of the point sources encodes information about the point source, e.g., which base is presently tagged. In some implementations, emission wavelengths of the point sources are used in part to decode information about the point sources (e.g., which of A, G, T, or C does a point source correspond to). The point sources herein (fluorophores) are removably attached to an object of interest, e.g., a particular base of a genetic sample, enabling extending sequencing to a next base of the genetic sample. Information In some scenarios, information over time is relevant, e.g., information from a first sequencing cycle is relevant to a next or later sequencing cycle. Imaging of the point sources herein uses exposure times that are orders of magnitude short than, e.g., astronomy applications. The point sources and/or portions of a corresponding genetic sample are subject to damage by energy used to trigger fluorescence.

Compared to other domains related to naturalistic images (e.g., wildlife photography), AI-driven enhancement of motion blurred sequencing images is distinguished at least as follows. The genetic samples described herein have relatively localized spatial interactions, e.g., on the order of a dozen pixels, but in contrast, an image of an animal is, e.g., on the order of hundreds or thousands of pixels. The genetic samples lack feature hierarchy; however, an image of an animal is divisible into a hierarchy of elements, e.g., body parts (limbs, body, and head), in turn the head is divisible into smaller elements (ears, eyes, and nose), and the nose into fur and skin. Processing of the genetic samples described herein is with respect to specific emission wavelengths, and some implementations filter out non-desirable wavelengths; in contrast, naturalistic images contain all visible wavelengths and omit non-visible wavelengths. Further, the processing is with respect to a restricted type of scene, e.g., a flow cell.

Other distinguishing characteristics are as follows. It is not possible to repeat imaging of a genetic sample once discarded, at least because flow cell seeding is a stochastic process. Genetic sample images include distinguishable points of reference (e.g., landmarks) such as fiducials located at pre-determined locations. Some implementations are based on flow cells having multiple surfaces, necessitating capturing corresponding images for each of the multiple surfaces.

In this disclosure, some effects are related in part to power (energy per unit time) and some effects are related in part to energy (power integrated over time). For example, some sample damage effects are related to power and some sample damage effects are related to energy. Generally, this disclosure uses the term 'power' as indicative of energy per unit time, such that a laser source with a relatively higher power is understood to effect a relatively higher amount of power-induced damage as well as to effect a relatively higher amount of energy-induced damage. Compared to implementations that lack reduced movement settling time imaging, some implementations that use reduced movement settling time imaging reduce time for a sequencing run, and thus reduce energy-induced damage.

Various implementations of NNs are usable for AI-driven enhancement of motion blurred sequencing images. For example, NNs variously implemented with any one or more of a Generative Adversarial Network (GAN), a Conditional GAN (CGAN), an autoencoder (e.g., encoder/decoder), a cycle-consistent GAN (CycleGAN), a Transformer, and various types of CNNs alone and/or in combination with one or more Transformers are usable for AI-driven enhancement of motion blurred sequencing images. Various implementation technologies of NNs are usable for AI-driven enhancement of motion blurred sequencing images. For example, NNs implemented wholly or in part via software executing on processors, NNs implemented wholly or in part via purpose-built hardware, as well as NNs implemented using techniques combining software and hardware are usable for AI-driven enhancement of motion blurred sequencing images.

Some implementations of AI-driven enhancement of motion blurred sequencing images are based on supervised training (e.g., directed to an autoencoder or some variations of a GAN), using so-called paired images. An example of a paired image is a pair of images of a same sample area (such as a same tile of a same flow cell). Thus, each of the images of a pair of images is of a same target sample of genetic material (e.g., gDNA, cDNA, RNA clusters), proteins, or polypeptides. One image of the pair is a reduced settling time image, and the other image of the pair is an unreduced settling time image. Some implementations of AI-driven enhancement of motion blurred sequencing images are based on unsupervised training (e.g., directed to a Cycle-GAN or some other variations of a GAN), using so-called unpaired images. An example of unpaired images is a collection of two sets of images. One of the sets is a set of reduced settling time images (such as of tiles of a first flow cell) and the other one of the sets is a set of unreduced settling time images (such as of tiles of a second flow cell). There is no necessary relationship between sample areas imaged for the two sets. In some circumstances, the AI-driven enhancement of motion blurred sequencing images corresponds to increasing Signal to Noise Ratio (SNR) with respect to information usable for base calling.

FIG. 1 illustrates a system 110 implementing a GAN for AI-driven enhancement of motion blurred sequencing images. The upper portion of the figure illustrates a training context 102 (such as using a laboratory sequencing by synthesis instrument), and the lower portion illustrates a production context 114 (such as using one or more sequencing by synthesis production instruments). From left to right the figure illustrates flow cell 110, imaging 120, and NN sections 130. The training context NN section comprises a GAN having Generator (G) 132, Discriminator (D) 136, and Pixel-wise Loss function elements 138. The production context NN section comprises a Generator (G) element 144 that produces Enhanced Images 146. In some implementations, the training context NN section and/or the production context NN section use, e.g., one or more convolutional layers to provide training and/or production functions and are therefore sometimes referred to as using CNNs. In various implementations, the training context NN section and/or the production context NN section are based on a transformer architecture, such as including one or more attention mechanisms. In various implementations, the Generators (G) 132 and 144 is based on a convolutional architecture and the Discriminator (D) 136 is based on a transformer architecture, and vice-versa. The illustration is applicable to training using paired images as well as training using unpaired images.

During training, images of tiles of flow cells are taken and used to learn parameters (sometimes referred to as weights) of the training context NN. Reduced settling time images 126 (such as taken using reduced, e.g., short, movement settling time) and unreduced settling time images 124 (such as taken using unreduced, e.g., long, movement settling time) are collected either paired or unpaired, according to various implementations. The collected images (sometimes referred to as training images) are accessed and processed by the training context NN to learn the parameters. The accessing and processing are in accordance with the collected images being paired or unpaired, according to various implementations. All or any portions of the parameters conceptually correspond to an intermediate representation of the unreduced settling time images such as with respect to the reduced settling time images, e.g., information relating to filters of the training context NN. After training is complete, the intermediate representation is provided to the production context NN for use in enhancing images taken at the reduced settling time, as illustrated by Trained Generator Filter Info 142. The enhanced images, in some scenarios, are of a quality approaching that of images taken at the unreduced settling time.

During production, singleton images, such as one image for each one of a plurality of tiles of a flow cell, are used for base calling. Sample areas are imaged at the reduced settling time, producing production reduced settling time images 126 (sometimes referred to as production images). The production reduced settling time images 126 are accessed by the production context NN. The production context NN adds information based on the Trained Generator Filter Info 142 to the production reduced settling time images 126 to substantially recover enhanced images 146, as if the enhanced images 146 were taken at the unreduced settling time. The enhanced images are then used for analysis in base caller 128. Thus, during production, the settling time used for imaging is reduced from the unreduced (long) settling time to the reduced (short) settling time.

Returning to the training, the training NN Generator (G) 132 learns to generate so-called fake unreduced settling time images that closely resemble the (real) unreduced settling time images of the flow cells and provides them to the training NN Discriminator (D) 136 (conceptually indicated by the arrow labeled Fake). The Discriminator (D) 132 learns to distinguish between the fake unreduced settling time images and the real unreduced settling time images. Discriminator-sourced updates to parameters of the Generator (G) 132 and to parameters of the Discriminator (D) 136 are indicated conceptually in the figure by the dotted arrow Discriminator Updates from the Discriminator (D) 136 to the Generator (G) 132 and the Discriminator (D) 136. Additional updates to parameters of the Generator (G) 132 are indicated conceptually in the figure by the dotted arrow Pixel-Wise Updates from the Pixel-Wise Loss element 138 to the Generator (G) 132.

Processing proceeds by initializing parameters of the training NN Generator (G) 132 and Discriminator (D) 136, accessing training images, propagating forward through the Generator (G) 132 and the Discriminator (D) 136, updating the parameters (e.g., via gradient descent and associated back propagation), and iterating the accessing/propagating/updating until an end condition is met. The initializing parameters comprises setting parameters of the Generator (G) 132 and setting parameters of the Discriminator (D) 136 to starting values, e.g., randomly within a predetermined range and/or distribution. Alternatively, as described regarding a pretraining implementation, all or any portions of the parameters are pretrained, such as a portion of parameters of the Generator (G) 132 and/or all the parameters of the Discriminator (D) 136. The accessing images comprises accessing reduced settling time images of tiles of flow cells and unreduced settling time images of tiles of flow cells.

The propagating forward through the Generator (G) 132 comprises performing computations based on data of the reduced settling time images (e.g., pixel data values) and the parameters of the Generator (G) 132. The computations are in accordance with the neural network architecture of the Generator (G) 132 and produce fake unreduced settling time images (fake 134). The propagating images forward through the Discriminator (D) 136 comprises performing computations based on data of the reduced settling time images (e.g., pixel data values) and on data of the fake unreduced settling time images (e.g., pixel data) from the Generator (G) 132. The computations are in accordance with the neural network architecture of the Discriminator (D) 136 and produce information to update the parameters of the Generator (G) 108 and the Discriminator (D) 136.

Conceptually the reduced settling time image of a pair of images is processed by the Generator (G) 132 to create a fake unreduced settling time image 132. Then fake 134 is evaluated by the Discriminator (D) 136 to output a metric, e.g., a score, that represents whether the Discriminator (D) 136 believes the image is real or fake. This metric is compared to whether the image is a true or fake unreduced settling time image to calculate a discriminator loss. In some instances, this process is repeated with an unreduced settling time image to calculate the discriminator loss. Multiple real unreduced settling time images, fake unreduced settling time images, or mix of both, according to various implementations, are processed simultaneously and/or collectively to calculate an aggregate discriminator loss. A pixel-wise loss 138 is computed between the reduced settling time images 122 and unreduced settling time images 124 of the pair. Discriminator updates (related to the discriminator loss) are determined and used to update parameters of the Generator (G) 132 and the Discriminator (D) 136. Pixel-wise updates 134 (related to the pixel-wise loss) are determined and used to update parameters of the Generator (G) 132.

The updating the parameters comprises the Discriminator (D) 136 evaluating one or more loss functions and determining discriminator-sourced updates to the parameters of the Generator (G) 108 and the Discriminator (D) 136, such as via gradient update and/or gradient descent techniques. The updating the parameters further comprises the Pixel-Wise Loss element 138 determining pixel-wise updates 140 to the parameters of the Generator (G) 132 such as via a pixel-wise loss function and/or via gradient update and/or gradient descent techniques. The pixel-wise loss function compares, on a small region-by-region basis (such as a single pixel or a small number of contiguous pixels), image data of the unreduced settling time image of a pair of images with a corresponding fake 134 produced by the Generator (G) 132 based on image data of the reduced settling time image of the pair. The unreduced settling time image 124 is considered the ground truth for the comparison against the fake unreduced settling time image produced by the Generator (G) 132. The comparison is via any combination of any one or more of a mean squared error loss and/or any other suitable small region image data comparison technique. The discriminator-sourced updates and the pixel-wise updates are then applied to the parameters of the Generator (G) 132 and the Discriminator (D) 36.

In various implementations, the comparison is via any combination of any one or more of a technique that accounts for local area around a particular pixel (e.g., SSI), PSNR, PSF and/or FWHM of a PSF, a Wasserstein-based metric, and variability in intensities for a single sequencing cycle. In various implementations, the comparison is based on intermediary activations of a NN. For example, comparing activation of the $5^{th}$ layer of a 10-layer discriminator when inputting a real vs fake reduced settling time image. Conceptually, comparing intermediary activations corresponds to comparing the similarity of real and fake reduced settling time images in a latent space defined by the discriminator.

In some implementations, such as some implementations based on unpaired training images, the Pixel-Wise Loss element 138 and the Pixel-Wise Updates 140 are omitted.

The iterating comprises repeating the accessing images, the propagating images, and the updating the parameters, and the repeating continues until the end condition is met, e.g., one or more completion criteria are met. In various implementations, the iterating is variously conditional on processing each of the unreduced settling time images at least once, processing each of the reduced settling time images at least once, processing a mini-batch quanta of image data, an optimization criterion reaching a corresponding threshold, an error term reaching a corresponding threshold, and any other criteria suitable for determining that sufficient training has occurred for the production context to successfully enhance reduced settling time images.

In some implementations represented by FIG. 1, training of the NN is performed at least in part by pretraining the GAN. For example, the Generator (G) 132 and Discriminator (D) 136 are trained with unreduced settling time images 124 before being trained with paired and/or unpaired images that include reduced settling time images 122.

In some GAN pretraining implementations, the Generator (G) 132 has two sections, a conditional section and a generative section. The conditional section receives a reduced settling time image as input, processes it through a plurality of layers, and produces a key as an output. The generative section receives the key as input, processes it through a plurality of layers, and maps the key to a unique fake 134. In some GAN pretraining implementations, the Discriminator (D) is substantially similar to or identical to the Discriminator (D) 136 illustrated and described with respect to FIG. 1.

Pretraining proceeds as follows. The generative section of the Generator (G) 132 is used. In each iteration, the generative section is seeded with a random key, for example the key is an array of floating-point numbers sampled from a normal distribution. The size of the key is optionally a tunable hyperparameter. The generative section maps the key to a unique fake unreduced settling time image. The Discriminator (D) 136 differentiates between the fake 134 and a real unreduced settling time image 124. The losses from the discriminator are used to update the generative section and the Discriminator (D) 136. The iterations continue until a desired performance is attained.

After the generative section and the Discriminator (D) 136 have been pretrained, the conditional section of the Generator (G) 132 is included, and training of the NN proceeds as described elsewhere herein, with parameters that have been initialized by the pretraining rather than, e.g., randomly. In some implementations, after the inclusion of the conditional section of the Generator (G) 132, subsequent training of the NN in its entirety proceeds end-to-end. In some implementations, after the inclusion of the conditional section of the Generator (G) 132, subsequent training of the NN proceeds by starting with the parameters of the generative section remaining unchanged and then later enabled to change, e.g., for fine-tuning.

In some usage scenarios, pretraining the GAN is motivated as follows. AI-driven enhancement of motion blurred sequencing images using GANs implements a complex process of mapping a reduced settling time image to a point in a distribution of unreduced settling time images, and then mapping that point back to an unreduced settling time image. Pretraining the GAN enables the Generator (G) 132 to learn the distribution of unreduced settling time images 124 independent of any influence from the reduced settling time images 122. Conceptually, the Generator (G) 132 becomes proficient by learning simple elements before learning complex elements. The key serves to create a seed for a mapping to a unique image in the learnt distribution. Thus, in some implementations, the output of the conditional section is multi-dimensional. Stated another way, in some implementations, the key is one-dimensional (e.g., a 1D array) and in other implementations the key is multi-dimensional.

In some pretraining implementations, the conditional section produces an image, such as a full-resolution image, in addition to the key. The generative section receives the image as well as the key. Pretraining of the generative section is modified to accommodate the image that is received in addition to the key.

In the training context, a Synthetic path is indicated from the Unreduced Settling Time Images 124 element to the Reduced Settling Time Images 122 element, illustrating optional production of synthetic reduced settling time images from unreduced settling time images 124. In some implementations, unreduced settling time images 124 are collected by imaging at unreduced (e.g., long) settling time and reduced settling time images are collected by processing one or more of the unreduced settling time images to produce synthetic reduced settling time images, using the Synthetic path. See, for example, FIG. 8A and associated description. The synthetic reduced settling time images are then used in training as if collected by imaging at the reduced settling time. In some implementations, the Synthetic path is unused, and unreduced settling time images 124 as well as reduced settling time images 122 are collected by respectively imaging at unreduced (e.g., long) settling time and reduced (e.g., short) settling time. See, for example FIG. 7, as well as associated description. In various implementations, various combinations of images collected by imaging at reduced settling time, synthetic reduced settling time images, and proxy-collected reduced settling time images are used for training.

In some implementations, such as illustrated explicitly in the figure, the training NN Generator (G) 132 (such as embodied in a laboratory instrument) is distinct from the production NN Generator (G) 144 (such as embodied in a production instrument), and Trained Generator Filter Info 142 is provided from the training NN Generator (G) 132 to the production NN Generator (G) 144. In some implementations, not illustrated, the training NN Generator (G) 132 is used after training as the production NN Generator (G) 144, and the Trained Generator Filter Info 142 is used in situ for production. E.g., an instrument is used as a dual-purpose laboratory instrument and production instrument (see FIG. 4 for an explicit illustration of an implementation having a dual-purpose laboratory instrument and production instrument).

Figure 2A:
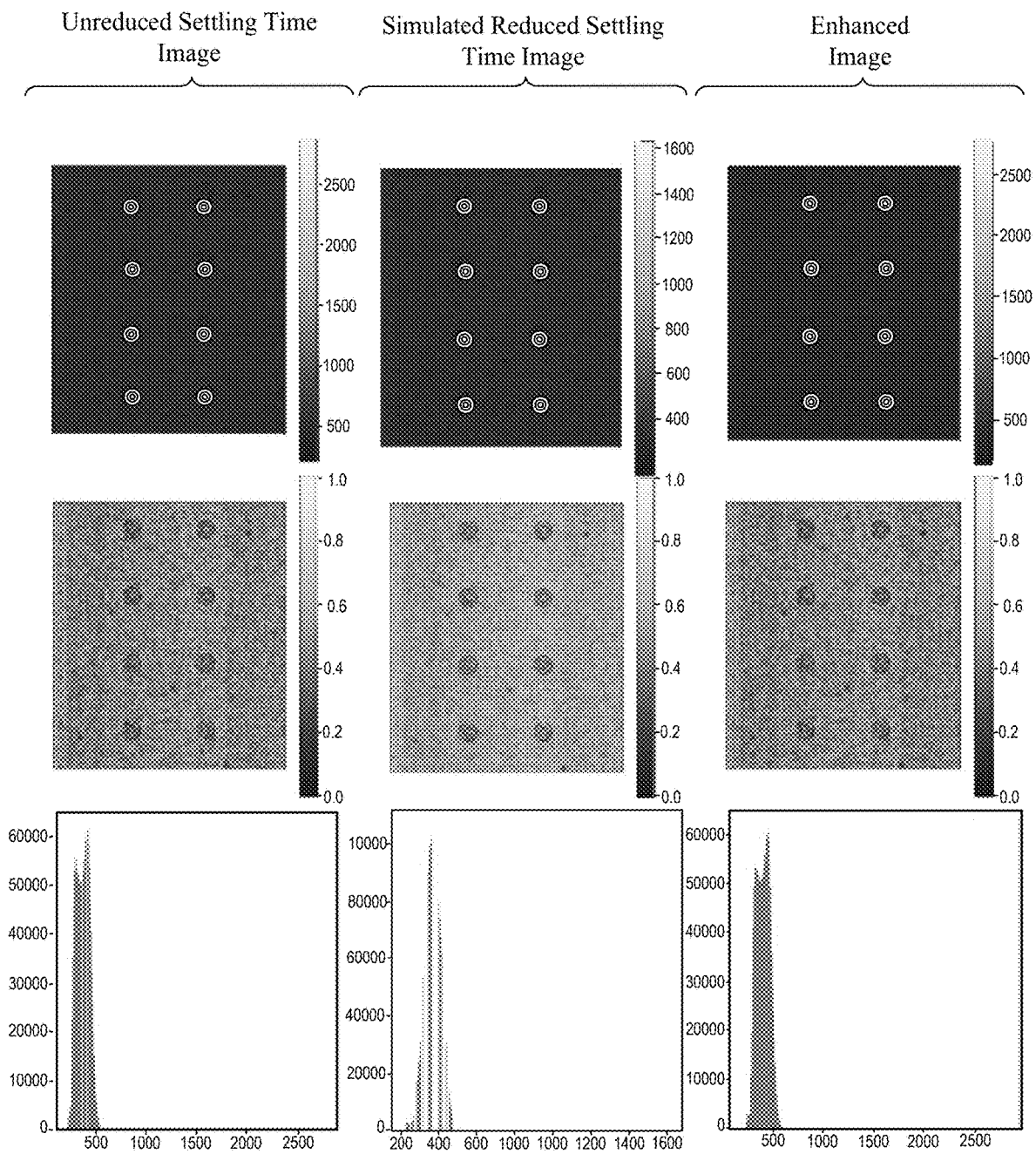
FIGS. 2A-B illustrate example images of unreduced settling time, a simulated reduced settling time, and an enhanced image produced by AI-driven enhancement of motion blurred sequencing images taken at the simulated reduced settling time.
Figure 2B:
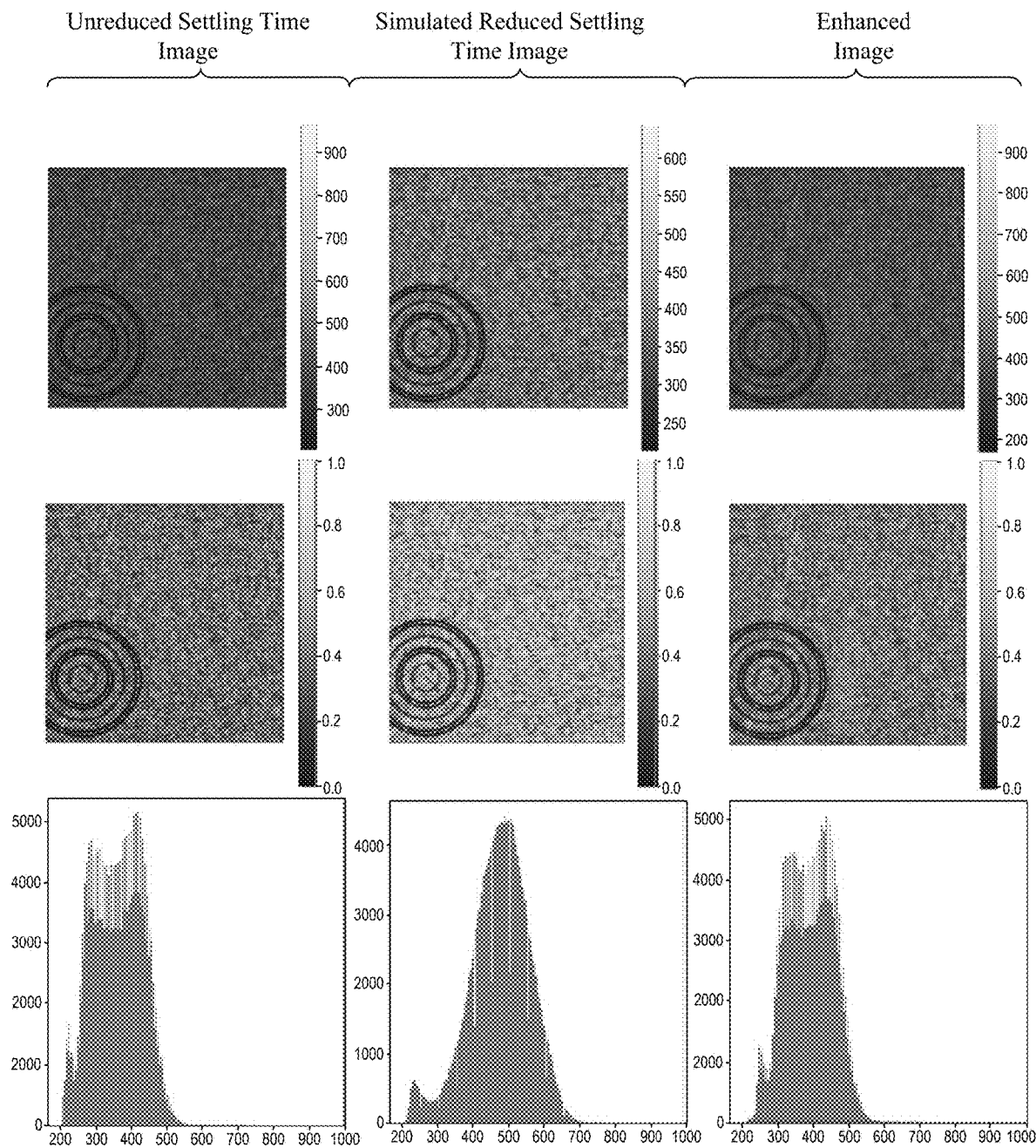

FIGS. 2A-B illustrate example images taken at an unreduced settling time, a simulated reduced settling time, and an enhanced image produced by AI-driven enhancement of motion blurred sequencing images taken at the simulated reduced settling time. FIG. 2A illustrates an entire flow cell. FIG. 2B is a zoomed in view near one of the fiducials of FIG. 2A. In each of the figures, the top row illustrates raw images, the middle row illustrates normalized images, and the bottom row illustrates intensity histograms of the images. In some implementations, normalized images are used and/or produced by one or more preprocessing operations for use by subsequent neural network processing.

Figure 3:
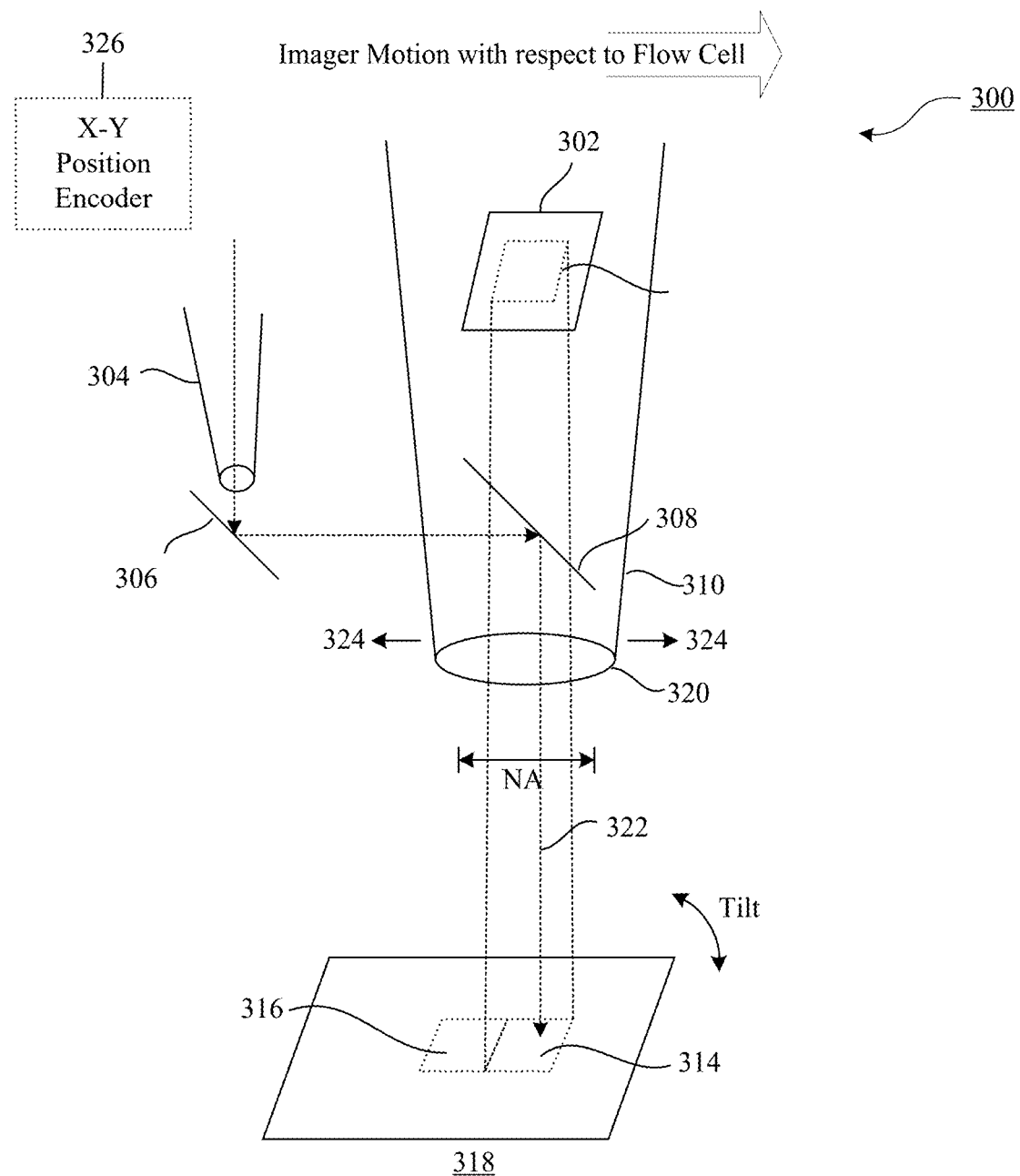
FIG. 3 illustrates, generally, elements for imaging flow cells, as well as example opportunities for flow cell image improvement, enhancement, refinement, and/or other operations such as to enable improved base calling during sequencing.

FIG. 3 illustrates, generally, elements for imaging flow cells, as well as example opportunities for flow cell image improvement, enhancement, refinement, and/or other operations such as to enable improved base calling during sequencing by synthesis. The example opportunities arise as an imager is repositioned from one tile the next ('step' of step-and-shoot) and then one or more lasers illuminate a tile of a flow cell to stimulate fluorescence that is then imaged by a sensor of an imager ('shoot' of step-and-shoot). The improved flow cell imaging includes, for example, flow cell image improvement, enhancement, refinement, and/or other operations such as to enable improved base calling during sequencing by synthesis.

The flow cell 318 is generally planar and comprises a plurality of generally parallel lanes imaged sequentially (point-and-shoot) as a series of tiles organized, e.g., as one or more columns or alternatively imaged continuously (continuous scanning) and processed as a series of one or more tiles. The imager comprises the sensor 302, a semi-reflective mirror 308, and an objective 320. In some implementations, the lasers 304 and the imager 310, as well as a mirror 306 positioned to direct emissions of the lasers toward the semi-reflective mirror, are arranged in a module.

In some implementations, the imager 310 and the flow cell 318 are moved relative to each other (such as by the flow cell proceeding on a movable platform along a predetermined path or by the imager and the lasers repositioning with respect to the flow cell as images are taken), as indicated by arrow Imager Motion with respect to Flow Cell. In point-and-shoot implementations, the Previously Imaged Tile 316 and the Tile Imaged at Reduced/Unreduced Settling Time 314 represent two contiguous elements of the series of tiles, one imaged after the other. In continuous scanning implementations, the Previously Imaged Tile 316 and the Tile Imaged at Reduced/Unreduced Settling Time 314 represent two contiguous regions of a portion of a lane of a flow cell (or alternatively a column thereof) that correspond to elements of the series of tiles.

In some implementations, the movable platform (sometimes referred to as a stage) comprises a flow cell receiving surface enabled to support the flow cell. In some implementations, a controller is coupled to the stage and the optical assembly. Some implementations of the controller are configured to move the stage and the optical assembly relative to each other in a step-and-shoot manner, sometimes referred to as a step and settle technique (e.g., X-Y position encoder 326). Some implementations of the controller are configured to image a tiled region prior to settling of the relative movement of the stage and the optical assembly. Some implementations of the controller are configured to image a tiled region after settling of the relative movement of the stage and the optical assembly. In various implementations, a biological sequencing instrument (such as a laboratory instrument or a production instrument) comprises all or any portions of elements depicted in the figure. In various implementations, the biological sequencing instrument comprises the stage, the optical assembly, and/or the controller.

In operation, the imager 310 is moved with respect the flow cell 318 as indicated by the wide arrow (Imager Motion with respect to Flow Cell), thus repositioning the imager from alignment with the first tile (Previously Imaged Tiled) 316 to alignment with the second tile (Tile Imaged at Reduced/Unreduced Settling Times) 314. Imaging proceeds by operating the lasers. Emission of the lasers is reflected off the mirror onto the semi-reflective mirror and then reflected off the semi-reflective mirror to illuminate the tile of the flow cell 318, as illustrated by a dashed arrow (Power) 322 directed to the second tile (Tile Imaged at Reduced/Unreduced Settling Times) 314. Responsive to the illumination, fluorophores of the tile fluoresce. Light from the fluorescing passes through the objective 320 for focusing and continues through the semi-reflective mirror 308 forming an image (Tile Imaged at Reduced/Unreduced Settling Times) 312. The image is captured by a sensor (Sensor) 302.

As a specific operating example, a full movement settling time delay transpires before capturing an image (an "Unreduced" movement settling time, corresponding to an unreduced movement settling time image). As another specific operating example, less than a full movement settling time delay transpires before capturing an image (a "Reduced" movement settling time, corresponding to a reduced movement settling time image). Images captured before the full movement settling time delay transpires are captured while there is relative movement between the imager and the tile. Therefore, the images are subject to motion blur 324, and appear degraded with respect to images captured after the full movement settling time delay transpires. Thus, capturing reduced movement settling time images (conceptually represented as instances of "Motion Blur" in the figure) is one of the example opportunities for improved flow cell imaging.

Other instances of the example opportunities for improved cell imaging include reduced excitation power, tilt and/or non-planar blur, and a reduced numerical aperture of the imager.

The reduced excitation power (conceptually illustrated by "Power" 322 in the figure), for instance, is introduced by fluorescence-inducing illumination using one or more lasers operating at a reduced excitation power. The reduced excitation power results in images that are degraded with respect to images taken using unreduced excitation power.

The tilt and/or non-planar blur (conceptually illustrated by "Tilt" in the figure), for instance, is introduced by differences in distance between the imager and various areas of a tile being imaged. For example, a nominally planar flow cell is out of optical alignment (e.g., tilted) with respect to the imager so that different portions (e.g., or more edges) of a same tile are at different distances from the imager. Thus, dependent on depth of field of the imager, one of the portions is improperly focused and thus degraded. For another example, an otherwise nominally planar flow cell has an imperfection so that one portion of a tile is closer to the imager than another portion of the tile.

The reduced numerical aperture of the imager (conceptually illustrated by "NA" in the figure), for instance, is introduced by using an imager of a lower numerical aperture compared to an imager of a larger numerical aperture. The lower numerical aperture results in images that are degraded with respect to images taken with the imager of the larger numerical aperture.

In some implementations, an X-Y Position Encoder 326 is included. The X-Y Position Encoder 326 measures an x-y position in real-time of the imager 310 with respect to the flow cell 318 and/or tile therein. Sometimes the x-y position measurements are referred to as x-y stage positions of images or simply x-y stage positions. Results of the measurements are usable during a pre-run check of an instrument. In some implementations, results of the measurements are usable to provide an estimate of expected amount of motion blur 324 in an image. For example, there are differences in motion blur responsive to the imager 310 being located near an edge of a flow cell 318 versus being located near the center of the flow cell 318. Information from the measurements enables processing dependent on the differences. In various implementations, information from the measurements is provided to training and/or production contexts, such as via metadata included in training and/or production images.

For a specific example, during the training described with respect to FIG. 1, information from an X-Y Position Encoder 326 (such as illustrated in FIG. 3) is used along with training image data to learn parameters of the training context 102. Subsequently, during the production 104 described with respect to FIG. 1, information from the X-Y Position Encoder 326 is used along with production image data to produce enhanced images 146. For other specific examples, any of the training and the production described with respect to FIGS. 4, 5, 6, 14, 15, 16, 17, and 18 (described elsewhere herein) uses information from an X-Y Position Encoder 326.

In various usage scenarios, generalizing AI-based denoising to new noise profiles is challenging (e.g., an AI-model trained to remove Gaussian white noise with σ=x performs worse when σ=y). In various implementations, using information from an X-Y Position Encoder 326 during training and/or production of an AI model (such as any of the NN portions described elsewhere herein) conceptually acts to feed knowledge about an expected noise source into the AI model during the training and/or the production, thus enabling improved AI-based denoising performance.

Figure 4:
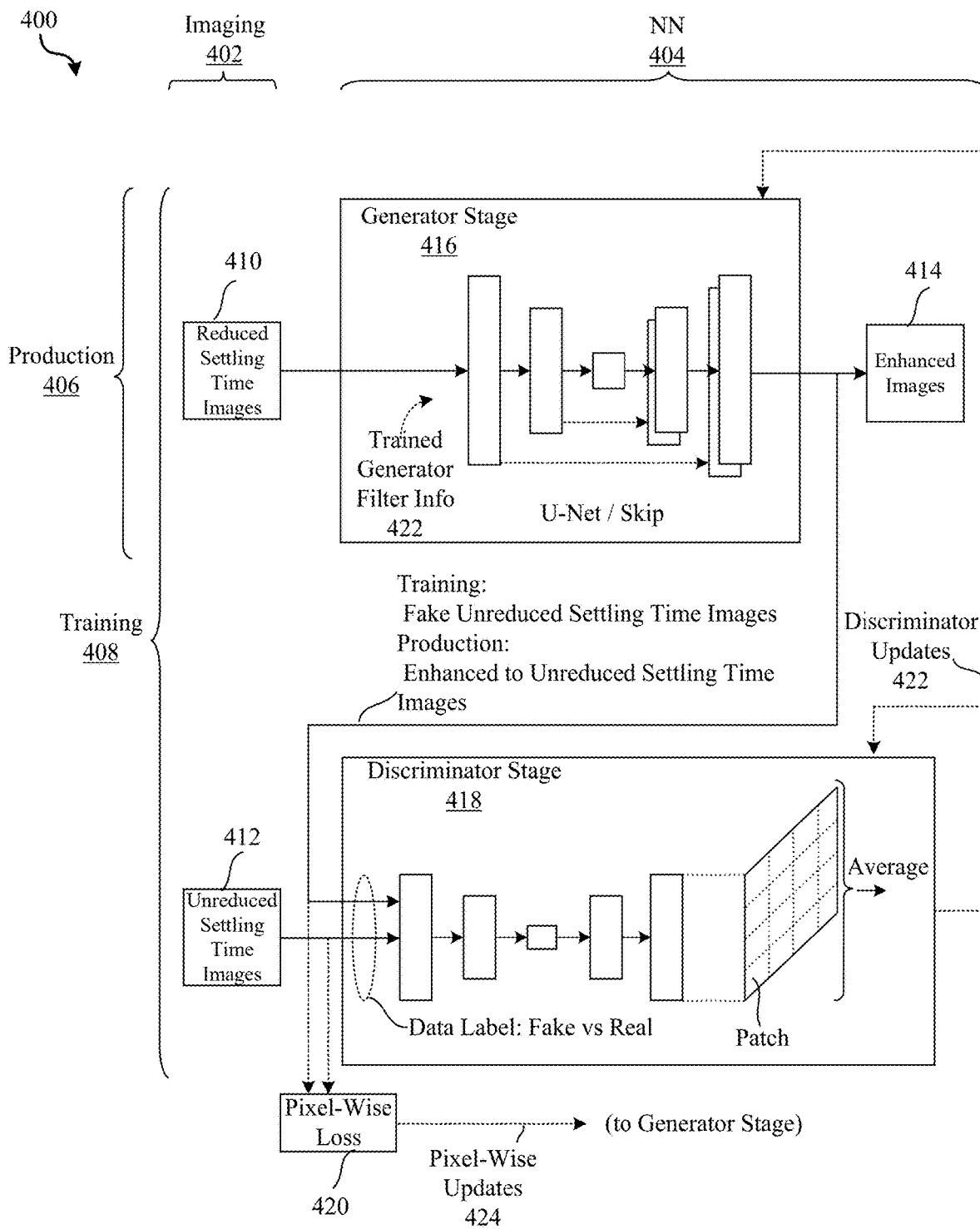
FIG. 4 illustrates AI-driven enhancement of motion blurred sequencing images using a Conditional Generative Adversarial Network (CGAN) having a U-Net-based generator stage and a patch-based discriminator stage.

AI-Driven Enhancement of Motion Blurred Sequencing Images-Further Example Implementations FIG. 4 illustrates a system 400 implementing a Conditional Generative Adversarial Network (CGAN) for AI-driven enhancement of motion blurred sequencing images. In the example, the GGAN has a U-Net-based generator stage 432 and a patch-based discriminator stage. The entirety of the figure illustrates a training context 408 (such as using a laboratory sequencing instrument), and the upper portion also illustrates a production context 406 (such as using one or more sequencing production instruments). From left to right the figure illustrates imaging 402 and NN sections 404. The imaging section derives image data from imaging flow cells (not illustrated for clarity). The training context NN section comprises a CGAN having Generator Stage 404, Discriminator Stage 418, and Pixel-wise Loss function elements 420. The production context NN section comprises the Generator Stage element 416 that produces Enhanced Images 414 for use in base calling (not illustrated for clarity). In some implementations, the training context NN section and/or the production context NN section use, e.g., one or more convolutional layers to provide training and/or production functions and are therefore sometimes referred to as using CNNs. The illustration is applicable to training using paired images.

The operating context and operation of the CGAN of FIG. 4 are similar to the GAN of FIG. 1 as implemented based on paired training images. Conceptually, the Generator Stage 416 of FIG. 4, in the training context and operation, corresponds to the training NN Generator (G) 132 of FIG. 1. The Discriminator Stage 418 of FIG. 4, in the training context and operation, corresponds to the training NN Discriminator (D) 136 of FIG. 1. The Generator Stage 416 of FIG. 4, in the production context and operation, corresponds to the production NN Generator (G) 144 of FIG. 1. In contrast to FIG. 1, FIG. 4 (as illustrated) is operable only with paired images (e.g., as collected as illustrated and described with respect to FIG. 7 and FIG. 8A). In view of the foregoing correspondences, training of the Generator Stage 416 and Discriminator Stage 418 of FIG. 4 proceeds as that of the training NN Generator (G) 132 and the training NN Discriminator (D) 136 of FIG. 1 when operating with paired data.

Therefore, similar to the GAN of FIG. 1 operating with paired images, during training, the CGAN of FIG. 4 uses paired reduced settling time images 410 and unreduced settling time images 412 to learn parameters of the Generator Stage 416 and Discriminator Stage 418. All or any portions of the parameters conceptually correspond to an intermediate representation of the unreduced settling time images 412 such as with respect to the reduced settling time images 410, e.g., information relating to filters of the training context NN. After training is complete, the intermediate representation is available for the production context NN (the Generator Stage) for use in enhancing images taken at the reduced settling time, as illustrated by Trained Generator Filter Info 422. The enhanced images, in some scenarios, are of a quality approaching that of images taken at the unreduced settling time.

During production, similar to the GAN of FIG. 1, singleton images, such as one image for each one of a plurality of tiles of a flow cell, are collected and processed for base calling. Sample areas are imaged at the reduced settling time, producing production reduced settling time images that are accessed by the production context NN (the Generator Stage 416). The production context NN adds information based on the filters of the training context NN to the production reduced settling time images to substantially recover enhanced images 414, as if the enhanced images 414 were taken at the unreduced settling time. The enhanced images 414 are usable for base calling. Thus, during production, the settling time used for imaging is reduced from the unreduced (long) settling time to the reduced (short) settling time.

Turning to the Generator and Discriminator Stages of FIG. 4, the Generator Stage 416 comprises an encoder-decoder with skip connections, forming a so-called U-Net style NN architecture. Randomness is introduced via dropout layers that are active during training as well as production. Conceptually, the encoder downsamples the reduced settling time images and then the decoder upsamples results of the encoder to formulate the enhanced images. Stated another way, conceptually the encoder compresses the reduced settling time images and then the decoder uncompresses results of the encoder. During training, the parameters of the encoder and the decoder are updated to effectively represent information salient to the enhancing. All or any portions of the parameters at completion of the training are referred to as filters. The skip connections enable sharply focused image enhancement by providing same-resolution information from an early layer to a later layer with a same resolution, "skipping" intervening compressing/decompressing layers.

The Discriminator Stage 418 comprises a classifier with a patch-based averaging layer, forming a so-called convolutional PatchGAN classifier. Training includes labeling images (conceptually illustrated in the figure by the dotted ellipse identified as Data Label: Fake vs Real) from the Generator Stage 416 (Fake Unreduced Settling Time Images) as fake and imaging images (Unreduced Settling Time Images) as real. Classification is determined by an output layer that independently classifies individual patches of the output as real or fake (e.g., each patch classification is represented by a corresponding respective scalar value) and then averages results of the independent individual patch classifications into an overall image classification (e.g., 'fake' or 'real' or a probability thereof represented by a single scalar value), hence the PatchGAN nomenclature. As illustrated, in some implementations the output layer is sized to match sizes of the Fake Unreduced Settling Time Images and (real) Unreduced Settling Time Images input to the Discriminator Stage. The dotted-line rectangles in the illustrated projection of the output layer are illustrative of the individual patches, one of which is identified as Patch in the figure.

The Discriminator Stage 418 provides information for updating parameters of the Generator Stage 416 and the Discriminator Stage 418, as indicated conceptually in the figure by the dotted arrow Discriminator Updates from the Discriminator Stage 418 to the Generator Stage 416 and the Discriminator Stage 418. The Discriminator Updates 422 correspond to an adversarial-based loss, such as represented by the example equation of FIG. 20B. The Pixel-Wise Loss element 420 provides further information for updating parameters of the Generator Stage, as indicated by the dotted arrow Pixel-Wise Updates 424 that feeds to the Generator Stage 416. The Pixel-Wise Loss Updates correspond to a distance-based loss, such as represented by the example equation of FIG. 20A. In some implementations, the Generator Stage 416 is updated in accordance with a weighting of an adversarial-based loss and a distance-based loss, such as represented by the example equation of FIG. 20C.

In some implementations, such as illustrated explicitly in the figure, the Generator Stage 416 is used for training as well as for production. E.g., an instrument is used as a dual-purpose laboratory instrument and production instrument. Trained generator filter info produced in the Generator Stage 416 (as a result of training) is used in situ for production. In some implementations, not illustrated, there are at least two instantiations of the Generator Stage, 416 a first for training (such as embodied in a laboratory instrument) and a second or more for production (such as embodied in one or more production instruments), and the trained generator filter info produced in the training instantiation of the Generator Stage 416 is provided to the production instantiations of the Generator Stage 416 for production (see FIG. 1 for an explicit illustration of an implementation having a laboratory instrument separate from production instruments).

In some implementations related to FIG. 4, training is based on unpaired images, and the Pixel-Wise Loss element 420 and the Pixel-Wise Updates 424 are omitted.

Isola et al. discloses various techniques applicable to some implementations related to FIG. 4.

Figure 5:
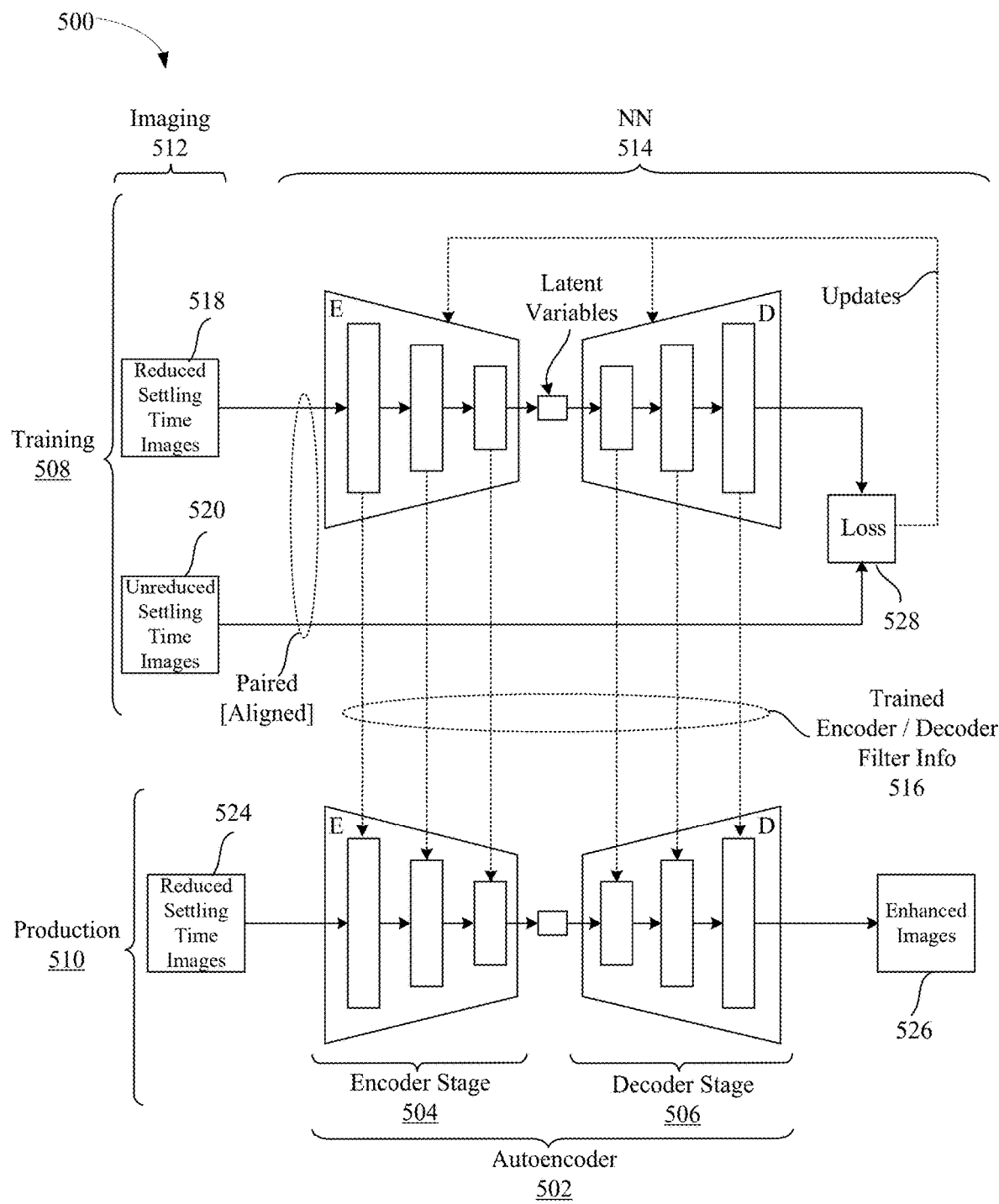
FIG. 5 illustrates AI-driven enhancement of motion blurred sequencing images using an autoencoder having an encoder stage and a decoder stage.

FIG. 5 illustrates a system 500 including NN 530 implementing an autoencoder 532 with AI-driven enhancement of motion blurred sequencing images using an autoencoder 502 having an encoder stage (E) 504 and a decoder stage (D) 606. The upper portion of the figure illustrates a training context 506 (such as using a laboratory sequencing instrument), and the lower portion illustrates a production context 508 (such as using one or more sequencing production instruments). From left to right the figure illustrates imaging 512 and NN sections 514. The imaging section derives image data from imaging flow cells (not illustrated for clarity). The training context NN section comprises a training autoencoder 502 having an encoder stage (E) 504 and a decoder stage (D) 506. The production context NN section comprises a production autoencoder 502 having an encoder stage (E) 504 and a decoder stage (D) 506. In some implementations, the training context NN section and/or the production context NN section use, e.g., one or more convolutional layers to provide training and/or production functions and are therefore sometimes referred to as using CNNs. The illustration is applicable to training using paired images.

The operating context and operation of the autoencoder 502 of FIG. 5 are similar to the GAN of FIG. 1. Conceptually, the training context autoencoder 502 of FIG. 5, in the training context and operation, corresponds to the training context GAN of FIG. 1. The production context autoencoder 502 of FIG. 5, in the production context and operation, corresponds to the production NN Generator (G) 144 of FIG. 1. In contrast to FIG. 1 and like FIG. 4 (as illustrated), FIG. 5 is operable only with paired images (e.g., as collected as illustrated and described with respect to FIG. 7 and FIG. 8A). In view of the foregoing correspondences, training of the training context autoencoder of FIG. 5 proceeds via accessing of paired training images. The reduced settling time image of a pair of images 518 is processed by the autoencoder 502 and the result is compared to a ground truth, e.g., the unreduced settling time image of the pair. A distance-based loss function, such as an L1 loss function, is used in part to determine updates to parameters of the autoencoder. Parameter updates may be received by the encoder via backpropagation through the decoder, in which case backpropagation may be a unified operation through both the decoder and encoder in sequence.

Therefore, similar to the GAN of FIG. 1 operating with paired images, during training, the training context autoencoder 502 of FIG. 5 uses paired reduced settling time images 518 and unreduced settling time images 520 to learn parameters of the autoencoder 502, e.g., parameters of the encoder (E) 504 and parameters of the decoder (D) 506. All or any portions of the parameters conceptually correspond to an intermediate representation of the unreduced settling time images 518 such as with respect to the reduced settling time images, e.g., information relating to filters of the training context NN. After training is complete, the intermediate representation is provided to the production context autoencoder for use in enhancing images taken at the reduced settling time, as illustrated by Trained Encoder/Decoder Filter Info 516. The enhanced images, in some scenarios, are of a quality approaching that of images taken at the unreduced settling time.

During production, similar to the GAN of FIG. 1, singleton images, such as one image for each one of a plurality of tiles of a flow cell, are collected and processed for base calling. Sample areas are imaged at the reduced settling time, producing production reduced settling time images that are accessed by the production context NN (the production context autoencoder). The production context NN adds information based on the filters of the training context NN to the production reduced settling time images 524 to substantially recover enhanced images 526, as if the enhanced images 526 were taken at the unreduced settling time. The enhanced images 526 are usable for base calling. Thus, during production, the settling time used for imaging is reduced from the unreduced (long) settling time to the reduced (short) settling time.

Turning to the Encoder 504 and Decoder Stages 506 of FIG. 5, the Encoder Stage 510 comprises a plurality of layers, such as processing layers (e.g., convolutional layers), activation layers, and pooling layers of successively smaller dimensions, collectively enabled to compress representation of reduced settling time images to a relatively small representation (as illustrated conceptually by the Latent Variables element). The Decoder Stage 506 comprises layers (e.g., similar to those of the Encoder Stage) but dimensionally organized in "reverse" compared to the layers of the Encoder Stage 504, arranged in successively larger dimensions, so as to conceptually uncompress the latent variable information into a full-sized reconstructed image (e.g. corresponding to all or substantially all of a field of view of an imager) or alternatively a reconstructed image sized corresponding to input provided to the Encoder Stage 510 (e.g., corresponding to one of a plurality of small patches of an image collected by an imager). In the production context, the reconstructed image corresponds to an enhanced image with quality corresponding to that of an unreduced settling time image. During training, the parameters of the encoder and the decoder stages are updated to effectively represent information salient to the enhancing. All or any portions of the parameters at completion of the training are referred to as filters.

In some implementations, such as illustrated explicitly in the figure, the training NN autoencoder (such as embodied in a laboratory instrument) is distinct from the production NN autoencoder (such as embodied in a production instrument), and Trained Encoder/Decoder Filter Info 516 is provided from the training NN autoencoder to the production NN autoencoder. In some implementations, not illustrated, the training NN autoencoder is used after training as the production NN autoencoder, and the Trained Encoder/Decoder Filter Info is used in situ for production. E.g., an instrument is used as a dual-purpose laboratory instrument and production instrument (see FIG. 4 for an explicit illustration of an implementation having a dual-purpose laboratory instrument and production instrument). In some implementations (not illustrated), the autoencoder 502 includes skip connections between the encoder stages and the decoder stages, e.g., in a U-Net model.

Figure 6:
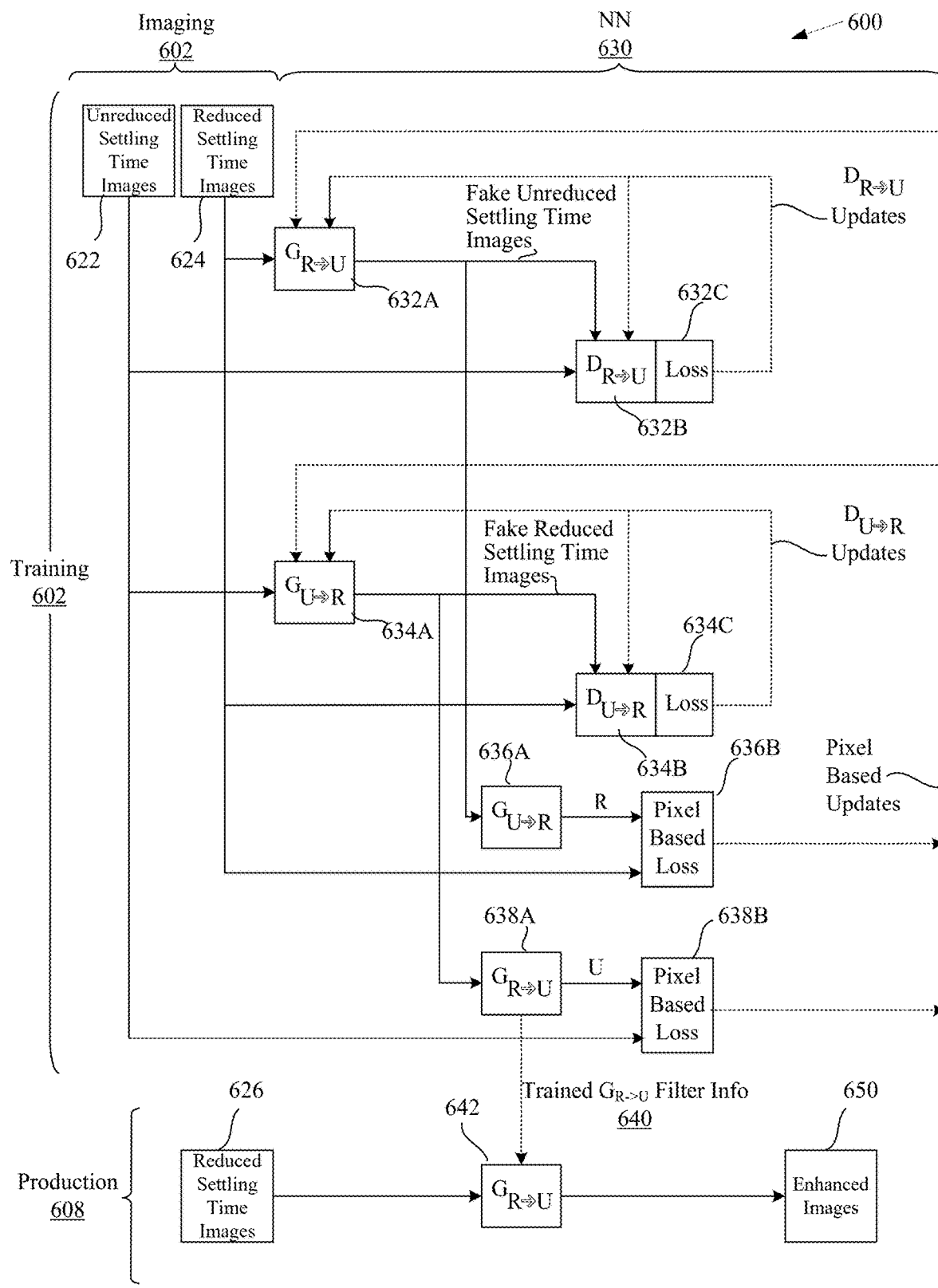
FIG. 6 illustrates AI-driven enhancement of motion blurred sequencing images using a cycle-consistent GAN.

FIG. 6 illustrates AI-driven enhancement of motion blurred sequencing images in a system 600 implementing a cycle-consistent GAN. The upper portion of the figure illustrates a training context 602 (such as using a laboratory sequencing instrument), and the lower portion illustrates a production context 608 (such as using one or more sequencing production instruments). From left to right the figure illustrates imaging 620 and NN 630 sections. The imaging section 620 derives image data, e.g., from imaging flow cells (not illustrated for clarity). The training context NN section comprises a training CycleGAN having two pairs of coupled generator and discriminator elements (632A and 632B and 634A and 634B) and a pair of associated coupled generator and pixel-based loss elements (636A and 636B and 638A and 638B). The production context NN section comprises a production generator 642. In some implementations, the training context NN section and/or the production context NN section use, e.g., one or more convolutional layers to provide training and/or production functions and are therefore sometimes referred to as using CNNs. The illustration is applicable to training using unpaired images.

The operating context and operation of the CycleGAN of FIG. 6 are similar to the GAN of FIG. 1. Conceptually, the training and production contexts of FIG. 6 correspond respectively to the training and production contexts of FIG. 1, when trained with unpaired images. After training is complete, trained parameters are provided from the training context to the production context for use in enhancing images taken at the reduced settling time, as illustrated by Trained $G_{R \to U}$ Filter Info 640. During production, singleton images taken at the reduced settling time (reduced settling time images 626) are enhanced by the production context to substantially recover enhanced images 650, as if the enhanced images were taken at the unreduced settling time. The enhanced images 650 are usable for base calling. Thus, during production, the settling time used for imaging is reduced from the unreduced (long) settling time to the reduced (short) settling time.

In some implementations, training proceeds as follows. Each of the coupled generator and discriminator elements determine loss information (632C and 634C) and corresponding parameter update information similar to the training context G and D elements of FIG. 1. One of the coupled generator and discriminator elements (632A and 632B) attempts to learn how to produce fake unreduced settling time images from the reduced settling time images. The other of the coupled generator and discriminator elements (634A and 634B) attempts to learn how to produce fake reduced settling time images from the unreduced settling time images. Each of the coupled generator and pixel-based loss elements determine distance-based loss information and corresponding parameter update information. One of the coupled generator and pixel-based loss elements (638A and 638B) information. One of the coupled generator and pixel-based loss elements 632A and 632B determines a distance-based loss function between the unreduced settling time images (interpreted as ground truth) and the fake reduced settling time images after processing back to unreduced settling time images by the $G_{R \to U}$ generator 638A. The other of the coupled generator and pixel-based loss elements (636A and 636B) determines a distance-based loss function between the reduced settling time images (interpreted as ground truth) and the fake unreduced settling time images after processing back to reduced settling time images by the $G_{U \to R}$ generator 636A. The parameter update information from the coupled generator and discriminator elements is combined with the parameter update information from the coupled generator and pixel-based loss elements to determine overall parameter updates for the discriminators and the generators, e.g., via a weighting technique.

In some implementations, the two generator elements $G_{R \to U}$ 632A and 638A in the training context are identical in operation, structure, and/or NN architecture to each other and are also identical in operation, structure, and/or NN architecture to the generator element $G_{R \to U}$ 642 in the production context. For example, the two generator elements $G_{R \to U}$ in the training context are implemented in a same ASIC. For another example, the two generator elements $G_{R \to U}$ 632A and 638A in the training context and the generator element $G_{R \to U}$ 642 in the production context are implemented via a same set of programmed instructions.

Zhu et al. discloses various techniques applicable to some implementations related to FIG. 6.

In various implementations, performance of NNs (e.g., as described with respect to the GAN of FIG. 1, the CGAN of FIG. 4, the autoencoder 502 of FIG. 5, the CycleGAN of FIG. 6, and/or other NNs described elsewhere herein) is improved by having x and y input dimensions equal to or approximately equal to x and y output dimensions. Another improvement is increasing z input dimension (e.g., by number of images and/or channels input, and/or additional encoding, such as distance to nearest cluster center). Another improvement is collecting and using information from images from multiple sequencing cycles. Other improvements include normalizing whole images (instead of sub-images), performing gradient clipping (e.g., during GAN training), regularizing norm of the gradient (e.g., during GAN training), and discarding edge artifacts (e.g., as introduced by image alignment). For various implementations of CNN-based NNs, performance is improved by using depth-wise convolutions, inverted bottlenecks, separating downsampling layers (e.g., instead of a 3×3 convolution with stride two, explicit downsampling with a 2×2 convolution with stride two), increasing kernel sizes, preferentially using layer normalization instead of batch normalization, preferentially using GELU instead of ReLU, and/or reducing layers used (e.g., fewer activation layers and/or fewer normalization layer). For various implementations of transformer based NNs, performance is improved shifting windows between attention blocks to enable encoding spatial information between patches. For some PatchGAN implementations, adaptations to attend to high spatial frequencies are beneficial.

Cumulative Sample Damage

Photon budget requirements for sequencing methodologies on Next Generation Sequencing (NGS) platforms, particularly with SBS-based processes, are relatively high. One example NGS workflow involves loading, e.g., a DNA library onto a flow cell and hybridizing individual adapter-ligated DNA fragments to adapter-specific complimentary oligonucleotides covalently bound to a flow cell surface; clustering the individual fragments into thousands of identical DNA template strands (or amplicons) through amplification (e.g., bridge or exclusion amplification); and, finally, sequencing, in which copy strands are simultaneously synthesized and sequenced on the DNA templates using a reversible terminator-based process that detects signals emitted from fluorophore tagged single bases as they are added round by round to the copy strands. Because the multiple template strands of each cluster have the same sequence, base pairs incorporated into the corresponding copy strands in each round will be the same, and thus the signal generated from each round will be enhanced proportional to the number of copies of the template strand in the cluster.

The fluorescence microscopy implemented in NGS is performed using an optical imaging system that includes a light source (e.g., lasers, light emitting diodes (LEDs)) tuned to wavelengths of light that induce excitation in the fluorescing labels (fluorophores); one or more optical instruments, such as cameras, lenses, sensors, detect and image signals emitted through induced excitation, and one or more processors for developing composite images from signals detected and imaged from a plurality of clusters within the optical elements' field of view (tile) in a given round, in which each round corresponds to an operation cycle of the imaging system. In each cycle, the plurality of clusters is exposed to excitation power. The total number of cycles corresponds to a read length of bases on the template strands of each of the clusters. Example read lengths may be 50, 75, 150, and 300 base pairs, which correspond to a respective number of total cycles. Moreover, the fluorescence chemistry of NGS requires as many as four images per cycle to capture fluorescence of each of the four base types added in a given round. For example, traditional four channel chemistry uses four different fluorescent labels, one for each base, where four images per cycle are necessary to capture fluorescence of the unique labels for each base. One example SBS-based technology have standardized involves two-channel chemistry that uses only two fluorescent labels and two images to determine all four base calls. Images are taken using blue and green filter bands, where Thymines are labeled with a green fluorophore, cytosines are labeled with a blue fluorophore, adenines are labeled with both blue and green fluorophores, and Guanines are permanently dark. Other fluorophores may be used, such as other fluorophores in the visible and non-visible spectrum. These exposure requirements apply whether the sequencing run is conducted in the context of production or training, as described herein.

Samples are susceptible to photodamage and/or photobleaching from repeated exposure to the high-intensity light required to excite fluorophores. Photodamage to the target nucleic acid materials may arise due to generation of chemically reactive species such as free radicals and specifically singlet and triplet forms of oxygen, which can interact with nucleic acid molecules to cause depurination/depyrimidination, hydrolytic deamination and base conversion. Acquired photodamage results in image artifacts and aberrations, and the quality of the data of the signal of interest declines according to a logarithmic decay function with cumulative exposure to excitation over the course of a sequencing run. Photobleaching of the fluorescent labels damage the fluorophore such that the fluorophore has reduced fluorescence (i.e., dimming) or may cease to fluoresce. (See, e.g., FIG.

22, SNR over a sequencing run, in which line 2202 represents fully corrected SNR between Cytosine and Guanine clouds (blue channel), and line 2204 represents fully corrected SNR between Guanine and Thymine clouds (green channel).)

In some implementations, imaging using more than one excitation power is performed in order of increasing excitation power, the lowest being performed first and the highest being performed last. In some implementations, imaging using more than one excitation power is performed back and forth between excitation powers, such as performing imaging at a lower power, then at a higher power, than returning to the lower power, and so forth.

In addition to sample and/or dye damage caused by exposure to excitation power, in some scenarios, some oligos of a cluster fall out of sync, e.g., out of phase with respect to other oligos of the cluster. Nominally, during each sequencing by synthesis cycle, the chemical actions result in one fluorophore being added to each of the oligos of the cluster. However, in some scenarios, the chemical actions fail to add the one fluorophore to each of the oligos. For example, a failure results in no fluorophore being added to an oligo, resulting in so-called phasing. For another example, a failure results in adding two or more fluorophores to an oligo in a single sequencing cycle, resulting in so-called pre-phasing. The phasing and pre-phasing failures are cumulative over the sequencing cycles, similar to the damage caused by exposure to excitation power.

Paired Image Collection

In some implementations, capturing a paired image comprises capturing two images of a same tile of a flow cell. Each of the two images is of a same target sample of a biological material (e.g., DNA, RNA, polypeptide). One of the images of the pair is a reduced settling time image and the other image of the pair is an unreduced settling time image. In some implementations, the reduced settling time image is collected before the unreduced settling time image, such as to reduce sample damage. Capturing of paired images is repeated, e.g., for the entirety of tiles of the flow cell, and optionally for tiles of additional flow cells.

For example, an imager images a tile of a flow cell at the reduced settling time and then at the unreduced settling time, without moving the flow cell and the imager with respect to each other. The reduced and the unreduced settling time images collectively form a paired image of the tile. Then the flow cell and the imager are moved with respect to each other to a next tile and a paired image of the next tile is collected. The moving and collecting is repeated, e.g., over the entirety of tiles of the flow cell and optionally for one or more additional flow cells.

For another example, a flow cell is imaged according to a sequencing of tiles of the flow cell, and each image is captured via reduced settling time imaging. Then the flow cell is again imaged according to the sequence, but each image is captured via unreduced settling time imaging. The images captured via the reduced settling time imaging are paired with the images captured via the unreduced settling time imaging according to ordering of the sequence, forming a plurality of paired images of the flow cell. The image capturing is optionally repeated for one or more additional flow cells.

The foregoing technique of paired image collection is in accordance with sequencing that uses chemistry compatible with single wavelength (e.g., color) imaging. Sequencing that uses chemistry compatible with a plurality of wavelengths repeats the imaging for each of the plurality of wavelengths so that there are paired images for each of the wavelengths.

The paired images of the flow cells are usable as all or any portions of a training set of paired images for training NNs according, e.g., to any of FIG. 1, FIG. 4, and FIG. 5.

In some implementations, paired image collection is performed by capturing the unreduced movement settling time image of a pair and then synthesizing the reduced movement settling time image element of the pair from the captured unreduced movement settling time image.

Figure 7:
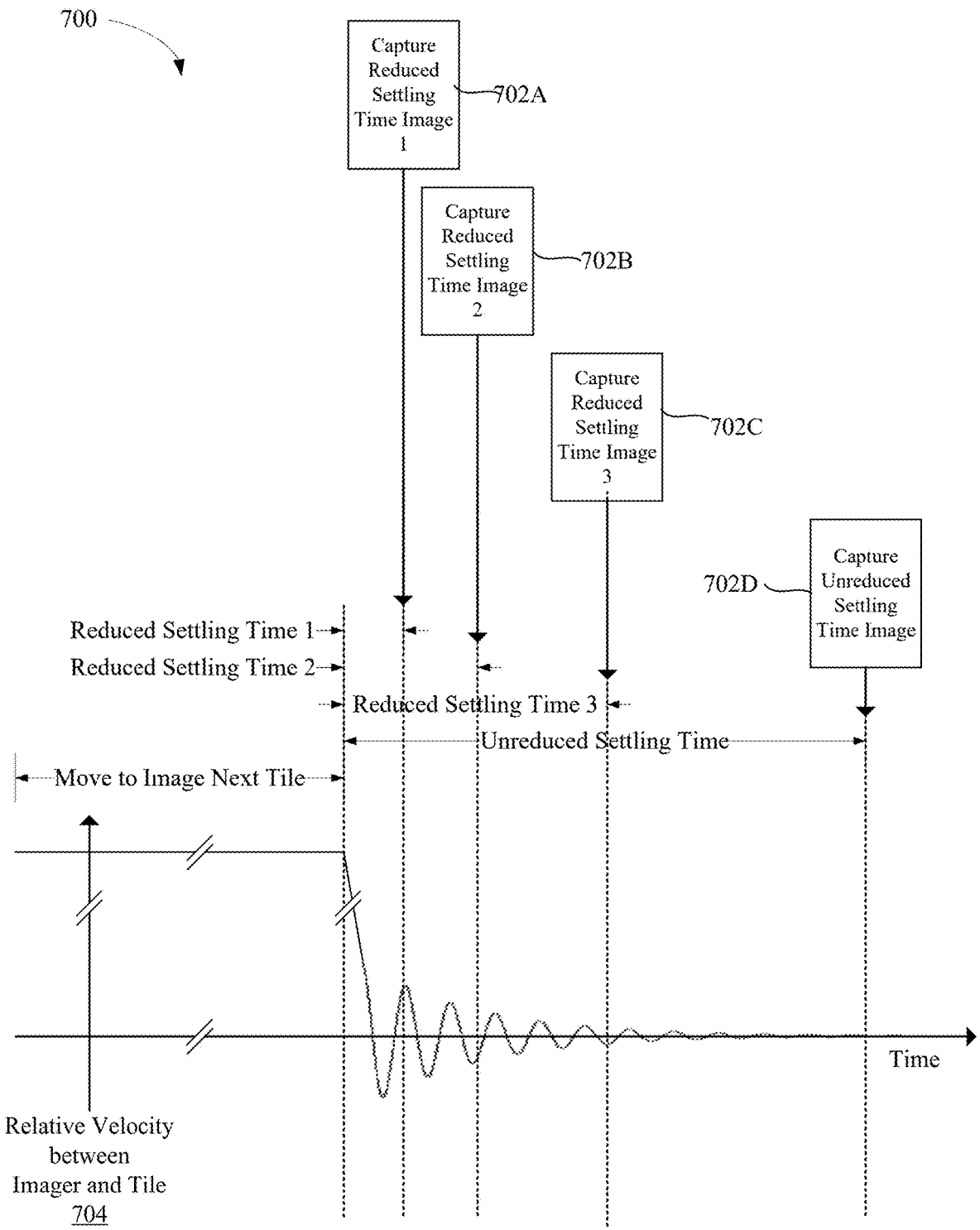
FIG. 7 illustrates paired image collection using different movement settling times.

FIG. 7 illustrates paired image collection using different movement settling times. The upper portion of the figure illustrates various image capture events 702A-702D, in time relation to each other. The lower portion of the figure illustrates relative velocity between an imager (e.g., of FIG. 3) and a tile (e.g., either of the tiles depicted in FIG. 3) (relative velocity between imager and tile 704). Proceeding from left to right (increasing time), the relative velocity 704 is a relatively constant value during completion of gross movement of the imager with respect to the tile. Then the relative velocity 704 decreases as the gross movement is completed. The relative velocity oscillates, reducing in absolute intensity over time (illustrated as a decaying sinusoid) after completion of the gross movement, such as due to vibration related to not-entirely-rigid coupling between elements of the imager and/or the elements relating to relative movement between the imager and the tile.

Returning to the upper portion of the figure, three reduced settling time image capture events 702A-702C are illustrated (Capture Reduced Settling Time Image 1, 2, and 3). The events correspond to capture after respective reduced settling times (Reduced Settling Time 1, 2, and 3). In various implementations, any one or more of the reduced settling time image capture events correspond to collecting a first element of a pair of images of a same flow cell tile at the reduced movement settling time. One unreduced settling time image capture event is illustrated (Capture Unreduced Settling Time Image). The event corresponds to capture after an unreduced settling time, such as after the relative velocity has decayed to a negligible value (Unreduced Settling Time), e.g., a small enough value such that motion blur in the captured image is negligible. In some implementations, the unreduced settling time image capture event corresponds to collecting a second element of the pair of images of the same flow cell tile at the unreduced movement settling time.

In the example illustrated in the figure, Reduced Settling Time 1 coincides with a relative peak of positive relative velocity between the imager and the tile. Reduced Settling Time 2 is near a later relative peak of negative relative velocity between the imager and the tile. Reduced Settling Time 3 is near a still later relative peak of negative relative velocity between the imager and the tile. Other instances of cessation of gross relative movement between the imager and the tile result in different relative velocities at the various reduced settling times. In some implementations, as the reduced settling time decreases, the expected absolute value of the relative velocity increases. Conceptually, the less settling time passes, the more residual vibration remains.

In various implementations, any one or more of Reduced Settling Time 1, 2, and 3 are predetermined according to one or more static criteria, one or more dynamic criteria, predetermined intervals, random intervals, or any combination thereof.

In various implementations, the relative velocity during the gross movement is variously relatively constant (as illustrated), time varying in a predetermined fashion (such as to ramp up and/or down linearly), time varying in an implementation-dependent manner, any other variation suitable to enable completion of the gross movement, and any combination of any of the foregoing. In various implementations, the relative velocity after completion of the gross movement decays in an oscillating manner (such as sinusoidally, as illustrated), decays in a manner including dampening, decays in an implementation-dependent manner, and any combination of the foregoing.

Figure 8A:
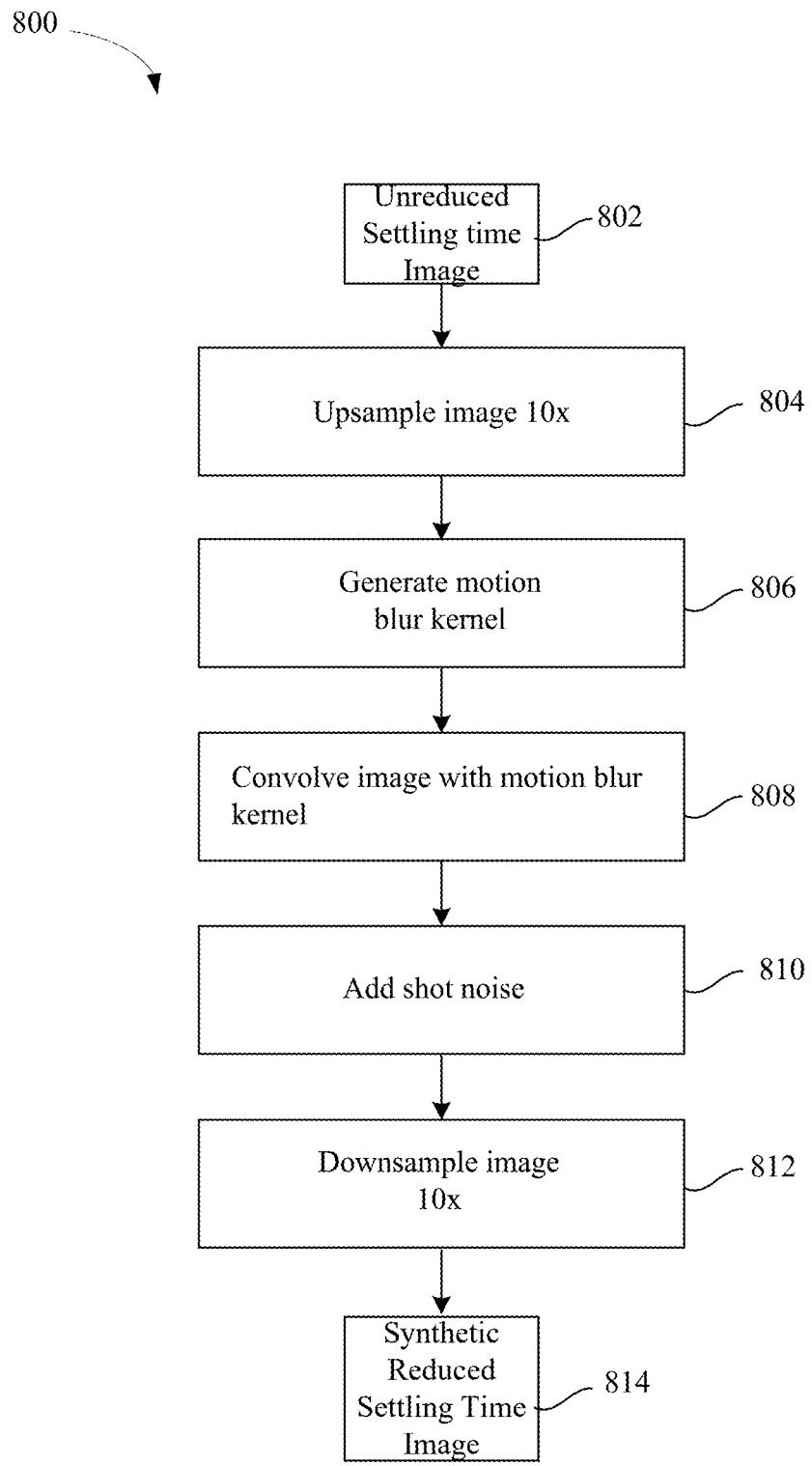
FIG. 8A illustrates paired image synthesis using synthetic data generation to produce images in accordance with unreduced and reduced movement settling times.

FIG. 8A illustrates a process 800 of paired image synthesis using synthetic data generation to produce images in accordance with unreduced and reduced (movement) settling times. A first element of a pair of images of a same flow cell tile is collected by imaging after an unreduced settling time, producing the unreduced settling time image of the pair of images 802. Then the unreduced settling time image 802 is processed to produce a synthetic reduced settling time image that is the reduced settling time image of the pair of images.

In some implementations, the synthetic image is produced as follows. At 804, the unreduced settling time image is upsampled 10×, such as to minimize and/or reduce effects of aliasing. Then, at 806, a motion blur kernel is generated. In various implementations, the motion blur kernel comprises any combination of a 1-dimensional, a 2-dimensional, and a multi-dimensional array of real numbers. Then, at 808, the upsampled image is convolved with the motion blur kernel. Then, at 810, shot noise is added to the result of the convolving, such as to account for motion over individual pixels. Lastly the result of the adding is downsampled 10× at 812, forming a synthetic reduced settling time image of the pair of images 814.

Figure 8B:
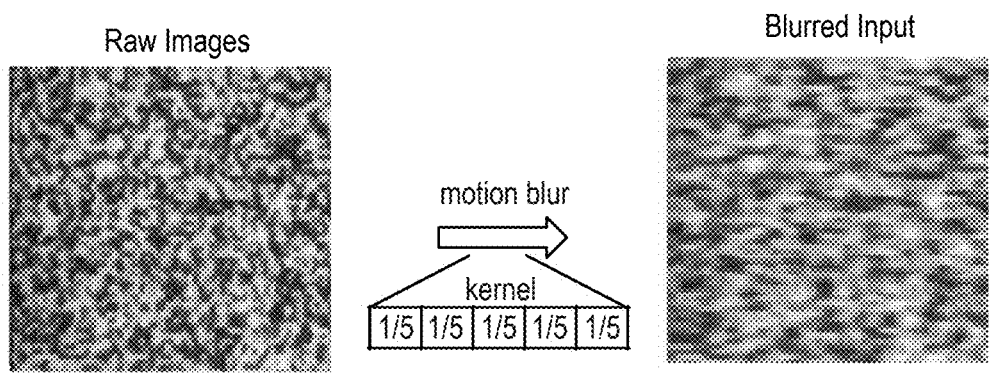
FIG. 8B illustrates a specific example of paired image synthesis.

FIG. 8B illustrates a specific example of paired image synthesis. One or more example raw images are processed according to FIG. 8A using the illustrated motion blur kernel to produce a synthetic blurred input for use in training.

In some implementations, training using paired images uses paired images that are aligned with respect to each other. For example, a reduced settling time image of a tile and an unreduced settling time image of the tile are aligned with respect to each other and the aligned images collectively from a paired image of the tile. In some implementations, the aligning is based in part on information of one or more fiducials located in the images. For example, the fiducial information is determined based on evaluating one or more cross-correlation equations (e.g., such as illustrated in FIG. 13B). For another example, the fiducial information is determined based on evaluating one or more scoring equations (e.g., such as illustrated in FIG. 13C). For another example, the fiducial information is determined based on evaluating one or more cross-correlation equations and evaluating one or more scoring equations, such as by weighting the evaluations.

Alignment of Images

In some implementations, training using paired images uses paired images in which the two images of the pair are aligned to each other (e.g., to sub-pixel resolution), such as based in part on information of one or more fiducials located in the images and via one or more data processing operations.

A specific example of aligning the two images of a paired image is as follows. Flow cells are marked with fiducials at pre-determined locations. A set of coefficients (e.g., based on an affine transform) are calculated based on locations of the fiducials in the two images and the set of coefficients is used to formulate transformed images as an intermediate alignment of the two images to a virtual reference frame, forming two respective transformed images. Then, the transformed images are interpolated to produce aligned images. Interpolation is performed variously via any combination of nearest-pixel, linear, quadratic, cubic, and/or higher order techniques, as well as band-limited interpolation techniques. A variant of the foregoing technique aligns the unreduced settling time image of the pair to the reduced settling time image of the pair instead of aligning each of the images to a virtual reference frame. In some implementations, aligning the two images of a paired image includes correction of optical distortion, such as via an iterative curve fitting procedure to estimate distortion coefficients.

In some implementations, aligning the two images of a paired image introduces undesirable artifacts into an image. For example, if aligning shifts an image in a particular axis (such as the x-axis), then zero padding is used to maintain a same image resolution. If the two images of a pair are shifted by different amounts, then respective different zero padding amounts are used for each image of the pair. In some scenarios, the respective different zero padding amounts lead to reduced efficiency during NN training. In some implementations, all or any portions of zero padding of images (e.g., all or any portions of some edges of images) are discarded during NN training.

Unpaired Images

In some implementations, paired images are disadvantageous such as due to higher image collection cost, longer data processing time, and/or poorer base calling accuracy. For example, processing a same sample two times (a first time at a first movement settling time for first elements of the paired images and a second time at a second movement settling time for second elements of the paired images) degrades the sample leading to poorer base calling accuracy. Thus, in some implementations, unpaired images are advantageous. Processing respective samples at respective movement settling times reduces sample degradation as each sample is processed only a single time.

In some implementations, capturing unpaired images comprises capturing two pluralities of images. A first of the pluralities is imaged at a short settling time and a second of the pluralities is imaged at a long settling time. In some implementations, the pluralities are of tiles of a same flow cell. In some implementations, the pluralities are of tiles of different flow cells. In some implementations, at least one of the tiles imaged at the short settling time is also imaged at the long settling time. In some implementations, none of the tiles imaged at the short settling time are also imaged at the long settling time.

The unpaired images of the flow cells are usable as all or any portions of a training set of unpaired images for training NNs according, e.g., to any of FIG. 1 and FIG. 6.

Figure 9A:
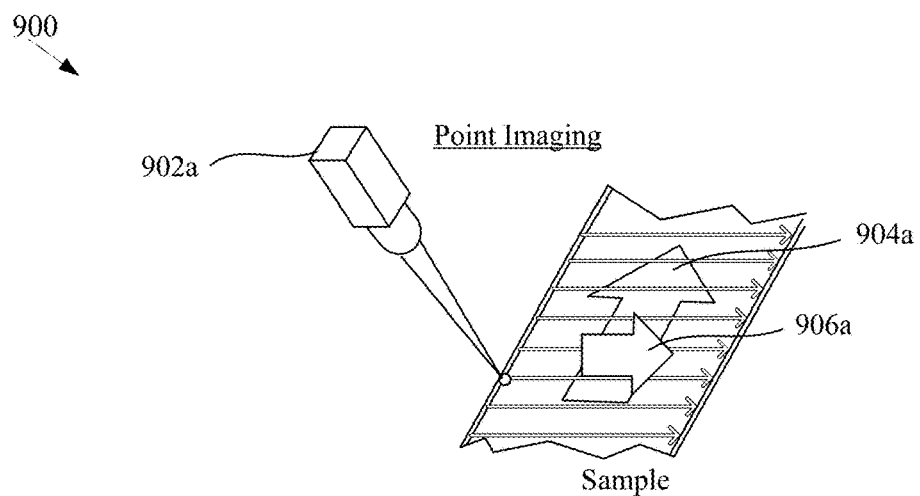
FIGS. 9A-C collectively illustrate various sequencing image collection techniques for a sample.
Figure 9B:
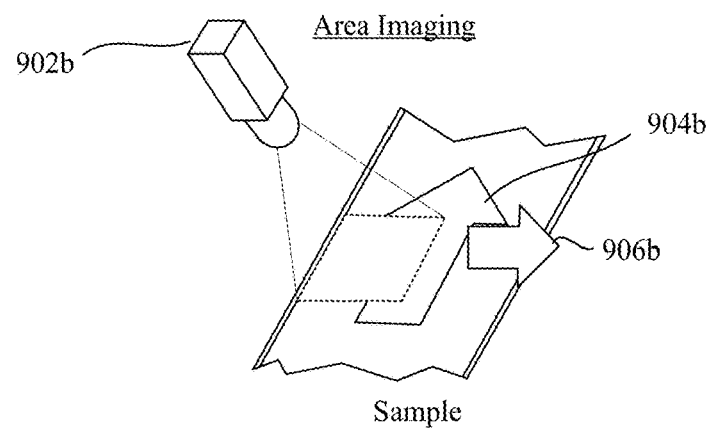
Figure 9C:
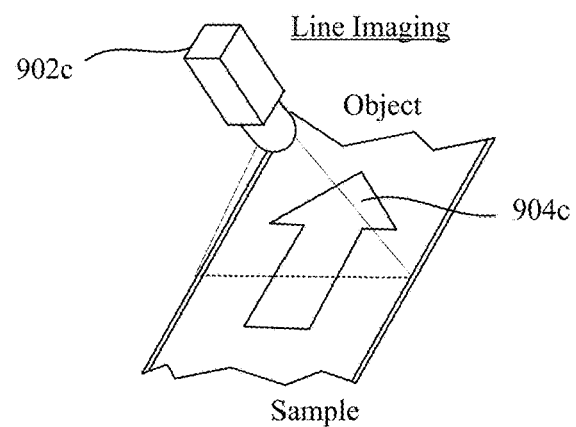

FIGS. 9A-C collectively illustrate various sequencing image collection techniques for a sample. Point, area, and line imaging techniques are illustrated. Image data is collected by an imager for a collection area (such as corresponding to a tile of a flow cell). Point imaging collects point-images as relatively smaller collections of one or more pixels, collecting image data for larger areas by progressing, as illustrated, from left to right (axis 906a), then up (axis 904a), then again left to right (axis 906a), and so forth, via relative movement of the imager 902a and the collection area, such as in discrete point-and-shoot operation. Area Imaging collects area-images as relatively larger collections of pixels, such as in a rectangular (e.g., square) shape. Area image collection progresses similarly to that of point imaging, by progressing, as illustrated, from left to right (906b), then up (904b), then again left to right (908B), and so forth, via relative movement of the imager 902b and the collection area, such as in discrete point-and-shoot operation. Line Imaging collects line-images as collections of pixels corresponding to a rectangular region of a relatively high aspect ratio, such as a single pixel high and several pixels wide corresponding to the collection area width. Line image collection progresses a line at a time in a direction orthogonal to the line (axis 904c), via relative movement of the imager 902c and the collection area. Some implementations of line imaging correspond to discrete point-and-shoot operation. Some implementations of line imaging correspond to continuous scanning operation.

In some implementations, an image for training and/or enhancement corresponds to data of a single collected image. For example, a single area-image corresponds to an image for training and/or an image for enhancement. In various implementations, images for training and/or images for enhancement are produced by combining and/or splitting the collected image data. For example, several images (such as several point-images, several area-images, or several line-images) corresponding to a rectangular area (such as a flow cell tile) are combined into a single image for training or a single image for enhancement. For another example, portions of line-images corresponding to a contiguous rectangular area are split and then combined into a single image for training or a single image for enhancement.

In various implementations, the collection area is as wide (left-to-right in the figure) as a tile of a flow cell or alternatively as wide as a lane of a flow cell. According to various implementations, a single lane of a flow cell is imaged at a time (e.g., via a single imager having a single camera per wavelength or a single camera per exposure time) or a plurality of lanes of a flow cell is imaged in parallel (e.g., via parallel use of a corresponding plurality of imagers). According to various implementations, a single imager is operated at a time or a plurality of imagers is operated at a time.

In various implementations, the imager uses microscopy technology, such as optical microscopy.

In some implementations, a variation of area imaging uses an area sensor that is coplanar with the collection area and there are minimal optical components between fluorescing fluorophores and the area sensor. An example area sensor is based on semiconductor technology, such as a Complementary Metal-Oxide Semiconductor (CMOS) chip.

FIG. 10 illustrates various sequencing image channel chemistry techniques. A 4-channel chemistry technique uses a channel per base (A, G, T, and C) per sequencing cycle. For example, imaging is performed at each of four wavelengths for each of the four bases (A, G, T, and C), illustrated as Images 1, 2, 3, and 4 in the figure. A 2-channel chemistry technique uses two channels per sequencing cycle and decodes results from the two channels into individual base identifications. For example, imaging is performed at each of two wavelengths and decoded as illustrated for Images 1 and 2. A 1-channel chemistry technique uses one channel two times separated by an intermediate chemistry step for each sequencing cycle. For example, imaging is performed at a particular wavelength, the intermediate chemistry step is performed, and then imaging is performed again at the particular wavelength.

Paired Image Collection at Cycle Intervals

In any of the training contexts of FIG. 1, FIG. 3, FIG. 4 and FIG. 5, the more closely sequence data in the training context emulates the ground truths of sequence data in the production context, the more accurate trained model parameters implemented in a production AI model will be in predictively generating sufficiently enhanced images for base calling. To that end, reduced settling time images obtained in a training context should correspond closely in quality to that of the reduced settling time images generated for AI enhancement in the production context. Similarly, the unreduced settling time images obtained in the training context should model an enhanced image with quality closely corresponding to that of an unreduced settling time image in the production context.

Figure 21:
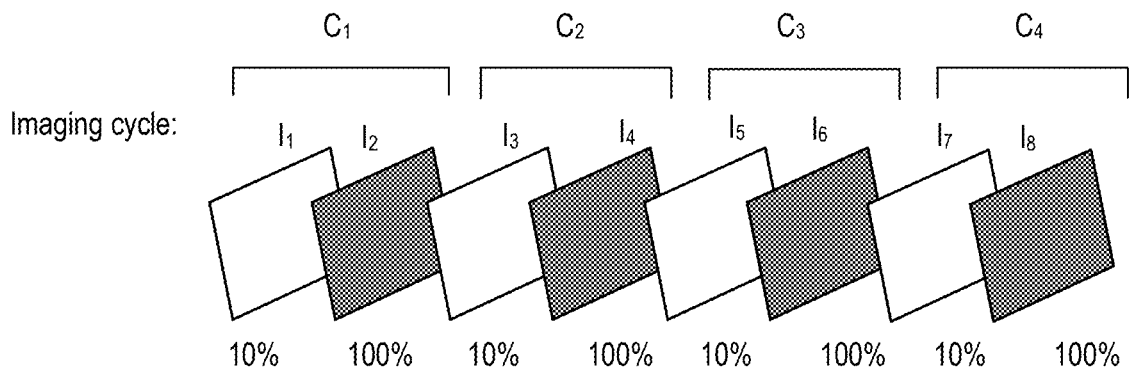
FIG. 21 illustrates two sample rates of paired image collection in a respective series of image cycles in a sequencing run.
Figure 21:
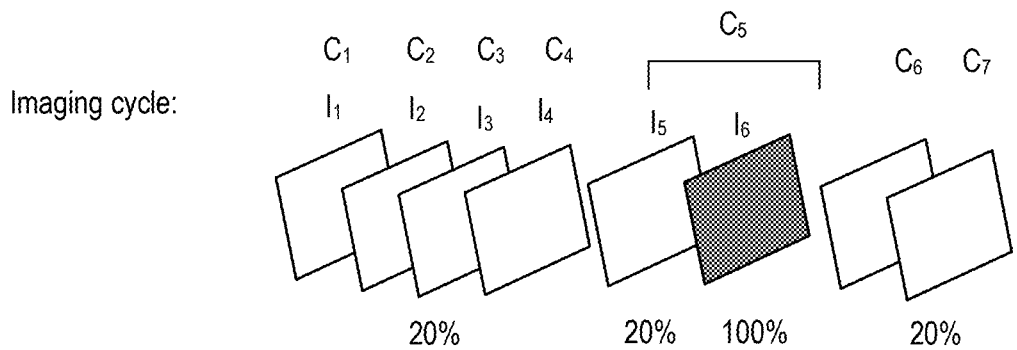
Figure 22:
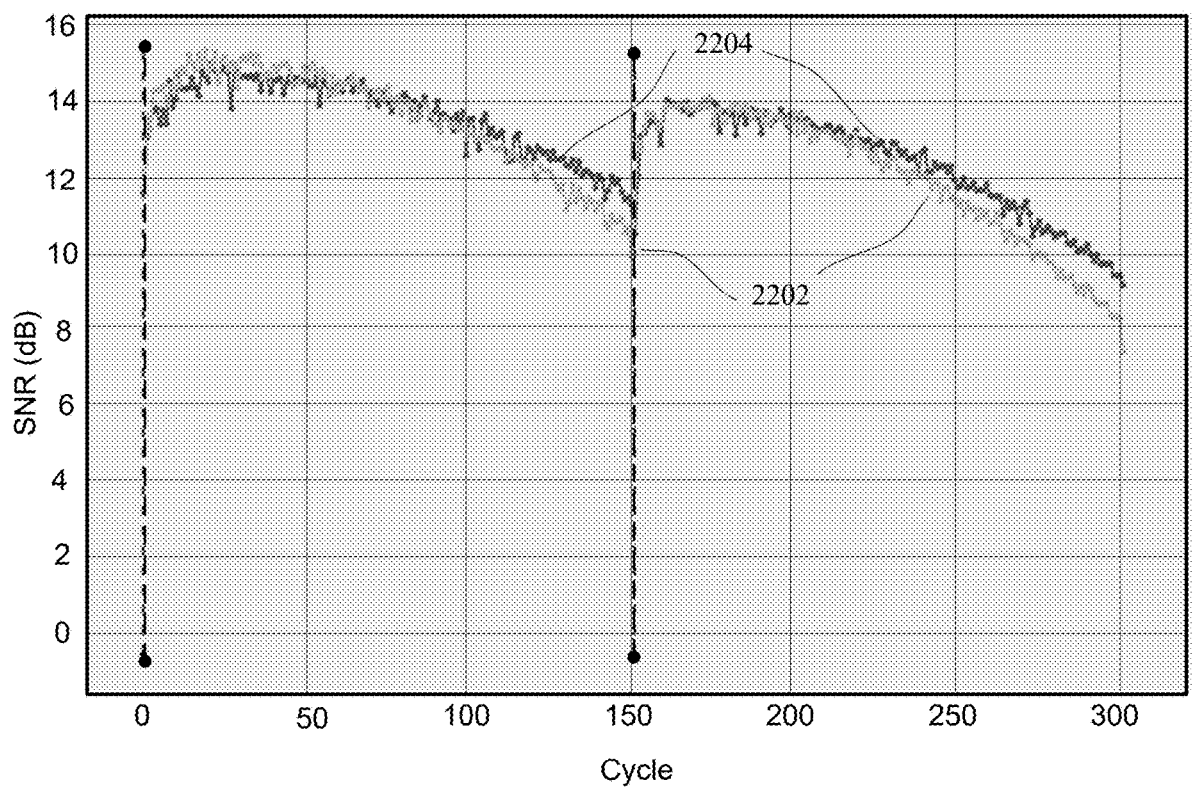
FIG. 22 illustrates a graph of measured Signal-to-Noise (SNR) in blue and green channels over a sequencing run.

FIG. 21, illustrates an example of a sequencing run 2102 in which a paired reduced settling time image and unreduced settling time image of the same sample target are obtained every cycle during the sequencing run 2102. Such an imaging cycle may produce more paired images than needed to properly train the AI for image enhancement. The generation of paired images at every cycle may generate a higher amount of training data, but the frequent imaging may cause greater photodamage and ultimately become less beneficial in training the AI in later cycles of the sequencing run 2102. The result of the photodamage caused by generation of paired images at every cycle may ultimately affect the ability of the AI to properly enhance images during production due to the images being input into the AI during production failing to be similarly affected.

In certain embodiments, training data and production data are obtained under identical conditions—the same instruments, channel chemistries, image cycles, and photon budget. However, because training data obtained through paired image collection, as described herein, may require target imaging at both reduced and unreduced settling times, the photon budget for paired image sequencing may be significantly higher than that of individually generating reduced settling time images and unreduced settling time images in production sequencing. Thus, the loss of Signal-to-Noise Ratio (SNR), as a measure of the quality of data of a signal of interest, may cascade more steeply and after fewer cycles during paired image sequencing than the loss of optical SNR occurring during production sequencing. In that regard, training data may not appropriately emulate interdependent ground truths pertaining to photodamage and optical SNR in production data. As a consequence, a production AI model may implement model parameters insufficiently calibrated to enhance reduced settling time images to match the quality of unreduced settling time images in production.

To address this disparity between training and production data, and thus better align training data obtained through paired image collection with ground truths of acquired photodamage in production data, while also limiting the photodamage during training and production to produce images having a higher optical data quality (e.g., as measured by SNR or otherwise), some implementations may perform paired image collection at cycle intervals. Here, rather than performing paired reduced settling time and unreduced settling time images at each cycle—a 1:1 paired image to cycle interval—example implementations may perform paired imaging at cycle intervals greater than 1:1. In one example, a system may perform reduced settling time imaging during cycles between cycle intervals of paired imaging. Under some circumstances, reduced settling time imaging between cycle intervals may be performed to avoid biasing the model value for photo budget features of training data below the actual value of the feature in ground truth. In another example, a system may perform unreduced settling time imaging during cycles between cycle intervals of paired imaging.

According to example implementations, the particular cycle interval may depend on the number of paired images required in a given training context. The amount of training data may be increased by the number of paired images that are produced for training the AI. However, the amount of photodamage may increase and, as a result, the optical data quality (e.g., as measured by SNR or otherwise) may decrease as the number of paired images that are produced increases.

The particular cycle interval may also or alternatively depend on the threshold settling time setting for obtaining reduced settling time images, and/or the threshold settling time setting for obtaining unreduced settling time images for a given instrument. The lower the settling time setting for obtaining reduced settling time images, the longer the training process may be for training the AI due to the reduced optical SNR at which images may be captured. Thus, the lower the settling time setting may be set to a threshold (e.g., between 10% and 50%, such as 10%, 15%, 20%, 25%, 30%, 35%, 40%, 45% or 50%) to produce a reduced settling time image of at least a predefined optical SNR for reducing training time and providing sufficient enhancement for production, while also limiting the photodamage described herein. As will be understood the settling time setting for the reduced settling time images may be adjusted for later cycles (e.g., predefined cycles) and/or for different systems (e.g., different imaging systems). In order to ensure the optical data quality of the enhanced image generated during production is high, the threshold settling time setting for obtaining unreduced settling time images may remain at 100% or at another relatively high threshold (e.g., 85%, 90%, 95%) to ensure a certain level of optical SNR.

In one example, systems operating in a training context may generate paired images for a 150 base-pair-length read cycle. The system may obtain reduced settling time images at a predefined percentage of the settling time of unreduced settling time images. For example, the system may obtain reduced settling time images at a reduction ratio, e.g., of 1:2, 1:3, 1:4, or 1:5 versus unreduced settling time images in order to train a model to predictively generated enhanced images of sufficient optic quality for base calling. The paired imaging may be performed at a cycle interval that is based on the settling time. For example, the system may obtain reduced settling time images at a 5× reduction in settling time for unreduced settling time images at a 1:5 cycle interval. This particular example is illustrated in FIG. 21, in which a paired reduced selling time image (20% time) and an unreduced settling time image (100% time) of the same sample target are obtained every five cycles (C5) during a sequencing run 2104, where reduced settling time imaging is performed between cycle intervals (C1, C2, C3 . . . C4, C6, C7). Example intervals of 1:2, 1:3, 1:4, or 1:5 are contemplated herein. However, any maximum cycle interval allowed by a given number of paired images required in a training context at a suitable settling time for reduced settling time imaging is contemplated herein. The number of reduced settling time imaging cycles that are performed prior to a paired imaging cycle that includes the unreduced settling time image may assist in replicating the amount of photodamage that may be caused by the production system operating at a reduced settling time over the entirety of a sequencing run. By reducing the number of paired images, the difference in the amount of photodamage between the training data and the input data during production may be reduced.

Example settling time settings of 2×, 3×, 4×, or 5× reduction of unreduced settling time may be implemented by a system for reduced settling time imaging. However, setting settling time for reduced settling time imaging may be based on any number of factors. For example, the lower limits of settling time may be determined based on extrinsic constraints in the training or production contexts: e.g., the sequencing instrument (e.g., Numerical Aperture (NA) objective value of the instrument lens), noise floor for sensors, flow cell densities, AI model data requirements. The lower limits of settling time may also be determined based on maximization of net photo budget effects. As an example, 10× reduction in settling time set for reduced settling time imaging (see, e.g., FIG. 21, sequencing run 2102) will have an improved net photo budget effect over a 5× reduction in settling time (e.g., sequencing run 2104) only if a 1:5 cycle interval can be supported at the 10× reduction setting—i.e., training data generated at a 1:5 cycle interval at 10× reduction is sufficient to train an AI model herein. If, on the other hand, a 10× reduction can only support a 1:1 cycle interval (as illustrated in the example of sequencing run 2102) the 10× reduction in settling time will not have an improved net photo budget effect over a 5× reduction in settling time.

In some implementations, paired imaging may be performed dynamically, in which either or both of the cycle interval and reduced settling time setting for reduced settling time images may be adjusted during a sequencing run. The adjustment of the cycle interval and/or the reduced settling time setting may be made at one or more predefined portions of the sequencing run. For example, during the early cycles of a sequencing when imaging is obtained at relatively high SNR compared to later cycles, the imaging may be performed at the highest cycle interval at lowest settling time supporting the interval. Under certain circumstances, imaging at optimal cycle interval and reduction settling time in the earlier cycles, flattens the curve of logarithmic decline of data quality of signals of interest caused by acquired photodamage. Then, during the later cycles of sequencing where relatively low SNRs may no longer support imaging at optimal cycle interval and reduced settling time, an adjustment is made to reduce the cycle interval, increase settling time, or both.

Neural Network Implementations

Figure 11:
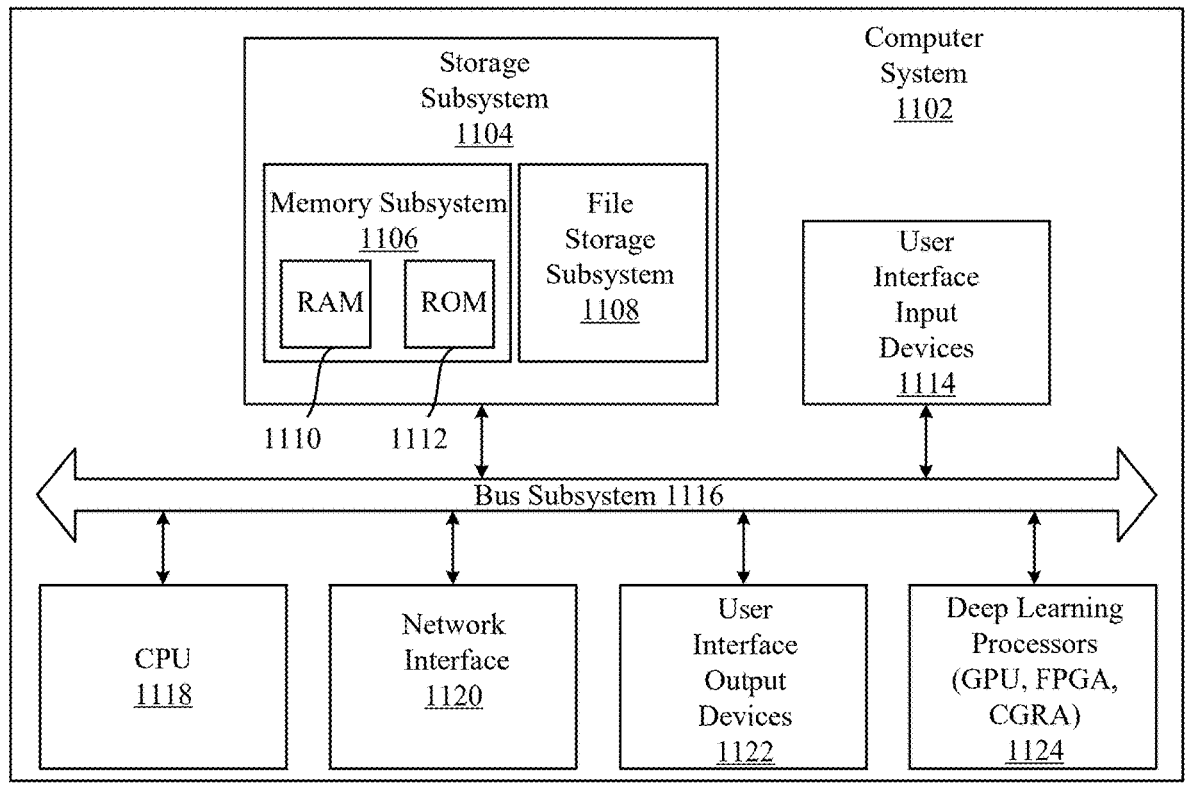
FIG. 11 is a block diagram of an example computer system.

FIG. 11 is a block diagram of an example computer system 1102. The computer system 1102 comprises a storage subsystem 1104, user interface input devices 1114, a CPU 1118, a network interface 1120, user interface output devices 1122, and optional deep learning processors 1124 (illustrated for brevity as GPU, FPGA, CGRA) interconnected by a bus subsystem 1116. The storage subsystem 1104 comprises a memory subsystem 1106 and a file storage subsystem 1108. The memory subsystem 1106 comprises Randomly Accessible read/write Memory (RAM) 1110 and Read Only Memory (ROM) 1112. The ROM 1112 and file storage subsystem 1108 elements comprise non-transitory computer readable media capabilities, e.g., for storing and executing programmed instructions to implement all or any portions of NN sections described elsewhere herein. The deep learning processors are enabled, according to various implementations, to implement all or any portions of NN sections described elsewhere herein. In various implementations, the deep learning processors element comprises various combinations of CPUs, GPUs, FPGAs, CGRAs, ASICs, ASIPs, and DSPs.

In various implementations, one or more of the laboratory instruments and/or the production instruments described elsewhere herein comprise one or more computer systems identical to or similar to the example computer system 1102 of the figure. In various implementations, any one or more of the training and/or production contexts use any one or more computer systems identical to or similar to the example computer system of the figure to perform NN-related processing, operating, e.g., as one or more servers relating to training data collection and/or synthesis, as well as production data collection and/or processing, such as image enhancement.

In various implementations, the memory subsystem 1106 and/or the file storage subsystem 1108 are enabled to store parameters of NNs, such as all or any portions of parameters of NN sections described elsewhere herein. For example, all or any portions of the stored parameters variously correspond to any combination of initialized parameters of a NN used in a training context, trained parameters of the NN used in the training context, and/or trained parameters of a NN used in a production context. For another example, all or any portions of the stored parameters correspond to one or more intermediate representations, such as relating to information that is provided by a training context to a production context, as illustrated and described elsewhere herein.

For a first specific example, at least some of the stored parameters correspond to information provided by the training NN Generator (G) 132 to the production NN Generator (G) 144 as illustrated by Trained Generator Filter Info 142 of FIG. 1. For a second specific example, at least some of the stored parameters correspond to information retained in the Generator Stage after training in the training context 408 for use in production in the production context as illustrated in FIG. 4. For a third specific example, at least some of the stored parameters correspond to information provided by the training context 508 to the production context 510 as illustrated by Trained Encoder/Decoder Filter Info 516 of FIG. 5. For a fourth specific example, at least some of the stored parameters correspond to information provided by the training context 602 to the production context 608 as illustrated by Trained $G_{R \to U}$ Filter Info 622 of FIG. 6.

In various implementations, a controller (such as the controller described with respect to FIG. 3) comprises one or more elements similar to the example computer system illustrated in FIG. 11, such as to store and execute programmed instructions to implement all or any portions of NN sections described elsewhere herein and/or to store parameters of NNs.

Figure 12:
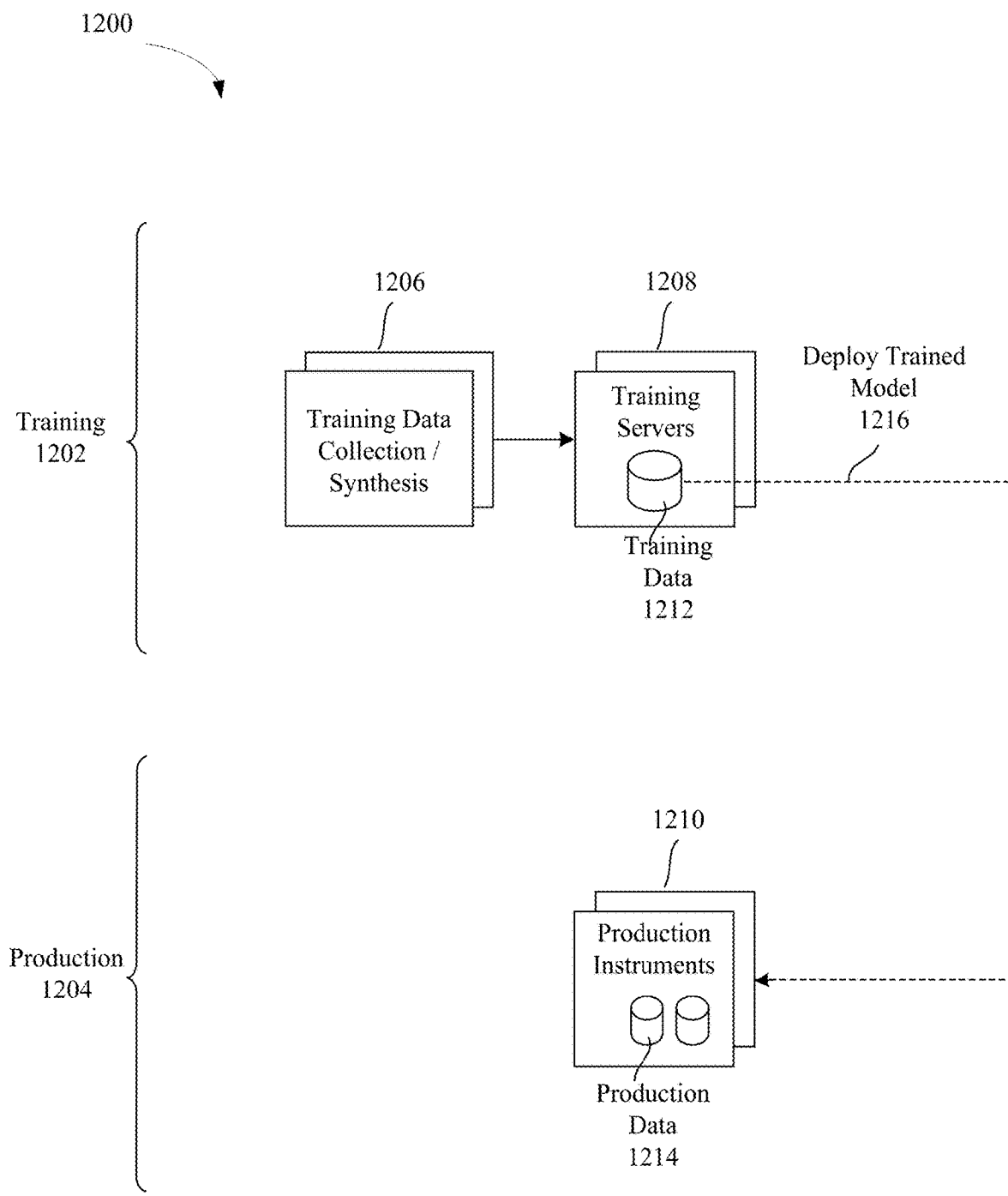
FIG. 12 illustrates training and production elements implementing AI-driven enhancement of motion blurred sequencing images.

FIG. 12 illustrates a system 1200 having training and production elements implementing AI-driven enhancement of motion blurred sequencing images. The upper portion of the figure illustrates one or more training contexts, and the lower portion illustrates one or more production contexts. Each of the training contexts 1202 comprises one or more training data collection/synthesis capabilities 1206, each with a respective one or more training servers 1208. Each of the training servers 1208 is enabled to store respective training data 1212, such as parameters resulting from training via one or more NN-related activities. In some implementations, all or any portions of one of the training contexts corresponds to a laboratory instrument. Each of the production contexts 1204 comprises one or more production instruments 1210. Each of the production instruments 1210 is enabled to store production data 1214.

Referring to FIG. 11, in various implementations, the memory subsystem 1106 and/or the file storage subsystem 1108 are enabled to store image data, such as reduced settling time images, unreduced settling time images, and enhanced images, as well as representations thereof, such as pixel intensities of one or more regions of images. In various implementations, the computer system is enabled to process images in real time, including extracting intensities of specific pixels in real time. In some implementations based on real time pixel intensity extraction, all or any portions of image data corresponding to extracted areas are not specifically saved in the file storage subsystem.

Referring back to FIG. 12, The training contexts of the figure are representative of various training contexts illustrated and described elsewhere herein. The production contexts 1204 of the figure are representative of various production contexts illustrated and described elsewhere herein. The training contexts 1202 use training data 1212 that is collected and/or synthesized to train one or more models. Then results of the model training are provided, as illustrated by the dashed arrow Deploy Trained Model 1216, to the production contexts 1204 for us, e.g., to enhance production images for improved base calling.

As a first specific example, one of the training contexts 1202 of FIG. 12 corresponds to the training context 102 of FIG. 1 and a corresponding one or more of the production contexts 1204 of FIG. 12 corresponds to one or more instances of the production context 104 of FIG. 1. The Deploy Trained Model 1216 of FIG. 12 corresponds to the Trained Generator Filter Info 142 of FIG. 1. As a second specific example, one of the training contexts 1202 of FIG. 12 corresponds to the training context 408 of FIG. 4 and a corresponding one or more of the production contexts 1204 of FIG. 12 corresponds to one or more instances of the production context 406 of FIG. 4. The Deploy Trained Model 1216 of FIG. 12 corresponds to providing training results (e.g., one or more parameters) of the training usage of the Generator Stage 416 of FIG. 4 to one or more instances of the production usage of the Generator Stage 416 of FIG. 4. More specifically, a particular laboratory instrument configured according to the training context 408 of FIG. 4 operates according to the training context 1202 of FIG. 12. Several production instruments each configured according to the production context 406 of FIG. 4 operate according to the production context 1202 of FIG. 12, including receiving results of training the particular laboratory instrument according to the Deploy Trained Model 1216 of FIG. 12.

Fiducials

An example of a fiducial is a distinguishable point of reference in or on an object. E.g., the point of reference is present in an image of the object, is present in a data set derived from detecting the object, or any other representation of the object suitable to express information about the point of reference with respect to the object. The point of reference is specifiable by an x and/or y coordinate in a plane of the object. Alternatively, or additionally, the point of reference is specifiable by a z coordinate that is orthogonal to the x-y plane, e.g., being defined by relative locations of the object and a detector. One or more coordinates for a point of reference are specifiable relative to one or more other features of an object or of an image or other data set derived from the object.

Figure 13A:
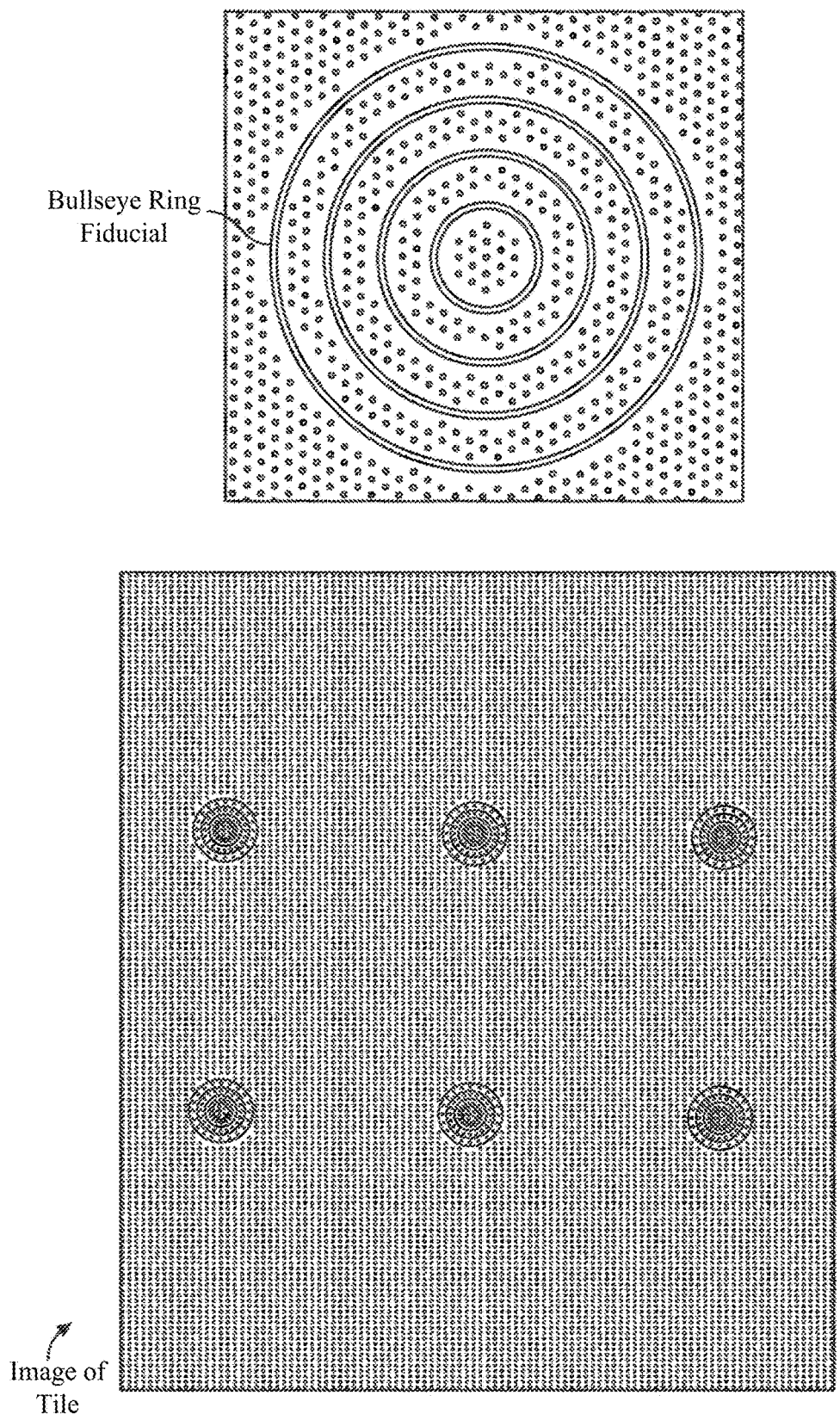
FIG. 13A illustrates fiducial examples.

FIG. 13A illustrates fiducial examples. The upper portion of the figure is a close-up of a single fiducial having four concentric bullseye rings. The lower portion of the figure is an image of a tile with six example bullseye ring fiducials in the image. In various implementations, each of the dots throughout represent a respective oligo cluster, a respective nanowell of a patterned flow cell, or a respective nanowell with one or more oligo clusters therein. In some implementations, the bullseye ring fiducials comprise light rings surrounded by a dark border, such as to enhance contrast. The fiducials are usable as reference points for aligning the imaged tile, such as with other images of the same tile (e.g., at various wavelengths and/or as another image of a pair of images of the same tile). For example, locations of fiducials in the image are determined via cross-correlation with a location of a reference virtual fiducial and determining the location as where the cross-correlation score is maximized. In some implementations, the cross-correlation is performed using a cross-correlation equation for discrete functions (see, e.g., FIG. 13B).

The fiducials are usable as reference image data (e.g., ground truth image data) according to various implementations as described elsewhere herein. In some implementations, a measure of goodness of a fit between a fiducial in an image and a virtual fiducial is calculated using a scoring equation (see, e.g., FIG. 13C). In various implementations, various image alignment operations (such as aligning of elements of paired images) use information based on evaluating one or more cross-correlation equations (e.g., such as illustrated in FIG. 13B) and/or one or more scoring equations (e.g., such as illustrated in FIG. 13C). In various implementations, various fiducial loss functions use information based on evaluating one or more cross-correlation equations (e.g., such as illustrated in FIG. 13B) and/or one or more scoring equations (e.g., such as illustrated in FIG. 13C). In various implementations, various fiducial quality assessments use information based on evaluating one or more cross-correlation equations (e.g., such as illustrated in FIG. 13B) and/or one or more scoring equations (e.g., such as illustrated in FIG. 13C).

FIG. 13B illustrates an example cross-correlation equation for discrete functions. The example cross-correlation equation is usable, e.g., to determine locations of fiducials (see, e.g., FIG. 13A) using an example scoring equation (see, e.g., FIG. 13C).

FIG. 13C illustrates an example scoring equation. In the example scoring equation, Minimum_CC is the maximum value of the cross-correlation, Maximum_CC is the maximum value of the cross-correlation, and RunnerUp_CC is the largest cross-correlation value outside a radius of, e.g., four pixels from the location of the Maximum CC.

Fine Tuning—Laboratory to Production

In some usage scenarios, an AI model trained on a laboratory sequencing instrument, when used on a production sequencing instrument, leaves room for improvement. In some implementations, fine tuning is performed by tailoring the laboratory trained model to a production context by performing a few training iterations on the production instrument. In some implementations, flow cells include precisely manufactured fiducials having precisely known shapes and dimensions. Conceptually, the training iterations on the production instrument use the precisely known shapes and dimensions of the fiducials as ground truth with respect to image data of fiducials as collected by the production instrument.

Figure 14:
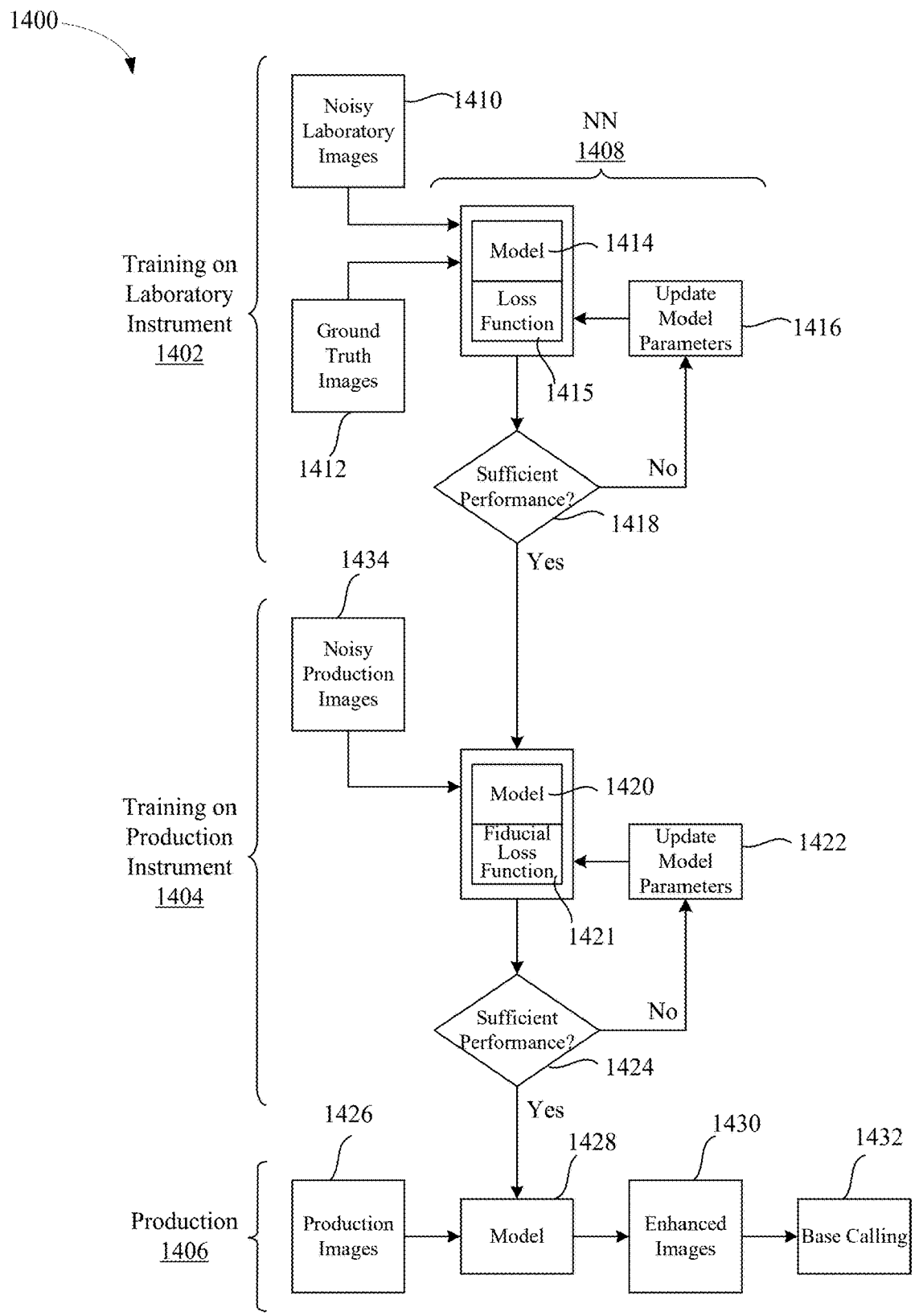
FIG. 14 illustrates training specific to production instruments, beginning with training on a laboratory instrument.

FIG. 14 illustrates a system 1400 implementing training specific to production instruments, beginning with training on a laboratory instrument 1402. From top to bottom, the figure illustrates a laboratory instrument training context 1402, a production instrument training context 1404, and a production context 1406. Each of the AI models in the laboratory instrument training context 1402, the production instrument training context 1404, and the production context 1406 is of a same NN architecture. From left to right the figure illustrates an image collection section, a NN section, and a base calling section.

The laboratory training context (Training on Laboratory Instruments) 1402 corresponds, e.g., to using a laboratory sequencing instrument for training based on paired images. The laboratory training is performed until it produces a (laboratory training context) AI model 1414 having enough accuracy (as illustrated by Sufficient Performance? 1418 of the laboratory training context). An associated loss function 1415 is usable in part to update parameters of the AI model 1414 (such as via gradient update and/or gradient descent techniques) until there is sufficient performance. The production training context (Training on Production Instruments) 1404 corresponds, e.g., to using a production instrument for fine-tuning training based on images from a production sequencing instrument and fiducial ground truth data. The production training is performed until it produces a (production instrument context) fine-tuned AI model 1420 having enough accuracy (as illustrated by Sufficient Performance? 1424 of the production training context). An associated fiducial loss function 1421 is usable in part to update parameters of the fine-tuned AI model 1420 (such as via gradient update and/or gradient descent techniques) until there is sufficient performance. The fine-tuning training begins with model parameters resulting from training the laboratory training context AI model. The production context (Production) 1406 corresponds, e.g., to using a production sequencing instrument with the fine-tuning training AI model to enhance production images for base calling. The production context uses the production instrument context fine-tuned AI model.

The laboratory training context 1402 uses paired images such as one image taken of a tile of a flow cell at a reduced movement settling time (one of a plurality of images represented by Blurred Laboratory Images 1410) paired with another image taken of the tile at an unreduced movement settling time (one of a plurality of images represented by Ground Truth Images 1412). The production training context 1404 uses unpaired images taken at the reduced movement settling time (Blurred Production Images 1434). The production context 1404 uses singleton images taken at the reduced movement settling time (Production Images 1426). The production images 1426 are enhanced in the production context 1406 to produce enhanced images 1430 for use in base calling 1432.

In some implementations, the laboratory training context 1402 operates for a relatively large number of training iterations, taking, e.g., days or weeks of time for completion. In some implementations, the production training context 1404 operates for a relatively small number of training iterations, taking, e.g., minutes or hours of time for completion.

Figure 15:
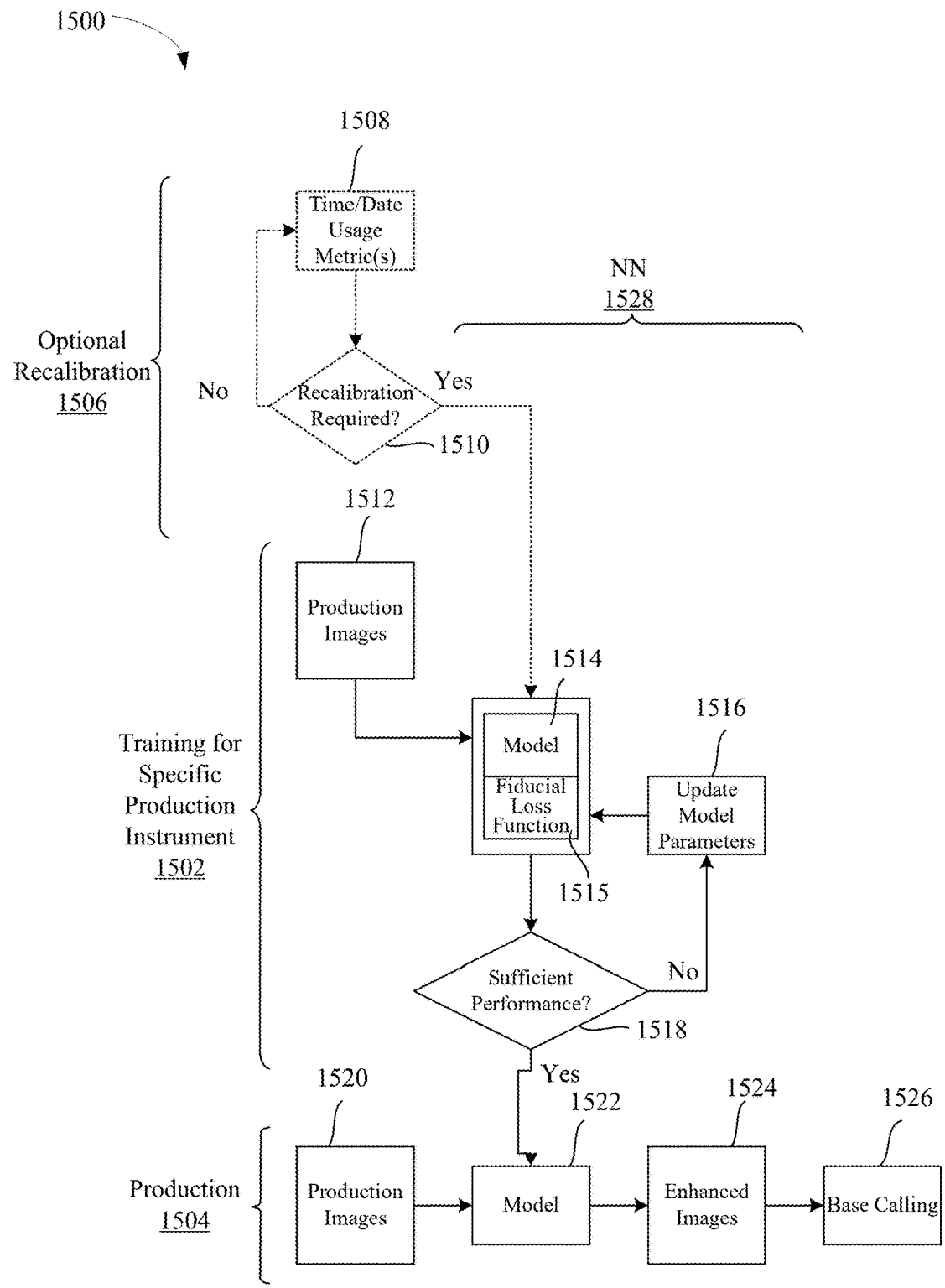
FIG. 15 illustrates training for a specific production instrument, optionally responsive to a recalibration requirement detection.

FIG. 15 illustrates a system 1500 for implementing training for a specific production instrument, optionally responsive to a recalibration requirement detection. From top to bottom, the figure illustrates optional recalibration 1506, a production instrument training context 1502, and a production context 1504. The AI model 1514 in the production instrument training context 1502 and the AI model 1522 in the production context 1504 are of a same NN architecture. From left to right the figure illustrates a combined optional recalibration and image collection section, a NN section, and a base calling section.

The production instrument training context (Training for Specific Production Instrument) 1502 corresponds, e.g., to using a particular production sequencing instrument for self-training based on images from the particular production sequencing instrument and fiducial ground truth data. The training begins with model parameters resulting, e.g., from training on a laboratory AI model such as in a laboratory training context. The training uses production images 1512 taken after an unreduced movement settling time, e.g., images that are motion blurred. The production training is performed until it produces an AI model having enough accuracy (as illustrated by Sufficient Performance? 1518) for use in the production context on the particular production sequencing instrument. An associated fiducial loss function 1515 is usable in part to update parameters of the model (such as via gradient update and/or gradient descent techniques) until there is sufficient performance 1518. In the production context 1504, production images 1520 are enhanced by a production model 1522 that uses parameters determined by the production training to the specific production instrument. The production images are enhanced in the production context 1504 to produce enhanced images 1524 for base calling 1526.

Optionally, monitoring for a recalibration event is performed. Recalibration events include and/or are based upon, e.g., any combination of a particular date, a particular time, passage of a specific amount of time (such as a recalibration interval), usage metrics, and/or monitored performance characteristics at 1508. The monitoring comprises determining whether to perform recalibration (Recalibration Required? 1510). If required, then the production training is performed. If not, then monitoring for a recalibration event resumes.

Ensemble of AI Models

In some scenarios, various noise sources (e.g., photobleaching, photodamage, wear-out, phasing, and/or prephasing) are cumulative over time. Thus, the first sequencing cycle has the least accumulated noise, and the last sequencing cycle has the most accumulated noise. Conceptually, relatively earlier sequencing cycles have relatively less accumulated noise compared to relatively later sequencing cycles. Due to the noise accumulation, enhancing a reduced settling time image is dependent on which sequencing cycle the reduced settling time image is associated with. Therefore, in some situations, an AI model trained using images from relatively early sequencing cycles, when used to enhance images from relatively later sequencing cycles, underperforms compared to an AI model trained using images from relatively later sequencing cycles, and vice versa. In some implementations, each of a plurality of AI models, associated with a respective sequencing cycle range, is used for enhancing reduced settling time images taken within the respective sequencing cycle range.

Figure 16:
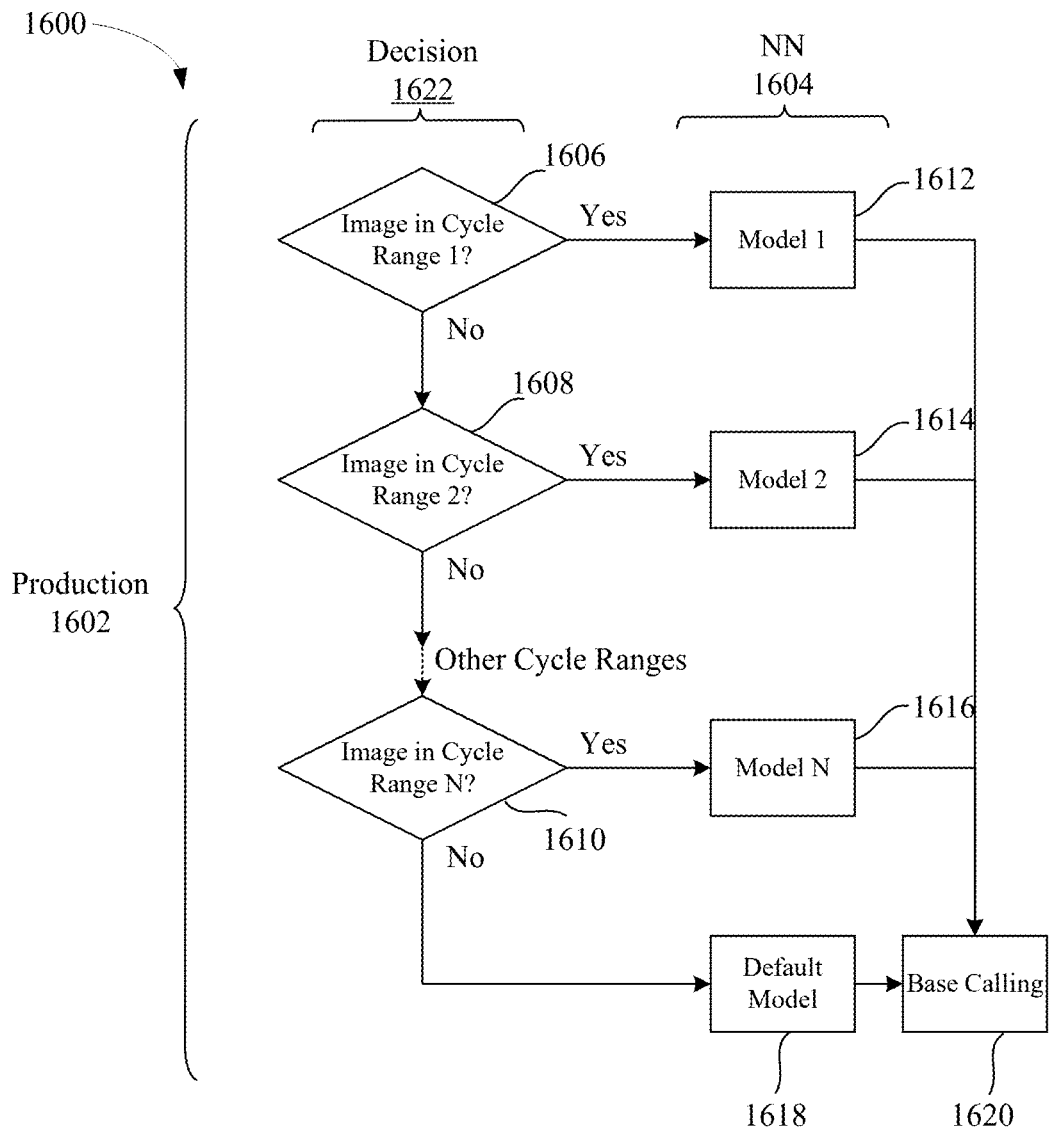
FIG. 16 illustrates an ensemble of AI models, one for each of a plurality of sequencing cycles.

FIG. 16 illustrates a system 1600 for implementing an ensemble of AI models, one for each of a plurality of sequencing cycles. The entire figure illustrates a production context 1602 (such as using a production sequencing instrument). From left to right the figure illustrates a decision section 1622 (e.g., determining which range of cycles a particular cycle is in), a NN section 1604, and a base calling section 1620. For clarity, the training of the NN section is omitted from the figure.

As a specific example, Model 1 (1612) is trained using images from a first sequencing cycle range 1606, e.g., sequencing cycles 1-10, Model 2 (1614) is trained using images from a second sequencing cycle range 1608, e.g., sequencing cycles 11-19, and Model 3 (e.g., Model N 1616) is trained using images from a third sequencing cycle range, e.g., sequencing cycles 20-29. During production, responsive to the current sequencing cycle being of the first sequencing cycle range (e.g., being any of the $1^{st}$ through the $10^{th}$ sequencing cycles), Model 1 is used to enhance reduced settling time images. Responsive to the current sequencing cycle being of the second sequencing cycle range (e.g., being any of the $11^{th}$ through the $19^{th}$ sequencing cycles), Model 2 is used to enhance reduced settling time images. Responsive to the current sequencing cycle being of the third sequencing cycle range (e.g., being any of the $20^{th}$ through the $29^{th}$ sequencing cycles), Model 2 is used to enhance reduced settling time images. Responsive to the current sequencing cycle being of some other cycle range (e.g., being of the $30^{th}$ sequencing cycle or beyond), a Default Model 1618 is used to enhance reduced settling time images.

In some implementations, an indexed sequencing may be performed that enables multiple libraries to be pooled and sequenced together. A unique identifier, e.g., one or more index sequences, is added to samples during library preparation. During indexed sequencing, each of the index sequences is sequenced in separate index read operations (e.g., Index Read 1 and Index Read 2 operations). For example, a first plurality of bases is sequenced via a (non-index) Read 1 operation. Then an index is sequenced via an Index 1 Read operation, or alternatively a first index and a second index are sequenced respectively via an Index 1 Read operation followed by an Index 2 Read operation. Then a second plurality of bases is sequenced via a (non-index) Read 2 operation.

In some ensemble of AI model implementations, a Read 1 Model, an Index Read 1 Model, and a Read 2 Model, each corresponding to respective sequencing cycle ranges of the Read 1 operation, the Index 1 Read operation, and the Read 2 operation, are trained, and then used during production for each of the corresponding respective cycle ranges. In some implementations, the sequencing cycle ranges corresponding to the Read 1 operation, the Index 1 Read operation, and the Read 2 operation, are contiguous.

In some ensemble of AI model implementations, an Index Read 2 Model, corresponding to a sequencing cycle range of the Index 2 Read operation, is trained, and then used during production for the Index 2 Read operation sequencing cycle range, in addition to a Read 1 Mode, an Index Read 1 Model, and a Read 2 Model. In some implementations, the sequencing cycle ranges corresponding to the Read 1 operation, the Index 1 Read operation, the Index 2 Read operation, and the Read 2 operation, are contiguous.

In some implementations, Model 1, Model 2, Model N, and the Default Model 1618 are of a same NN architecture. In some implementations, each of Model 1, Model 2, Model N, and the Default Model 1618 is of a respective unique NN architecture. In various implementations, any one or more of the models are of various NN architectures.

Graceful Failover

Figure 17:
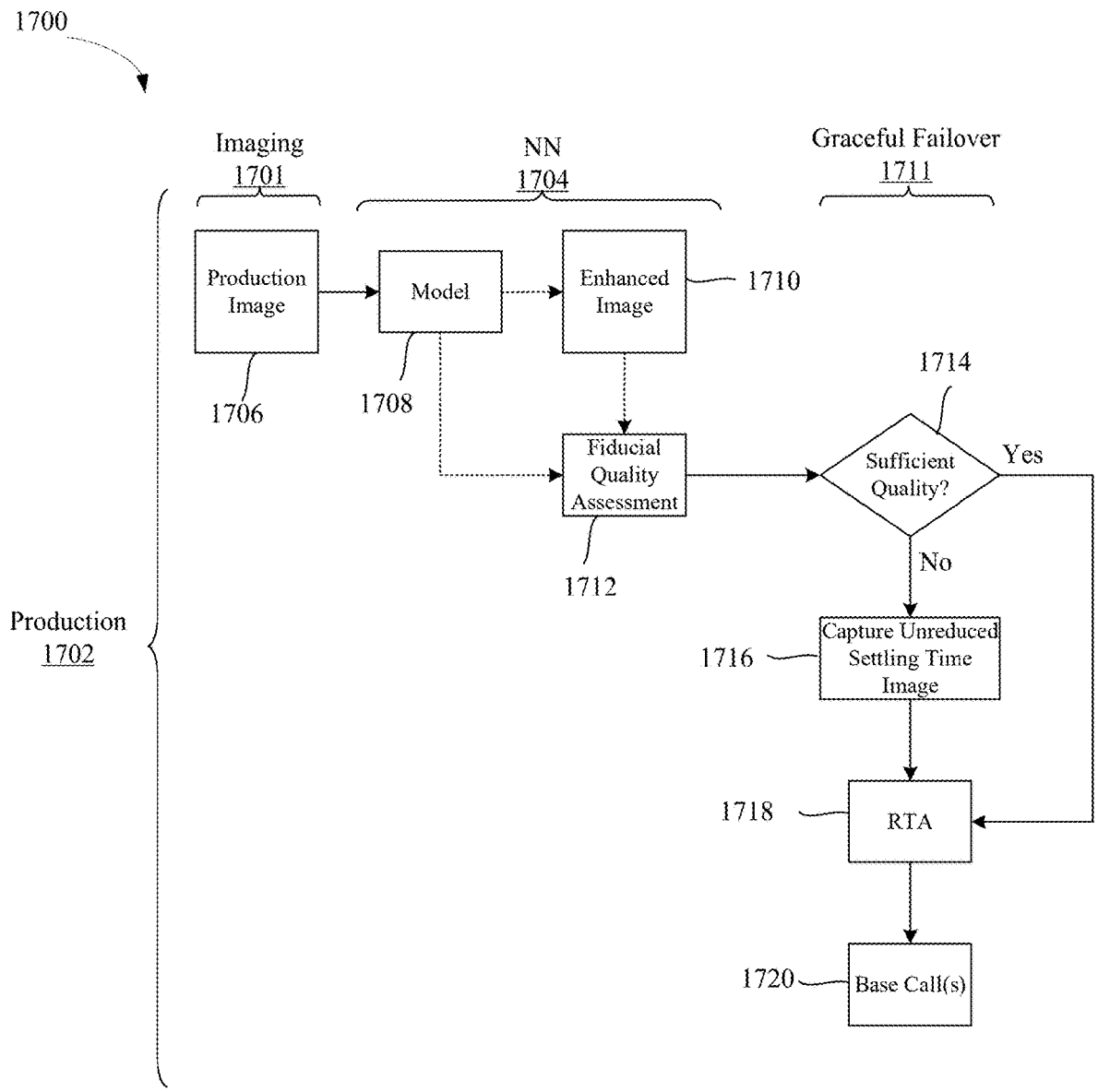
FIG. 17 illustrates graceful failover from AI-driven enhancement of a reduced settling time image to an unreduced settling time image via capturing an image after the unreduced settling time.

FIG. 17 illustrates a system 1700 implementing graceful failover from AI-driven enhancement of a reduced settling time image to an unreduced settling time image via capturing an image after the unreduced settling time. The entire figure illustrates a production context 1702 (such as using a production sequencing instrument). From left to right, the figure illustrates an image collection section 1701, a NN section 1704, and a graceful failover section 1711. For clarity, the training of the NN section is omitted from the figure.

In operation, a production image 1706 (e.g., an image taken after a reduced settling time and thus potentially subject to motion blur) is processed by a trained AI model 1708 to produce an enhanced image 1710 and information for a fiducial quality assessment 1712. The fiducial quality assessment 1712 also receives information of the enhanced image 1710 and determines a fiducial quality assessment result. The fiducial quality assessment result is compared, e.g., to a predetermined and/or dynamically determined threshold. If the result is greater than or equal to the threshold, indicating sufficient quality 1714, then processing proceeds to Real Time Analysis (RTA) 1718 and one or more subsequent base calls based on the enhanced image. If the result is less than the threshold, indicating insufficient quality (e.g., the AI model has in some sense failed), then processing proceeds to capture an image after the unreduced settling time, such as by waiting an additional settling time before, at 1716, capturing an image without motion blur. Then processing proceeds to RTA and one or more subsequent base calls 1720 based on the unreduced settling time image (e.g., reverts to a non-AI mode of operation responsive to the AI model failure).

Transfer Learning

Figure 18:
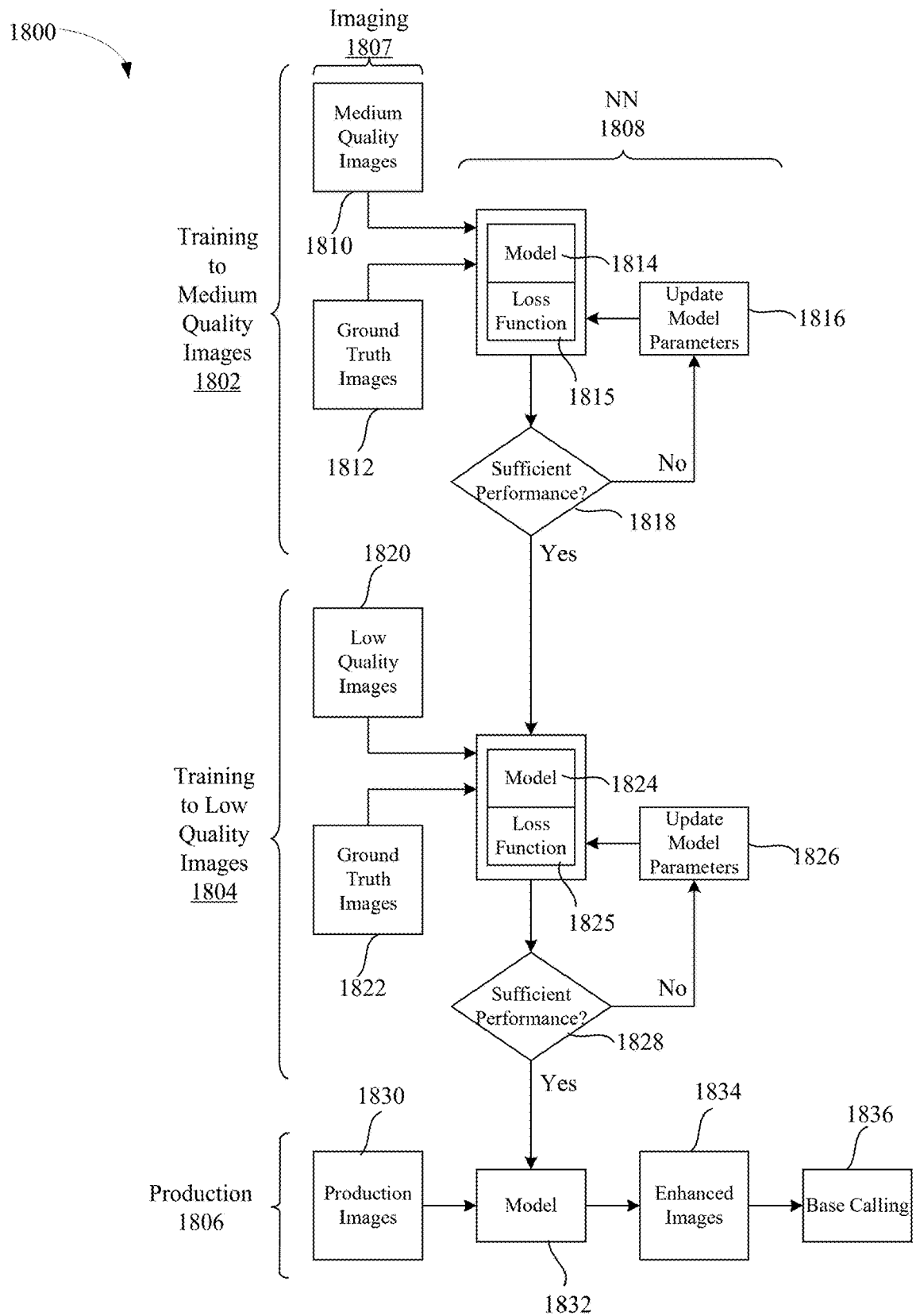
FIG. 18 illustrates transfer learning from learning with medium quality images to learning with low quality images.

FIG. 18 illustrates a system 1800 implementing transfer learning from learning with medium quality images to learning with low quality images. From top to bottom, the figure illustrates a training context (to medium quality images), a training context (to low quality images), and a production context. Each of the AI models in the training to medium quality images context 1802, the training to low quality images context 1804, and the production context 1806 is of a same NN architecture. From left to right, the figure illustrates an image collection section 1807, a NN section 1808, and a base calling section 1836.

Processing begins by training a medium quality image AI model in the training to medium quality images context 1802. Parameters of the medium quality image AI model 1814 are initialized to starting values, e.g., randomly within a predetermined range and/or distribution. Medium quality images 1810 and ground truth images 1812 are processed by the medium quality image AI model 1814. An associated loss function 1815 is usable in part to update the medium quality image AI model 1814 (such as via gradient update and/or gradient descent techniques) until there is sufficient performance.

Responsive to the sufficient performance of the medium quality image AI model 1814 (e.g., completion of training of the medium quality image AI model), processing proceeds to the low-quality image AI model context 1804. Parameters of the low-quality image AI model are initialized, e.g., based in whole or in part on the parameters of the (trained) the medium quality image AI model 1814, thus practicing a form of transfer learning. Low quality images 1820 and ground truth images 1822 are processed by the low-quality image AI model 1824. An associated loss function 1825 is usable in part to update the low-quality image AI model 1824 (such as via gradient update and/or gradient descent techniques) until there is sufficient performance.

Responsive to the sufficient performance of the low-quality image AI model 1824 (e.g., completion of training of the low quality image AI model), processing proceeds to the production context 1806. Parameters of a production AI model 1832 are initialized, e.g., based in whole or in part on the parameters of the (trained) low quality image AI model 1824. Production images 1830 (e.g., corresponding to quality of the low-quality images used to train the low quality image AI model 1824) are processed by the production AI model 1832 into enhanced images 1834 corresponding to quality of the medium quality images used to train the medium quality image AI model 1814. The enhanced images 1834 are then used to perform base calling 1836.

As a specific example, the medium quality image AI model 1814, the low-quality image AI model 1824, and the production AI model 1832 are all of a same NN architecture. The initializing of the starting values of the low-quality image AI model 1824 is performed by copying from the parameters of the trained medium quality image AI model 1814. The initializing of the parameters of the production AI model 1832 is performed by copying from the parameters of the trained low quality image AI model. Each of the copying of parameters corresponds conceptually to transferring trained filter information from the trained AI model to the AI model being initialized for subsequent training or production.

Other Implementation Information

In various implementations, any one or more of the training contexts illustrated and/or described with respect to any of FIG. 14, FIG. 15, FIG. 16, FIG. 17, and/or FIG. 18 correspond to the training contexts of any one or more of FIG. 1, FIG. 4, FIG. 5, and/or FIG. 6. In various implementations, any one or more of the production contexts illustrated and described with respect to any of FIG. 14, FIG. 15, FIG. 16, FIG. 17, and/or FIG. 18 correspond to the training contexts of any one or more of FIG. 1, FIG. 4, FIG. 5, and/or FIG. 6.

As a specific example, techniques disclosed in FIG. 1 are applicable to the techniques disclosed in FIG. 14. For example, the training context 102 of FIG. 1, as used with paired images, is applicable to the laboratory training context 1402 of FIG. 14. Continuing with the example, the training context 102 of FIG. 1, as used with paired images and further training iterations, is applicable to the production training context 1404 of FIG. 14, with production images being used as Reduced Settling Time Images 122 and fiducial ground truth image data being used as Unreduced Settling Time Images 124. Further continuing with the example, the production context 104 of FIG. 1 is applicable to the production context 1406 of FIG. 14, with the Trained Generator Filter Info 142 corresponding to results (e.g., updated parameters) of the fine tuning produced by the production training context.

FIGS. 20A-C collectively illustrate example equations relating to loss functions. FIG. 20A illustrates an example equation for an adversarial loss, such as a generator versus discriminator conditional-adversarial loss. FIG. 20B illustrates an example equation for an L1 loss function. FIG. 20C illustrates an example equation combining the adversarial loss function of FIG. 20A with the L1 loss function of FIG. 20C with a weighting parameter, lambda. In some implementations, the example equations illustrated in FIGS. 20A-C are application to a CGAN, such as illustrated and described with respect to FIG. 4.

In various implementations, any one or more of the fiducial loss functions and/or the fiducial quality assessment illustrated with respect to any of FIG. 14, FIG. 15, and/or FIG. 17 correspond to and/or are used by reward-based training to maximize an image quality score. In some implementations, an image quality assessment (e.g., such as based on any one or more of an FWHM of an image PSF, a focus quality score, a Brenner focus measure, a score from a pretrained discriminator such as operated to classify an image, and a score from a discriminator previously trained in a laboratory context) is used instead of and/or in addition to a fiducial quality assessment.

In various implementations, a single-image loss function (operable, e.g., solely with production reduced settling time images) is used instead of or in addition to any one or more of the fiducial loss functions and/or the fiducial quality assessment illustrated with respect to any of FIG. 14, FIG. 15, and/or FIG. 17. Examples of single-image loss functions are based on any combination of minimizing and/or reducing an FWHM value of an image PSF, a focus quality score (e.g., a Brenner focus measure), a score from a pretrained discriminator (e.g., operated to classify an image), and a score from a discriminator previously trained in a laboratory context.

In some implementations, metrology nanowells are included in a flow cell, e.g., nanowells spaced far from other nanowells, enabling efficient quantification of image quality of the metrology wells. Example metrology nanowell image quality measures include FWHM of PSF, intensity variation between metrology nanowells, and differences between expected and measured metrology nanowell locations. In some implementations, metrology nanowell image quality is usable as a basis for determining a single-image loss function. In various implementations, various metrology nanowell image quality measures are applicable to determining fiducial image quality and/or determining a fiducial quality assessment (e.g., as represented by the Fiducial Quality Assessment of FIG. 17).

In various implementations, a flow cell provides a solid surface, such as a substrate, for attachment of oligos. In some implementations, a flow cell is patterned with a plurality of concave features, referred to variously as wells, nanowells, and nanopores. The patterned flow cell is provided with a gel coating, such as selectively inside the wells and not elsewhere, to enable ready attachment of oligos selectively in the wells only. In some scenarios, usage of patterned flow cells with wells enables population of most of the wells with a single species of oligo.

In various implementations, the wells are arranged on the flow cell according to various patterns, such random or repeating. The repeating patterns result in patterning of the flow cell being similar throughout, such that various locations of the flow cell have similar patterning. Example repeating patterns include triangular, rectilinear, and hexagonal patterns. The wells themselves as well as patterning of the wells are characterizable according to one or more well patterning characteristics, such as one or more well dimensions and/or patterning thereof, well size (such as opening area, bottom area, and/or cavity volume), well spacing and/or pitch (such as interstitial distance between wells or patterning thereof), and/or well density (such as number of wells per unit area of a substrate). In some implementations, the well patterning characteristics include information relating to fiducials, such as location of wells compared to fiducial elements and/or components.

In various implementations, information relating to various combinations of the well patterning characteristics are provided to the NNs of any of the training contexts described elsewhere herein. For example, dimension information (e.g., relating to well opening size and/or well pitch) is provided during training to enable NN processing to determine where a cluster and/or well is to be imaged, such as resolving individual clusters and/or wells from a plurality of clusters and/or wells that would otherwise appear merged, e.g., in a blurry image.

In some implementations, collected and/or enhanced images correspond to full-sized images, e.g., encompassing an entire or a substantially entire field of view of an imager. In some implementations, collected and/or enhanced images correspond to less than full-sized images, e.g., encompassing less or substantially less than an entire field of view of an imager. In some implementations, collected and/or enhanced images correspond to respective patches of an original image collected by an imager, e.g., processing is via patches of input images.

In the foregoing descriptions of AI-driven enhancement of motion blurred sequencing images (e.g., as illustrated by or described in relation to any of FIG. 1, FIG. 4, FIG. 5, FIG. 6, FIG. 14, FIG. 15, FIG. 16, FIG. 17, and FIG. 18), some example details are described with respect to implementations using CNN techniques. Other implementations use techniques in place of or in addition to CNN techniques, such as any combination of any one or more of the various examples of NNs described elsewhere herein. As a first specific example, with respect to FIG. 6, the generator elements and/or the discriminator elements are implemented at least in part using a fully connected NN. As a second specific example, again with respect to FIG. 6, the generator and/or the discriminator elements are implemented at least in part using one or more layers performing an attention operation. As a third specific example, with respect to FIG. 1, the Generator (G) and/or the Discriminator (D) are implemented at least in part using a transformer.

Figure 19:
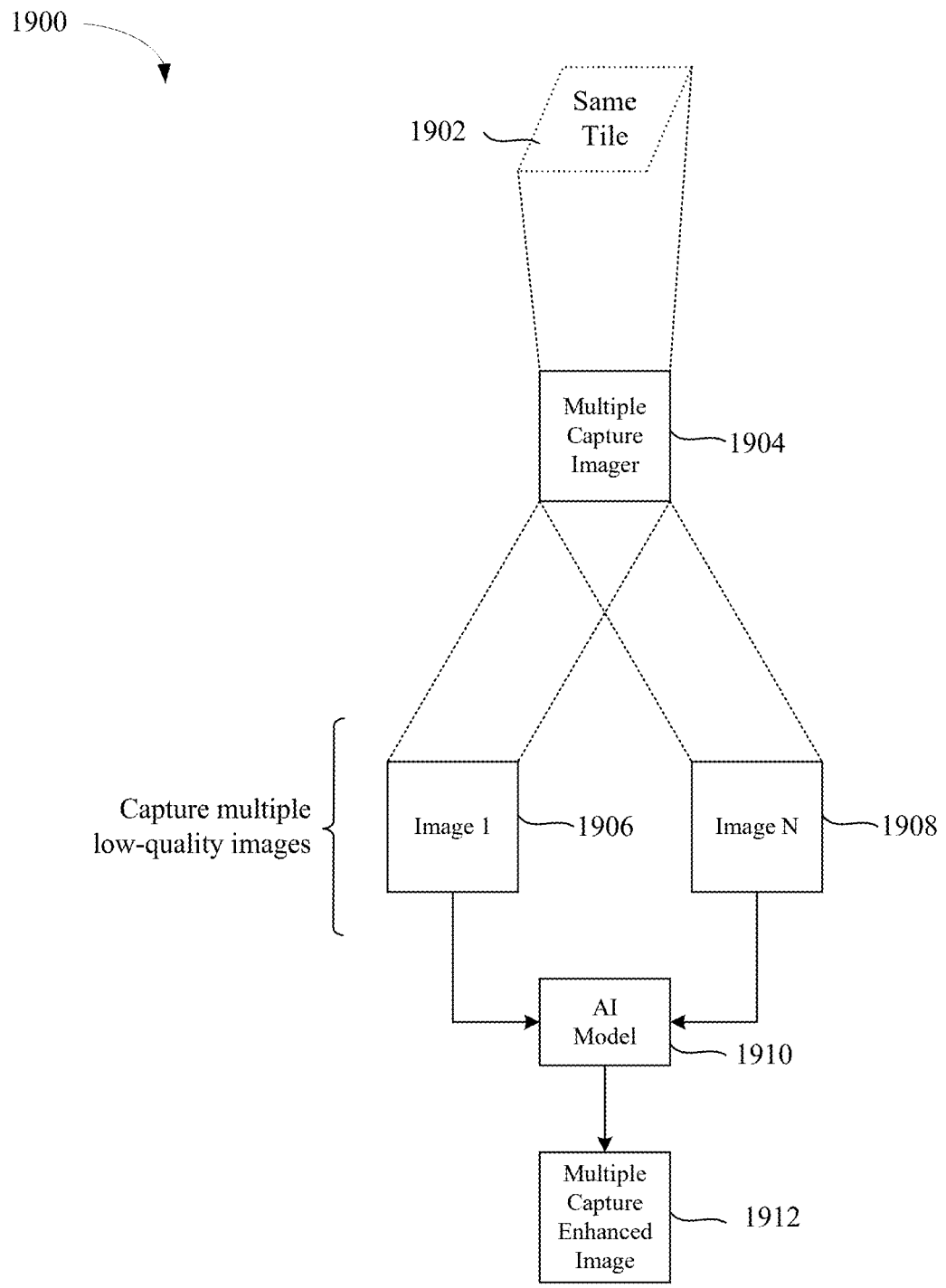
FIG. 19 illustrates producing an enhanced image by capturing multiple images of a same tile with a multiple capture imager and then processing the multiple images with an AI model.

In various implementations, any one or more of the Model elements illustrated in any one or more of FIG. 14 (e.g., the laboratory instrument training Model 1414, the production instrument training Model 1420, and the production Model 1428), FIG. 15 (e.g., the production instrument training Model 1514 and the production context Model 1522), FIG. 16 (e.g., Model 1 1612, Model 2 1614, Model N 1616, and the Default Model 1618), FIG. 17 (e.g., the production Model 1708), and FIG. 18 (e.g., the training to medium quality images Model 1814, the training to low quality images Model 1824, and the production Model 1832), and FIG. 19 (e.g., the AI Model 1910) are variously implemented via any one or more of a GAN (e.g., having a Generator and a Discriminator), an autoencoder, U-Net-based NN, a transformer and/or any combination of any one or more of the various examples of NNs described elsewhere herein.

Multi-Image Step and Settle

In some step and settle implementations, around ⅓ of imaging duty cycle time is used collectively by step operations and settle operations (e.g., as manifested by accumulation of unreduced movement settling times for each of a plurality of sequencing cycles of a sequencing run). Thus, reducing time used for the step operations and/or the settle operations is beneficial. In some usage scenarios, capturing multiple images under different imaging conditions enables reconstruction of a higher quality image (e.g., as in Structured Illumination Microscopy (SIM)). In some implementations, there is an opportunity to capture multiple (motion blurred) images during the movement settling time, and then to process the multiple images with an AI model to reconstruct a single non-blurred image.

FIG. 19 illustrates a system 1900 for producing an enhanced image by capturing multiple images of a same tile with a multiple capture imager and then processing the multiple images with an AI model. A Multiple Capture Imager 1904 is enabled to capture multiple low-quality images (Image 1 (1906) . . . Image N (1908)) of a same tile 1902 during a movement settling time (e.g., while there is relative movement between the imager and the tile being imaged) in a step and settle sequencing implementation. The multiple images are subject to image blur and are therefore low-quality images. The multiple images are processed by an AI model 1910 to reconstruct a single non-burred (high-quality) image (Multiple Capture Enhanced Image 1912). In some implementations, the reconstructed image is used instead of using an image captured after waiting for complete cessation of relative movement between the imager and the tile being imaged, thus enabling improved performance (e.g., throughput).

CLAUSES

The technology disclosed, including the clauses disclosed in this section, is variously practiced as a system, method, or article of manufacture. One or more features of an implementation are variously combinable with one or more base implementations. Implementations that are not mutually exclusive are taught to be combinable. One or more features of an implementation are variously combinable with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed, or elements thereof are implementable in the form of a computer product, including a non-transitory computer readable storage medium with computer usable program code for performing the method steps indicated. Furthermore, one or more implementations and clauses of the technology disclosed, or elements thereof are implementable in the form of an apparatus including a memory and at least one processor that is coupled to the memory and operative to perform exemplary method steps. Yet further, in another aspect, one or more implementations and clauses of the technology disclosed or elements thereof are implementable in the form of means for carrying out one or more of the method steps described herein; the means including (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section are variously combinable as features. In the interest of conciseness, the combinations of features are not individually enumerated and are not repeated with each base set of features. The reader will understand how features identified in the clauses described in this section are readily combinable with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section include a non-transitory computer readable storage medium storing instructions executable by a processor to perform any of the clauses described in this section. Yet another implementation of the clauses described in this section include a system including memory and one or more processors operable to execute instructions, stored in the memory, to perform any of the clauses described in this section.

We disclose the following clauses:

Encoder/Decoder Implementation

1. A method of reducing settling time used for collecting images during sequencing, the method comprising:
  accessing a training set of paired images taken after an unreduced settling time and after a reduced settling time during sequencing, the reduced settling time being before the unreduced settling time;
  wherein a settling time reduction ratio between the unreduced settling time, before reduction, and the reduced settling time, after reduction, is at least 2 to 1;
  training a convolutional neural network that has an encoder stage and a decoder stage each updating respective pluralities of parameters during the training, the respective pluralities of parameters collectively enabling substantially recovering enhanced images, as if taken after the unreduced settling time, from unenhanced images taken after the reduced settling time, after reduction;
  whereby trained filters of the convolutional neural network enable adding information to images taken after the reduced settling time to enable production of the enhanced images; and
  saving the trained filters for use processing collected images from sequencing by synthesis taken after the reduced settling time.

2. The method of clause 1, wherein the encoder stage provides an intermediate representation to the decoder stage.

3. The method of clause 1, wherein the convolutional neural network is a training convolutional neural network and further comprising accessing production images taken after the reduced settling time and using information of the trained filters in a production convolutional neural network to enhance the production images as if taken after the unreduced settling time.

4. The method of clause 3, wherein the training convolutional neural network and the production convolutional neural network are of a same neural network architecture.

GAN Implementation

5. A method of reducing settling time used for collecting images during sequencing, the method comprising:
  accessing a training set of paired images taken after an unreduced settling time and after a reduced settling time during sequencing;
  wherein a settling time reduction ratio between the unreduced settling time, before reduction, and the reduced settling time, after reduction, is at least 2 to 1;
  training a convolutional neural network comprising a generative adversarial network that has a generator stage and a discriminator stage each updating respective pluralities of parameters during the training, the plurality of parameters of the generator stage enabling substantially recovering enhanced images, as if taken after the unreduced settling time, from unenhanced images taken after the reduced settling time, after reduction;
  whereby trained filters of the convolutional neural network enable adding information to images taken after the reduced settling time to enable production of the enhanced images; and
  saving the trained filters for use processing collected images from sequencing taken after the reduced settling time.

6. The method of clause 5, wherein the generator stage provides candidate enhanced images to the discriminator stage.

7. The method of clause 5, wherein the convolutional neural network is a training convolutional neural network, and the generator stage is a training generator stage, and further comprising accessing production images taken after the reduced settling time and using information of the trained filters in a production convolutional neural network that has a production generator stage to enhance the production images as if taken after the unreduced settling time.

8. The method of clause 7, wherein the training generator stage and the production generator stage are of a same neural network architecture.

CycleGAN Implementation
  9. A method of reducing settling time used for collecting images during sequencing, the method comprising:
  accessing a training set of images taken after an unreduced settling time and after a reduced settling time during sequencing;
  wherein a settling time reduction ratio between the unreduced settling time, before reduction, and the reduced settling time, after reduction, is at least 2 to 1;
  training a convolutional neural network comprising a cycle-consistent generative adversarial network that has first and second generator stages and first and second discriminator stages, each of the generator stages and each of the discriminator stages updating respective pluralities of parameters during the training, the plurality of parameters of the first generator stage enabling substantially recovering enhanced images, as if taken after the unreduced settling time, from unenhanced images taken after the reduced settling time, after reduction;
  whereby trained filters of the convolutional neural network enable adding information to images taken after the reduced settling time to enable production of the enhanced images; and
  saving the trained filters for use processing collected images from sequencing taken after the reduced settling time.
  10. The method of clause 9, wherein the first generator stage provides candidate enhanced images to the first discriminator stage and the second generator stage provides candidate unenhanced images to the second discriminator stage.
  11. The method of clause 10, wherein the training comprises determining a first pixel-based loss in part by processing the images taken after the unreduced settling time by a cascade of the second generator stage followed by the first generator stage and further comprises determining a second pixel-based loss in part by processing the images taken after the reduced settling time by a cascade of the first generator stage followed by the second generator stage.
  12. The method of clause 9, wherein the convolutional neural network is a training convolutional neural network, and the first generator stage is a training generator stage, and further comprising accessing production images taken after the reduced settling time and using information of the trained filters in a production convolutional neural network that has a production generator stage to enhance the production images as if taken after the unreduced settling time.
  13. The method of clause 12, wherein the training generator stage and the production generator stage are of a same neural network architecture.

Dependent Clauses for Unreduced and Reduced Settling Time Sampling
  14. The method of any of clauses 1, 5, or 9, further comprising producing the images of the training set taken after the unreduced settling time by imaging after cessation of vibrations between an imager and samples and further comprising producing the images of the training set taken after the reduced settling time by imaging before the cessation of vibrations.
  15. The method of any of clauses 1 or 5, further comprising producing the images of the training set taken after the unreduced settling time by imaging after cessation of vibration between an imager and samples and further comprising producing the images of the training set taken after the reduced settling time by synthetically impairing the images of the training set taken after the unreduced settling time.
  16. The method of any of clauses 1, 5, or 9, wherein the settling time reduction ratio is between 2 to 1 and 10 to 1.

Dependent Clauses for Using a Trained Network
  17. The method of any of clauses 1, 5, or 9, further comprising base calling from the enhanced images.
  18. The method of any of clauses 1, 5, or 9, further comprising the processing collected images from sequencing by synthesis taken after the reduced settling time.
  19. The method of clause 18, further comprising base calling from the processed collected images.
  20. The method of any of clauses 1, 5, or 9, wherein the convolutional neural network is a first convolutional neural network and further comprising base calling using a second convolutional neural network having neural network parameters derived from the saved trained filters.
  21. The method of any of clauses 1, 5, or 9, further comprising accessing a production set of images taken after the reduced settling time and using information of the trained filters to produce enhanced production images as if taken after the unreduced settling time.
  22. The method of clause 21, further comprising base calling from the enhanced production images.
  23. The method of clause 1, wherein the convolutional neural network is a first convolutional neural network of a particular architecture and further comprising base calling using a second convolutional neural network of the particular architecture and having neural network parameters derived from the trained filters.
  24. The method of clause 5, wherein the generator stage is a first generator stage of a particular architecture and further comprising base calling using a second generator stage of the particular architecture and having neural network parameters derived from the saved trained filters.
  25. The method of clause 9, wherein the first generator stage is a training generator stage of a particular architecture and further comprising base calling using a production generator stage of the particular architecture and having neural network parameters derived from the saved trained filters.

Dependent Clauses for Network Types
  26. The method of any of clauses 1, 5, or 9, wherein elements of the trained filters correspond to elements of the respective pluralities of parameters.
  27. The method of clause 1, wherein the convolutional neural network comprises skip connections between the encoder stage and the decoder stage.
  28. The method of clause 5, wherein the generator stage comprises skip connections.
  29. The method of clause 5, wherein the generator stage comprises encoder and decoder stages and skip connections between the encoder and the decoder stages.
  30. The method of clause 5, wherein the discriminator stage comprises an output layer that averages over patches.
  31. The method of any of clauses 1, 5, or 9, wherein the convolutional neural network comprises a plurality of multi-dimensional convolutional layers.
  32. The method of any of clauses 1, 5, or 9, wherein the convolutional neural network comprises any combination of any one or more of one or more 1D convolutional layers,
one or more 2D convolutional layers,
one or more 3D convolutional layers,
one or more 4D convolutional layers,
one or more 5D convolutional layers,
one or more multi-dimensional convolutional layers,
one or more single channel convolutional layers,
one or more multi-channel convolutional layers,
one or more 1×1 convolutional layers,
one or more atrous convolutional layers,
one or more dilated convolutional layers,
one or more transpose convolutional layers,
one or more depthwise separable convolutional layers,
one or more pointwise convolutional layers,
one or more 1×1 convolutional layers,
one or more group convolutional layers,
one or more flattened convolutional layers,
one or more spatial convolutional layers,
one or more spatially separable convolutional layers,
one or more cross-channel convolutional layers,
one or more shuffled grouped convolutional layers,
one or more pointwise grouped convolutional layers,
one or more upsampling layers,
one or more downsampling layers, one or more averaging layers, and
one or more padding layers.

33. The method of any of clauses 1, 5, or 9, wherein the training comprises evaluating one or more non-linear activation functions.

34. The method of clause 33, wherein the non-linear activation functions comprise any one or more of any combination of a rectifying linear unit function, a leaky rectifying linear unit function, a parametric rectified linear unit, a Gaussian Error Linear Unit (GELU) function, a sigmoid linear unit function, a sigmoid shrinkage function, an SiL function, a Swish-1 function, a Mish function, a Gaussian function, a softplus function, a maxout function, an Exponential Linear Unit (ELU) function, a Scaled Exponential Linear Unit (SELU) function, a logistic function, a sigmoid function, a soft step function, a softmax function, a Tangens hyperbolicus function, a tanh function, an arctan function, an ElliotSig/Softsign function, an Inverse Square Root Unit (ISRU) function, an Inverse Square Root Linear Unit (ISRLU) function, and a Square Nonlinearity (SQNL) function.

35. The method of any of clauses 1, 5, or 9, wherein the convolutional neural network comprises any combination of batch normalization layers, regularization layers, and pooling layers.

36. The method of any of clauses 1, 5, or 9, wherein the convolutional neural network comprises one or more layers that implement dropout.

Dependent Clauses for Paired Images

37. The method of any of clauses 1 or 5, wherein each pair of images is of a same respective imaged area and comprises a first image taken after the reduced settling time and a second image taken after the unreduced settling time, and the first image is taken before the second image is taken.

38. The method of clause 37, wherein the training comprises computing a loss function that considers the second image of each pair as ground truth corresponding to the first image of the respective pair.

39. The method of clause 37, wherein the training comprises aligning the first and the second images of each pair with respect to each other based on fiducial elements of the respective imaged area.

40. The method of clause 5, wherein each pair of images is of a same respective imaged area and comprises a first image taken after the reduced settling time and a second image taken after the unreduced settling time, and the training comprises the discriminator stage discriminating between the second images of the pairs and results of the generator stage processing the first images of the pairs.

Dependent Clauses for Unpaired Images

41. The method of clause 9, wherein the training set images taken after the unreduced settling time are of a first set of imaged areas, the training set images taken after the reduced settling time are of a second set of imaged areas, and the first and the second sets of imaged areas are different.

Dependent Clauses for Loss Functions

42. The method of any of clauses 1, 5, or 9, wherein the training comprises determining one or more loss terms comprising any combination of any one or more of a logistic regression/log loss, a multi-class cross-entropy/softmax loss, a binary cross-entropy loss, a mean squared error loss, a mean absolute error loss, a mean absolute percentage error loss, a mean squared logarithmic error loss, an L1 loss, an L2 loss, a smooth L1 loss, a Huber loss, a patch-based loss, a pixel-based loss, a pixel-wise loss, a single-image loss, and a fiducial-based loss.

43. The method of clause 42, wherein the updating is based at least in part on the loss terms.

44. The method of clause 43, wherein the updating is via gradient descent using information from the loss terms.

45. The method of any of clauses 1, 5, or 9, wherein the training comprises determining a pixel-based loss.

Dependent Clauses for Fiducial Fine Tuning

46. The method of any of clauses 1, 5, or 9, wherein the convolutional neural network is a training convolutional neural network comprised in a training sequencing instrument and further comprising training a production convolutional neural network comprised in a production sequencing instrument, the training the production convolutional neural network starting with information of the trained filters and updating parameters of the production convolutional neural network based on processing fiducial elements of tuning images obtained via the production sequencing instrument and wherein the tuning images are taken after the reduced settling time.

47. The method of clause 46, further comprising using the production sequencing instrument to perform base calling based on processing post-tuning images taken after the reduced settling time based on the updated parameters.

48. The method of clause 46, wherein the production sequencing instrument is one of a plurality of production sequencing instruments that are each individually trained starting with information of the trained filters.

49. The method of clause 46, wherein the updating parameters of the production convolutional neural network based is further based on a fiducial loss function.

50. The method of clause 46, further comprising repeating the training the production convolutional neural network over a lifetime of the production sequencing instrument.

51. The method of clause 46, further comprising repeating the training the production convolutional neural network responsive to a determination that recalibration of the production sequencing instrument is required.

Dependent Clauses for Image Quality Fine Tuning

52. The method of any of clauses 1, 5, or 9, wherein the convolutional neural network is a training convolutional neural network comprised in a training sequencing instrument and further comprising training a production convolutional neural network comprised in a production sequencing instrument, the training the production convolutional neural network starting with information of the trained filters and updating parameters of the production convolutional neural network based on assessing image quality of tuning images obtained via the production sequencing instrument and wherein the tuning images are taken after the reduced settling time.

53. The method of clause 52, further comprising using the production sequencing instrument to perform base calling based on processing post-tuning images taken after the reduced settling time based on the updated parameters.

54. The method of clause 52, wherein the production sequencing instrument is one of a plurality of production sequencing instruments that are each individually trained starting with information of the trained filters.

55. The method of clause 52, wherein the updating parameters of the production convolutional neural network based is further based on a single-image loss function.

56. The method of clause 52, further comprising repeating the training the production convolutional neural network over a lifetime of the production sequencing instrument.

57. The method of clause 52, further comprising repeating the training of the production convolutional neural network responsive to a determination that recalibration of the production sequencing instrument is required.

Dependent Clauses for Ensemble of Models

58. The method of any of clauses 1, 5, or 9, wherein the sequencing is sequencing by synthesis and comprises a plurality of cycles, each cycle corresponding to a single base call for each of a plurality of oligos, each cycle occurring one after another sequentially, and the training is performed with respect to a plurality of contiguous non-overlapping ranges of the cycles, resulting in a plurality of trained filters each corresponding to a respective one of the non-overlapping cycle ranges.

59. The method of clause 58, further comprising base calling using convolutional neural network processing based on a particular one of the pluralities of trained filters selected according to which of the non-overlapping cycle ranges the base calling corresponds to.

Dependent Clauses for Failover Aka Elegant Failure

60. The method of any of clauses 1, 5, or 9, further comprising determining image quality of the enhanced images, and responsive to the quality being below a threshold, recapturing one or more of the images taken after the reduced settling time using the unreduced settling time.

61. The method of clause 60, wherein the image quality is based in part on single-image quality assessment and/or fiducial elements of the enhanced images.

62. The method of clause 60, further comprising base calling from the recaptured images.

Dependent Clauses for Transfer Learning Aka Converging to Medium Quality

63. The method of any of clauses 1, 5, or 9, further comprising pretraining the convolutional neural network using pretraining images taken after a settling time that is greater than the reduced settling time and less than the unreduced settling time.

64. The method of clause 63, wherein the pretraining is in accordance with a first loss function and the training is in accordance with a second loss function.

65. The method of clause 63, wherein the pretraining further uses images taken after the unreduced settling time.

Dependent Clauses for Incorporating x-y Stage Position

66. The method of any of clauses 1, 5, or 9, wherein the training set comprises information regarding a respective x-y stage position of each image.

67. The method of clause 66, wherein the production of the enhanced images is based in part on x-y stage position information of the images taken after the reduced settling time.

Dependent Clauses for Multi-Image Step and Settle

68. The method of any of clauses 1, 5, or 9, wherein each of the images taken after the reduced settling time is produced by capturing multiple images of a same tile with a multiple capture imager and then processing the multiple images with an AI model to produce the respective image taken after the reduced settling time.

69. The method of clause 68, wherein each of the multiple images is taken before the unreduced settling time.

70. The method of clause 68, wherein the multiple images are taken when there are different relative velocities between the same tile and the multiple capture imager.

Dependent Clauses for Computer System

71. The method of any of clauses 1, 5, or 9, wherein the convolutional neural network is implemented via any combination of any one or more of:

one or more processors enabled to execute software, one or more Central Processing Units (CPUs), one or more Graphics Processing Units (GPUs), one or more Field Programmable Gate Arrays (FPGAs), one or more Coarse-Grained Reconfigurable Architectures (CGRAs), one or more Application-Specific Integrated Circuits (ASICs), one or more Application Specific Instruction-set Processor (ASIP), and one or more Digital Signal Processors (DSPs).

72. The method of clause 20, wherein the first convolutional neural network is implemented in accordance with a first implementation technology, the second convolutional neural network is implemented in accordance with a second implementation technology, and the first and the second implementation technologies are distinct.

73. The method of clause 72, wherein the first implementation technology comprises one or more Application Specific Integrated Circuits (ASICs).

74. The method of clause 73, wherein the second implementation technology comprises one or more processors enabled to execute software and/or one or more Field Programmable Gate Arrays (FPGAs) configured to perform convolutional neural network processing.

Autoencoder/GAN/CycleGAN

75. A method of reducing settling time used for collecting images during sequencing, the method comprising:

accessing a training set of paired images taken after an unreduced settling time and after a reduced settling time during sequencing, the reduced settling time being before the unreduced settling time;

wherein a settling time reduction ratio between the unreduced settling time, before reduction, and the reduced settling time, after reduction, is at least 2 to 1;

training a neural network enabled to update one or more pluralities of parameters during the training, the respective pluralities of parameters collectively enabling substantially recovering enhanced images, as if taken after the unreduced settling time, from unenhanced images taken after the reduced settling time, after reduction;

whereby trained filters of the neural network enable adding information to images taken after the reduced settling time to enable production of the enhanced images; and saving the trained filters for use processing collected images from sequencing taken after the reduced settling time.

76. The method of clause 75, wherein the neural network comprises a convolutional neural network.

77. The method of clause 76, wherein the convolutional neural network is selected from the group consisting of an autoencoder, a generative adversarial network, and a cycle-consistent generative adversarial network.

78. The method of clause 75, wherein the neural network comprises one or more attention layers.

79. The method of clause 75, wherein the neural network comprises one or more transformers.

80. The method of clause 75, wherein the images comprise paired images.

81. The method of clause 75, wherein the training set of images lacks any paired images.

System of Processors and Memory

82. A system comprising one or more processors and a memory coupled to the processors; and wherein the memory is loaded with computer instructions that when executed on the processors cause the processors to implement actions to perform any of the foregoing method clauses.

Computer Readable Storage Medium (CRM)

83. A non-transitory computer readable storage medium impressed with computer program instructions, which, when executed on a processor, implement any of the foregoing method clauses.

Biological Sequencing Instrument Implementation

84. A biological sequencing instrument, the biological sequencing instrument comprising:
an optical assembly configured to image a plurality of tiled regions of a biological sample; and
a controller coupled to the optical assembly, wherein the controller is configured to implement any of the foregoing method clauses.

Biological Sequencing Instrument

85. A biological sequencing instrument, the biological sequencing instrument comprising:
a stage having a flow cell receiving surface to support a flow cell having a biological sample;
an optical assembly configured to image a plurality of tiled regions of the biological sample;
a controller coupled to the stage and the optical assembly, the controller configured:
to relatively move the stage and the optical assembly in a step-and-shoot manner, and
to image a tiled region of the plurality of tiled regions prior to settling of the relative movement of the stage and the optical assembly; and wherein the controller utilizes machine learning to image the tiled region of the plurality of tiled regions prior to settling of the relative movement of the stage and the optical assembly by use of a convolutional neural network selected from the group consisting of an autoencoder, a generative adversarial network, and a cycle-consistent generative adversarial network.

What is claimed is:

1. A method of reducing settling time effects in images used for collected images during sequencing, the method comprising:

accessing a training set of paired images taken after an unreduced settling time and after a reduced settling time during a sequencing operation;

wherein a settling time reduction ratio between the unreduced settling time, before reduction, and the reduced settling time, after reduction, is at least 2 to 1;

training a convolutional neural network comprising a generative adversarial network that has a generator stage and a discriminator stage each updating respective pluralities of parameters during the training, the plurality of parameters of the generator stage enabling recovering enhanced images, from unenhanced images taken after the reduced settling time;

whereby trained filters of the convolutional neural network enable adding information to images taken after the reduced settling time to enable production of the enhanced images; and saving the trained filters for use in processing collected images from sequencing taken after the reduced settling time.

2. The method of claim 1, wherein the generator stage provides candidate enhanced images to the discriminator stage.

3. The method of claim 1, wherein the convolutional neural network is a training convolutional neural network, and the generator stage is a training generator stage, and further comprising accessing production images taken after the reduced settling time and using information of the trained filters in a production convolutional neural network that has a production generator stage to enhance the production images as if taken after the unreduced settling time.

4. The method of claim 1, further comprising producing the images of the training set taken after the unreduced settling time by imaging after cessation of vibrations between an imager and samples and further comprising producing the images of the training set taken after the reduced settling time by imaging before the cessation of vibrations.

5. The method of claim 1, further comprising base calling from the enhanced images.

6. The method of claim 1, wherein the convolutional neural network comprises any combination of any one or more of one or more 1D convolutional layers,
one or more 2D convolutional layers,
one or more 3D convolutional layers,
one or more 4D convolutional layers,
one or more 5D convolutional layers,
one or more multi-dimensional convolutional layers,
one or more single channel convolutional layers,
one or more multi-channel convolutional layers,
one or more 1×1 convolutional layers,
one or more atrous convolutional layers,
one or more transpose convolutional layers,
one or more depthwise separable convolutional layers,
one or more pointwise convolutional layers, one or more 1×1 convolutional layers,
one or more group convolutional layers,
one or more flattened convolutional layers,
one or more spatial convolutional layers,
one or more spatially separable convolutional layers,
one or more cross-channel convolutional layers,
one or more shuffled grouped convolutional layers,
one or more pointwise grouped convolutional layers,
one or more upsampling layers,
one or more downsampling layers,
one or more averaging layers, and
one or more padding layers.

7. The method of claim 1, wherein the training comprises determining one or more loss terms comprising any combination of any one or more of a logistic regression/log loss, a multi-class cross-entropy/softmax loss, a binary cross-entropy loss, a mean squared error loss, a mean absolute error loss, a mean absolute percentage error loss, a mean squared logarithmic error loss, an L1 loss, an L2 loss, a smooth L1 loss, a Huber loss, a patch-based loss, a pixel-based loss, a pixel-wise loss, a single-image loss, adversarial loss, and a fiducial-based loss.

8. The method of claim 1, wherein each of the images taken after the reduced settling time is produced by capturing multiple images of a same tile with a multiple capture imager and then processing the multiple images with an AI model to produce the respective image taken after the reduced settling time.

9. The method of claim 1, wherein the convolutional neural network is a training convolutional neural network comprised in a training sequencing instrument and further comprising training a production convolutional neural network comprised in a production sequencing instrument, the training the production convolutional neural network starting with information of the trained filters and updating parameters of the production convolutional neural network based on processing fiducial elements of tuning images obtained via the production sequencing instrument and wherein the tuning images are taken after the reduced settling time.

10. The method of claim 1, wherein the sequencing is sequencing by synthesis and comprises a plurality of cycles, each cycle corresponding to a single base call for each of a plurality of oligos, each cycle occurring one after another sequentially, and the training is performed with respect to a plurality of contiguous non-overlapping ranges of the cycles, resulting in a plurality of trained filters each corresponding to a respective one of the non-overlapping cycle ranges.

11. The method of claim 1, further comprising determining image quality of the enhanced images, and responsive to the quality being below a threshold, recapturing one or more of the images taken after the reduced settling time using the unreduced settling time.

12. The method of claim 1, further comprising pretraining the convolutional neural network using pretraining images taken after a settling time that is greater than the reduced settling time and less than the unreduced settling time.

13. The method of claim 1, wherein the training set comprises information regarding a respective x-y stage position of each image.

14. The method of claim 1, wherein the sequencing operation has a plurality of imaging cycles, and wherein the paired images are taken at every cycle of the plurality of imaging cycles.

15. The method of claim 1, wherein the sequencing operation has a plurality of imaging cycles, and wherein the paired images are taken at less than every cycle of the plurality of imaging cycles.

16. A method of reducing settling time used for collecting images during a sequencing operation, the method comprising:
accessing a training set of paired images taken after an unreduced settling time and after a reduced settling time during sequencing, the reduced settling time being before the unreduced settling time;
wherein a settling time reduction ratio between the unreduced settling time, before reduction, and the reduced settling time, after reduction, is at least 2 to 1;
training a convolutional neural network that has an encoder stage and a decoder stage each updating respective pluralities of parameters during the training, the respective pluralities of parameters collectively enabling substantially recovering enhanced images, as if taken after the unreduced settling time, from unenhanced images taken after the reduced settling time, after reduction;
whereby trained filters of the convolutional neural network enable adding information to images taken after the reduced settling time to enable production of the enhanced images; and
saving the trained filters for use processing collected images from sequencing taken after the reduced settling time.

17. The method of claim 16, wherein the encoder stage provides an intermediate representation to the decoder stage.

18. The method of claim 16, wherein the convolutional neural network further comprises one or more skip connections between the encoder and decoder stages.

19. The method of claim 16, wherein the convolutional neural network is a training convolutional neural network and further comprising accessing production images taken after the reduced settling time and using information of the trained filters in a production convolutional neural network to enhance the production images as if taken after the unreduced settling time.

20. The method of claim 16, further comprising base calling from the enhanced images.

21. The method of claim 16, wherein each of the images taken after the reduced settling time is produced by capturing multiple images of a same tile with a multiple capture imager and then processing the multiple images with an AI model to produce the respective image taken after the reduced settling time.

22. The method of claim 16, wherein the convolutional neural network is a training convolutional neural network comprised in a training sequencing instrument and further comprising training a production convolutional neural network comprised in a production sequencing instrument, the training the production convolutional neural network starting with information of the trained filters and updating parameters of the production convolutional neural network based on processing fiducial elements of tuning images obtained via the production sequencing instrument and wherein the tuning images are taken after the reduced settling time.

23. The method of claim 16, wherein the sequencing is sequencing by synthesis and comprises a plurality of cycles, each cycle corresponding to a single base call for each of a plurality of oligos, each cycle occurring one after another sequentially, and the training is performed with respect to a plurality of contiguous non-overlapping ranges of the cycles, resulting in a plurality of trained filters each corresponding to a respective one of the non-overlapping cycle ranges.

24. The method of claim 16, further comprising determining image quality of the enhanced images, and responsive to the quality being below a threshold, recapturing one or more of the images taken after the reduced settling time using the unreduced settling time.

25. The method of claim 16, further comprising pretraining the convolutional neural network using pretraining images taken after a settling time that is greater than the reduced settling time and less than the unreduced settling time.

26. The method of claim 16, wherein the training set comprises information regarding a respective x-y stage position of each image.

27. The method of claim 16, wherein the sequencing operation has a plurality of imaging cycles, and wherein the paired images are taken at every cycle of the plurality of imaging cycles.

28. The method of claim 16, wherein the sequencing operation has a plurality of imaging cycles, and wherein the paired images are taken at less than every cycle of the plurality of imaging cycles.

29. A method of reducing settling time used for collecting images during a sequencing operation, the method comprising:
  accessing a training set of images taken after an unreduced settling time and after a reduced settling time during sequencing;
  wherein a settling time reduction ratio between the unreduced settling time, before reduction, and the reduced settling time, after reduction, is at least 2 to 1;
  training a convolutional neural network comprising a cycle-consistent generative adversarial network that has first and second generator stages and first and second discriminator stages each of the generator stages and each of the discriminator stages updating respective pluralities of parameters during the training, the plurality of parameters of the first generator stage enabling substantially recovering enhanced images, as if taken after the unreduced settling time, from unenhanced images taken after the reduced settling time, after reduction;
  whereby trained filters of the convolutional neural network enable adding information to images taken after the reduced settling time to enable production of the enhanced images; and
  saving the trained filters for use processing collected images from sequencing taken after the reduced settling time.

30. The method of claim 29, further comprising base calling from the enhanced images.

31. The method of claim 29, wherein the training set comprises information regarding a respective x-y stage position of each image.

32. The method of claim 29, wherein the sequencing operation has a plurality of imaging cycles, and wherein the paired images are taken at every cycle of the plurality of imaging cycles.

33. The method of claim 29, wherein the sequencing operation has a plurality of imaging cycles, and wherein the paired images are taken at less than every cycle of the plurality of imaging cycles.

34. A non-transitory computer readable storage medium impressed with computer program instructions, which, when executed on a processor, implement actions comprising:
  accessing a training set of paired images taken after an unreduced settling time and after a reduced settling time during sequencing;
  wherein a settling time reduction ratio between the unreduced settling time, before reduction, and the reduced settling time, after reduction, is at least 2 to 1;
  training a convolutional neural network comprising a generative adversarial network that has a generator stage and a discriminator stage each updating respective pluralities of parameters during the training, the plurality of parameters of the generator stage enabling recovering enhanced images, from unenhanced images taken after the reduced settling time;
  whereby trained filters of the convolutional neural network enable adding information to images taken after the reduced settling time to enable production of the enhanced images; and
  saving the trained filters for use in processing collected images from sequencing taken after the reduced settling time.

35. The non-transitory computer readable storage medium of claim 34, wherein the actions further comprise base calling from the enhanced images.

36. The non-transitory computer readable storage medium of claim 34, wherein the training set comprises information regarding a respective x-y stage position of each image.

37. The non-transitory computer readable storage medium of claim 34, wherein the sequencing operation has a plurality of imaging cycles, and wherein the paired images are taken at every cycle of the plurality of imaging cycles.

38. The non-transitory computer readable storage medium of claim 34, wherein the sequencing operation has a plurality of imaging cycles, and wherein the paired images are taken at less than every cycle of the plurality of imaging cycles.

39. A method of reducing settling time effects in images used for collected images during sequencing, the method comprising:
  accessing a training set of paired images taken after an unreduced settling time and after a reduced settling time during a sequencing operation;
  wherein a settling time reduction ratio between the unreduced settling time, before reduction, and the reduced settling time, after reduction, is at least 2 to 1;
  training a convolutional neural network comprising two or more stages, each stage updating respective pluralities of parameters during the training, the plurality of parameters enabling substantially recovering enhanced images, from unenhanced images taken after the reduced settling time;
  whereby trained filters of the convolutional neural network enable adding information to images taken after the reduced settling time to enable production of the enhanced images; and
  saving the trained filters for use in processing collected images from sequencing taken after the reduced settling time.

* * * * *